United States Patent
Janardhanan et al.

(10) Patent No.: US 10,330,491 B2
(45) Date of Patent: Jun. 25, 2019

(54) ROBUST STEP DETECTION USING LOW COST MEMS ACCELEROMETER IN MOBILE APPLICATIONS, AND PROCESSING METHODS, APPARATUS AND SYSTEMS

(75) Inventors: Jayawardan Janardhanan, Bangalore (IN); Sandeep Rao, Bangalore (IN); Goutam Dutta, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 2105 days.

(21) Appl. No.: 13/302,329

(22) Filed: Nov. 22, 2011

(65) Prior Publication Data
US 2013/0090881 A1    Apr. 11, 2013

(30) Foreign Application Priority Data
Oct. 10, 2011  (IN) .......................... 3478/CHE/2011

(51) Int. Cl.
*G06F 19/00*    (2018.01)
*G01P 21/00*    (2006.01)
(Continued)

(52) U.S. Cl.
CPC .......... *G01C 22/006* (2013.01); *G01C 21/16* (2013.01); *G01C 21/165* (2013.01); *G01C 21/18* (2013.01);
(Continued)

(58) Field of Classification Search
CPC .... G01C 22/006; G01C 21/165; G01C 21/18; G01C 21/16; G01C 21/206; G06F 1/163; G01P 15/00; G01F 15/00
See application file for complete search history.

(56) References Cited

U.S. PATENT DOCUMENTS 5,583,776 A    12/1996  Levi et al.
2009/0254294 A1    10/2009  Dutta et al.
(Continued)

FOREIGN PATENT DOCUMENTS

EP    1253404 A2    10/2002

OTHER PUBLICATIONS

Yang et al., Real-Time Gair Cycle Parameter Recognition Using a Wearable Accelerometry System, Jul. 18, 2011, Sensors 2011, pp. 7314-7326.*
(Continued)

*Primary Examiner* — Sujoy K Kundu
*Assistant Examiner* — L. Anderson
(74) *Attorney, Agent, or Firm* — Dawn Jos; Charles A. Brill; Frank D. Cimino

(57) ABSTRACT

A system (10) for pedestrian use includes an accelerometer (110) having multiple electronic sensors; an electronic circuit (100) operable to generate a signal stream representing magnitude of overall acceleration sensed by the accelerometer (110), and to electronically correlate a sliding window (520) of the signal stream with itself to produce peaks at least some of which represent walking steps, and further operable to electronically execute a periodicity check (540) to compare different step periods for similarity, and if sufficiently similar then to update (560) a portion of the circuit substantially representing a walking-step count; and an electronic display (190) responsive to the electronic circuit (100) to display information at least in part based on the step count. Other systems, electronic circuits and processes are disclosed.

43 Claims, 27 Drawing Sheets

(51) Int. Cl.
*G01C 22/00* (2006.01)
*G01C 21/18* (2006.01)
*G06F 1/16* (2006.01)
*G01C 21/16* (2006.01)
*G01C 21/20* (2006.01)
*G01P 15/00* (2006.01)
*G01F 15/00* (2006.01)

(52) U.S. Cl.
CPC ............ *G01C 21/206* (2013.01); *G01P 15/00* (2013.01); *G06F 1/163* (2013.01); *G01F 15/00* (2013.01)

(56) References Cited

U.S. PATENT DOCUMENTS

| | | |
|---|---|---|
| 2009/0259424 A1 | 10/2009 | Dutta et al. |
| 2010/0103033 A1 | 4/2010 | Roh |
| 2010/0298899 A1* | 11/2010 | Donnelly ............ A61B 5/02055 607/6 |
| 2011/0066041 A1 | 3/2011 | Pandia et al. |
| 2011/0184645 A1 | 7/2011 | Chansarkar |

OTHER PUBLICATIONS

Zijlstra et al., Assessment of spatio-temporal gait parameters from trunk accelerations during human walking, Jan. 10, 2010, Gait and Posture, pp. 1-9.*

Cho et al., AutoGait: A Mobile Platform that Accurately Estimates the Distance Walked, 2009, IEEE, pp. 116-124.*

Weimann, F., et al. "Let's Go Downtown! Let's Go Indoors!" GPS World, Nov. 2007 pp. 26-34. http://www.nxtbook.com/nxtbooks/questex/gps1107/ Figs. 1-6.

Kubrak D., et al. Performance Analysis of MEMS based Pedestrian Navigation Systems. ION GNSS, Long Beach, CA, Sep. 2005. pp. 2976-2986. Figs. 6-10.

Mäntyjärvi, J., et al. Identifying Users of Portable Devices from Gait Pattern with Accelerometers. ICASSP 2005, pp. II-973-II-976. Figs. 1-2, Table 1.

Najafi, B. et al. Ambulatory System for Human Motion Analysis Using a Kinematic Sensor: Monitoring of Daily Physical Activity in the Elderly. IEEE Transactions on Biomedical Engineering, vol. 50, No. 6, Jun. 2003, pp. 711-722. Fig. 2 part (e); p. 715, para E.

Käppi J., et al. MEMS-IMU Based Pedestrian Navigator for Handheld Devices. ION GPS 2001, Salt Lake City, UT, Sep. 2001. pp. 1369-1373. Figs. 2-8.

P. Barralon, et al. "Walk Detection With a Kinematic Sensor: Frequency and Wavelet Comparison", Proceedings of the 28th IEEE EMBS Annual International Conference New York City, USA, Aug. 30-Sep. 3, 2000. pp. 1711-1714. http://ieeexplore.ieee.org/stamp/stamp.jsp?tp=&arnumber=4462102&tag=1 Figs. 1-4.

Weimann, F. et al. "SARHA—Development of a Sensor-Augmented GPS/EGNOS/Galileo Receiver for Urban and Indoor Environments"7th Geomatic Week, Barcelona, Spain, Feb. 20-23, 2007. 11pp. Figs. 1-6.

* cited by examiner

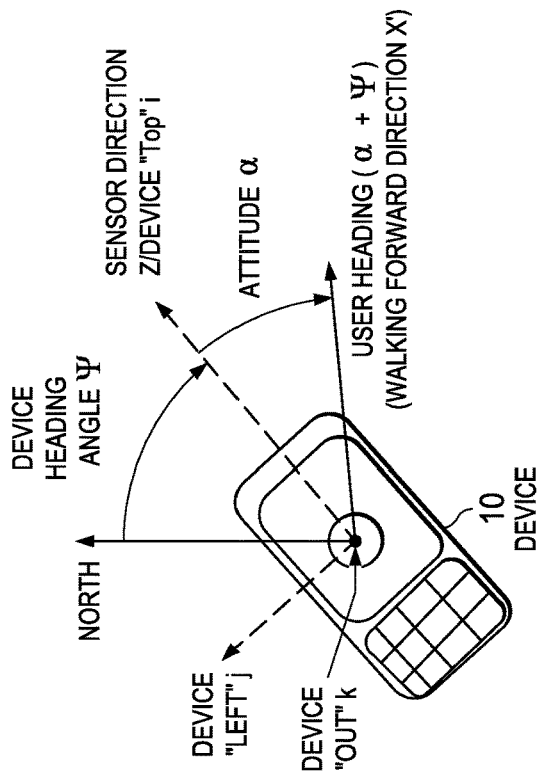
FIG. 3C
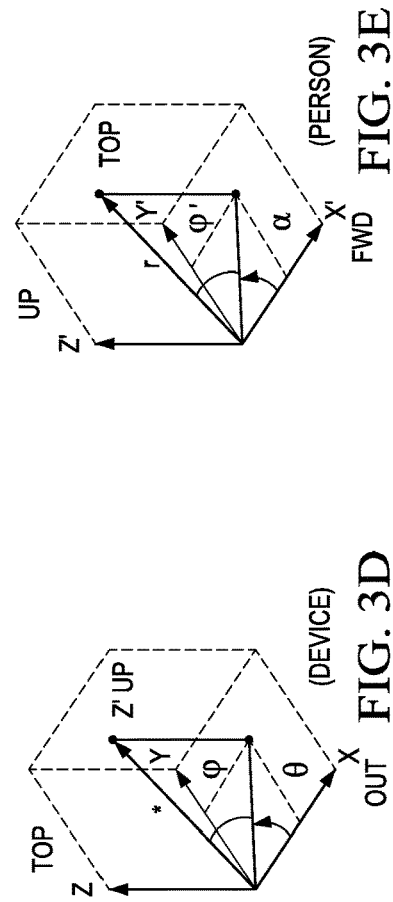
FIG. 3D
FIG. 3E
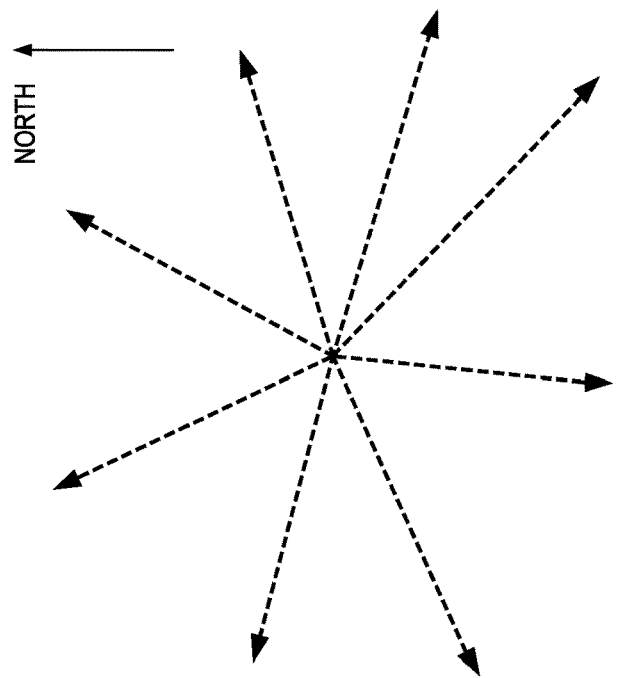
FIG. 3A
FIG. 3B

ROBUST STEP DETECTION USING LOW COST MEMS ACCELEROMETER IN MOBILE APPLICATIONS, AND PROCESSING METHODS, APPARATUS AND SYSTEMS

CROSS REFERENCE TO RELATED APPLICATIONS

This application is related to India Patent Application Number 3478/CHE/2011 filed Oct. 10, 2011, titled "Robust Step Detection Using Low Cost MEMS Accelerometer In Mobile Application and Processing Methods, Apparatus and Systems" (J. Janardhanan, S. Rao, G. Dutta), which is incorporated herein by reference, and for which priority is hereby claimed under the Paris Convention and 35 U.S.C. 119 and all other applicable law.

This application is related to U.S. patent application Ser. No. 13/301,913, now U.S. Pat. No. 8,694,251 filed Nov. 22, 2011, titled "Attitude Estimation for Pedestrian Navigation Using Low Cost MEMS Accelerometer in Mobile Applications, and Processing Methods, Apparatus and Systems" (J. Janardhanan, G. Dutta, V. Tripuraneni), which is incorporated herein by reference in its entirety.

This application is related to U.S. Patent Application Publication 2011-0098583 "Motion/Activity, Heart-Rate and Respiration from a Single Chest-Worn Sensor, Circuits, Devices, Processes and Systems" dated Mar. 17, 2011, which is incorporated herein by reference in its entirety.

This application is related to US Patent Application Publication 20100103033 "Loosely-Coupled Integration of Global Navigation Satellite System and Inertial Navigation System", dated Apr. 29, 2010, which is incorporated herein by reference in its entirety.

This application is related to US Patent Application Publication 20090254294 "Processes for More Accurately Calibrating and Operating E-Compass for Tilt Error, Circuits, And Systems", dated Oct. 8, 2009, and which is incorporated herein by reference in its entirety.

This application is related to the US Patent Application Publication 20090259424 "Parameter Estimation for Accelerometers, Processes, Circuits, Devices and Systems" dated Oct. 15, 2009, and which is incorporated herein by reference in its entirety.

COPYRIGHT NOTIFICATION

Portions of this patent application contain materials that are subject to copyright protection. The copyright owner has no objection to the facsimile reproduction of the patent document or the patent disclosure as it appears in a governmental patent office by anyone to the extent they have a non-copyright right to do so, but otherwise reserves all copyright rights whatsoever.

BACKGROUND

Seamless indoor navigation is an important user care-about and an industry technological goal. Seamless indoor navigation is especially important when availability of navigation satellites is absent or becomes absent in a large building and/or an urban canyon. Sensor-aided pedestrian navigation is a key enabler for a seamless indoor navigation solution. GPS satellites and other types of positioning satellites are not visible indoors, and GPS can often misguide in an urban canyon. Low-cost MEMS sensors (accelerometers, gyroscopes, E-compass) are making inroads into and being included in mobile phones and other devices. (MEMS refers to micro-electromechanical system technology.)

However, classical inertial navigation system (INS) based solutions are often not suitable, due to error buildup due to poor performance of inexpensive MEMS sensors. Conventionally, a classical INS solution uses a high precision accelerometer, E-compass, and gyroscope. Distance s can be estimated by double integration of accelerometer measurements a over time according to Equation (1):

$$s = s_0 + u_0 \Delta t + 0.5 a \Delta t^2 \qquad (1)$$

Accurate position estimation using this double integration approach depends on the availability of data specifying a known initial position $s_0$ and known initial velocity vector $u_0$, and for practical purposes would likely involve starting from rest so that the initial velocity vector is zero (0, 0, 0). Also, this double integration approach likely would need expensive high precision accelerometers and would suffer from large error growth or accumulation (quadratic over time) due to high bias variations and noise impairments in low-cost MEMS sensors.

Alternatively, suppose pedestrian navigation were attempted by estimating the distance traveled and user direction, where distance traveled equals number of steps detected times step length. Slow-walk and unstrapped pedestrian navigation using low cost sensors for mobile applications are believed to be unsolved problems in or among several problems that have been less-than-successfully struggled with, both in the areas of step detection and walking direction estimation. Robust step detection that is accurate in various scenarios is important, as it directly impacts the accuracy of estimated distance. Pedestrian navigation use cases involve slow walk and normal walk scenarios among others. If accelerometer measurements are used to try to detect the number of steps, then slow walk scenarios especially for a handheld or body-worn pedometer or pedestrian navigation device continue to be a challenging problem for step detection—both because of the low accelerations involved and because of the more complex acceleration waveforms encountered in slow walking. Also, some pedometers focus on fitness applications (running, jogging, etc).

If step detection were to use threshold detection of acceleration excursions, it would be prone to false or erroneous step detection, as any unintended motion of the mobile device unrelated to steps by the user would trigger such threshold detection. If relatively large thresholds for step detection were used, the step detector would quite likely underestimate the number of steps during slow walks. Step detection would likely also be triggered under vehicular scenarios when the user is sitting in a vehicle and is jostled, so this approach is not robust for navigation applications. Thus, jerks or vibrations also satisfying the threshold crossing detection condition of such a sensor would also register erroneous step detections. Counting errors would also be introduced by waiting for a certain number of steps or a certain period of time to avoid detecting short jerks before triggering a detection by starting or resuming counting thereafter.

Moreover, satisfactorily estimating the user walking direction is believed to have baffled attempts hitherto because a device might be strapped on the person (belt, shirt, trousers), or be quasi-unstrapped like a handheld, or even fully unstrapped (swinging hands). Compounding the challenge in pedestrian navigation is that the user is moving geographically in a manner generally uncoupled with the attitude or orientation of the device with respect to the user, as well as that the device is generally uncoupled in its orientation or heading with respect to the geography.

Accurate pedestrian navigation using low cost sensors for mobile applications requires accurate step detection and accurate walking direction sensing in numerous pedestrian use cases. Classical INS (inertial navigation) is problematic as already noted because the biases vary a lot and rapidly introduce large errors into estimation of the actual displacement. Accurately detecting walking steps and their repetition period is absent in or problematic for conventional low-cost pedometer units. In addition, the orientation of an accelerometer, if an accelerometer is used, would be unknown—making it difficult to resolve forward, vertical and lateral human body accelerations, due to high bias and gain variations seen in the low cost MEMS sensors. Further complicating the subject, a user can hold the device in any position, like in shirt or pant pocket, or strapped to belt, or held in a hand. Moreover, the user could be walking slowly, fast or jogging or running.

Accordingly, significant technological departures to somehow address and solve these and other problems are needed and would be most desirable.

SUMMARY OF THE INVENTION

Generally, and in a system form of the invention, a system for pedestrian use includes an accelerometer having multiple electronic sensors; an electronic circuit operable to generate a signal stream representing magnitude of overall acceleration sensed by the accelerometer, and to electronically correlate a sliding window of the signal stream with itself to produce peaks at least some of which represent walking steps, and further operable to electronically execute a periodicity check to compare different step periods for similarity, and if sufficiently similar then to update a portion of the circuit substantially representing a walking-step count; and an electronic display responsive to the electronic circuit to display information at least in part based on the step count.

Generally, and in an electronic circuit form of the invention for use with an accelerometer, the electronic circuit includes a nonvolatile memory having stored representations of instructions to generate a signal stream representing magnitude of overall acceleration, to electronically correlate a sliding window of the signal stream with itself to produce peaks at least some of which represent walking steps, and to electronically execute a periodicity check to compare different step periods for similarity, and if sufficiently similar then to update a walking-step count; a sensor input port; a display port; and a processor circuit programmably operable in response to the instructions in the nonvolatile memory for at least addition and multiplication and conditional operations responsive to the sensor input port, thereby to effectuate the instructions and drive the display port.

Generally, and in a process form of the invention that is responsive to an accelerometer, the process includes generating a signal stream representing magnitude of overall acceleration, electronically correlating a sliding window of the signal stream with itself to produce peaks at least some of which represent walking steps, electronically executing a periodicity check comparing different step periods for similarity, and if the different step periods are sufficiently similar, then updating a walking-step count, and generating display information at least in part based on the step count.

Other systems, circuits and processes are also disclosed and claimed.

BRIEF DESCRIPTION OF THE DRAWINGS

FIG. 3A is a pictorial of walking steps (dashed) in the eastward direction of FIG. 3B but shown in FIG. 3A with respect to North with attitude information missing and with varying orientations of the mobile device.

FIG. 3B is a pictorial of the steps of FIG. 3A in an eastward direction with heading and attitude information inventively determined and combined.

FIG. 3C is a pictorial of a mobile device showing its sought-after attitude $\alpha$ (alpha, yaw) relating the mobile device heading $\psi$ (psi) or accelerometer sensor direction with respect to the user walking direction X', and FIG. 3C also indicating device unit vectors Top, Left, Out.

FIG. 3D is a vector diagram in mobile device coordinates (X, Y, Z) showing an upward direction (Up, Z', z-prime) with respect to the mobile device, and further showing rotation angles $\varphi$ (Pitch phi) and $\theta$ (Roll theta) for use in a 3-D search process embodiment that rotates accelerometer measurements to search for directions of maximum and minimum variance.

FIG. 3E is a vector diagram in pedestrian personal coordinates (X', Y', Z') signifying (Forward, Lateral, Up) and showing the mobile device Top vector pointed along a direction r, and FIG. 3E further showing the attitude $\alpha$ (yaw) and a device-pitch angle $\varphi'$ (phi-prime).

Figure 1:
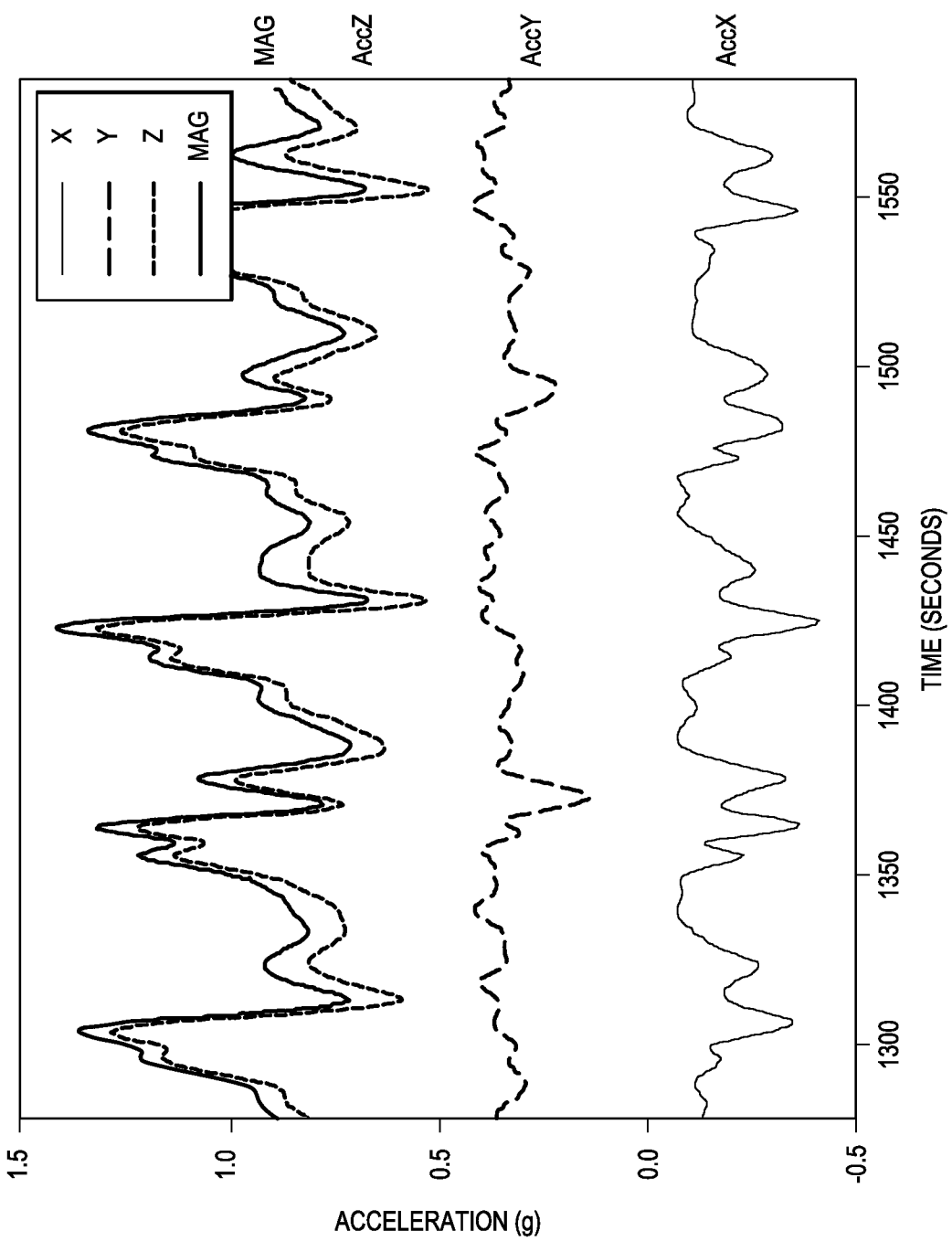
FIG. 1 is a graph of four waveforms of accelerometer measurements versus time for each of three accelerometer axes plus a waveform for overall acceleration magnitude.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

Some of the different embodiments solve problems in and provide for pedestrian navigation or pedometry using various ones of the following methods of operation: 1) speed and/or distance estimation, 2) heading estimation delivering direction information of a mobile device with respect to a pre-specified direction, e.g. magnetic north, and 3) attitude estimation delivering direction of such mobile device with respect to a direction of user motion such as walking direction with respect to an accelerometer sensor.

"Pedestrian navigation" as used herein includes any one, some or all of position, direction, heading, tilt, attitude, azimuth, altitude, velocity, acceleration and jerk sensing and/or location-based applications, position-based applications, pedometer applications, map-related applications, trajectory control, course monitoring and completion, restriction to confined areas or zones, maneuvering, free fall detection, image acquisition control, image stabilization, and other applications combining or benefiting from any of the foregoing. "Portable device" or "mobile device" as used herein includes any device, apparatus, or system, such as those stated herein as well as others, that is sufficiently movable in position or orientation to utilize and benefit from the embodiments and teachings herein.

The problem of unstrapped pedestrian navigation is herein split into estimating the distance and direction separately. The distance is estimated using pedometer process and circuitry embodiments as taught herein. For finding the direction of the user motion (walking), the direction is herein further split into A) direction of sensor with respect to a global reference (North) and B) the direction (Attitude) of the user walking motion with respect to the sensor. The first part (A) is determined using e-compass and/or gyroscope. Each of these problems has represented part of the puzzle especially in unstrapped pedestrian navigation and solution embodiments are described herein.

Further, some embodiments detect whether the data represents walking at all, and switch between modes of operation for a pedestrian navigation mode, vehicular navigation mode, a non-walking and non-vehicular mode of personal motion, etc.

Attitude estimation (B above) is among the key puzzle pieces in the unstrapped pedestrian navigation problem and embodiments described herein. It is useful and desirable to differentiate between A) the user's turning or changing walking direction and B) the mobile device being turned by the user, such as from portrait to landscape attitude, or removal from a belt. So, a first part of this description describes processes and circuitry embodiments to find the direction of user walking motion with respect to the sensor box—Attitude estimation—and then combine into electronic processing embodiments.

To determine (B) the direction (e.g., of axis) of a mobile device with respect to the user's walking direction, some of the embodiments use two key observations: firstly, that the variance of the acceleration vector is minimum along the lateral axis of the human body (side-to-side). Secondly, in the horizontal plane the variance of the acceleration is maximum along the forward axis of the human body. Accordingly, some of the attitude estimation embodiments involve electronic processing structures and processing methods that search the direction component of acceleration both for minimum variance along the Lateral axis and for maximum variance along the horizontal plane to find the Forward axis of pedestrian walking. In some of the embodiments, the horizontal plane is found by aligning the vector mean (vector average) of the acceleration vector to gravity to find the Down or vertical direction whereupon a plane that is perpendicular thereto is horizontal. For example a plane passing through a sensor of the mobile device, and which plane is perpendicular to the vertical direction, is a horizontal plane.

An attitude estimation module (see also in FIGS. 5 and 14 later hereinbelow) is used to determine the attitude (orientation) of the device (sensor box) with respect to the user motion. See, e.g., FIG. 3C. Heading of user motion is comprised of (A) the direction of the device with respect to magnetic north and further (B) the attitude, i.e., the direction of the device with respect to the user motion.

The accuracy of an attitude estimator embodiment can be specified for 1) a static walk condition of mobile device, and 2) a changing attitude walk condition. The attitude estimator can be held in hand at chest level, in shirt pocket, in trouser pocket, strapped to belt, or otherwise.

In FIG. 1, raw accelerometer measurements versus time of a user walk include respectively-perpendicular forward, lateral and vertical components AccX, AccY, AccZ. The magnitude (Mag) or square root of sum of squared components is also graphed at the top of the graph.

Figure 2:
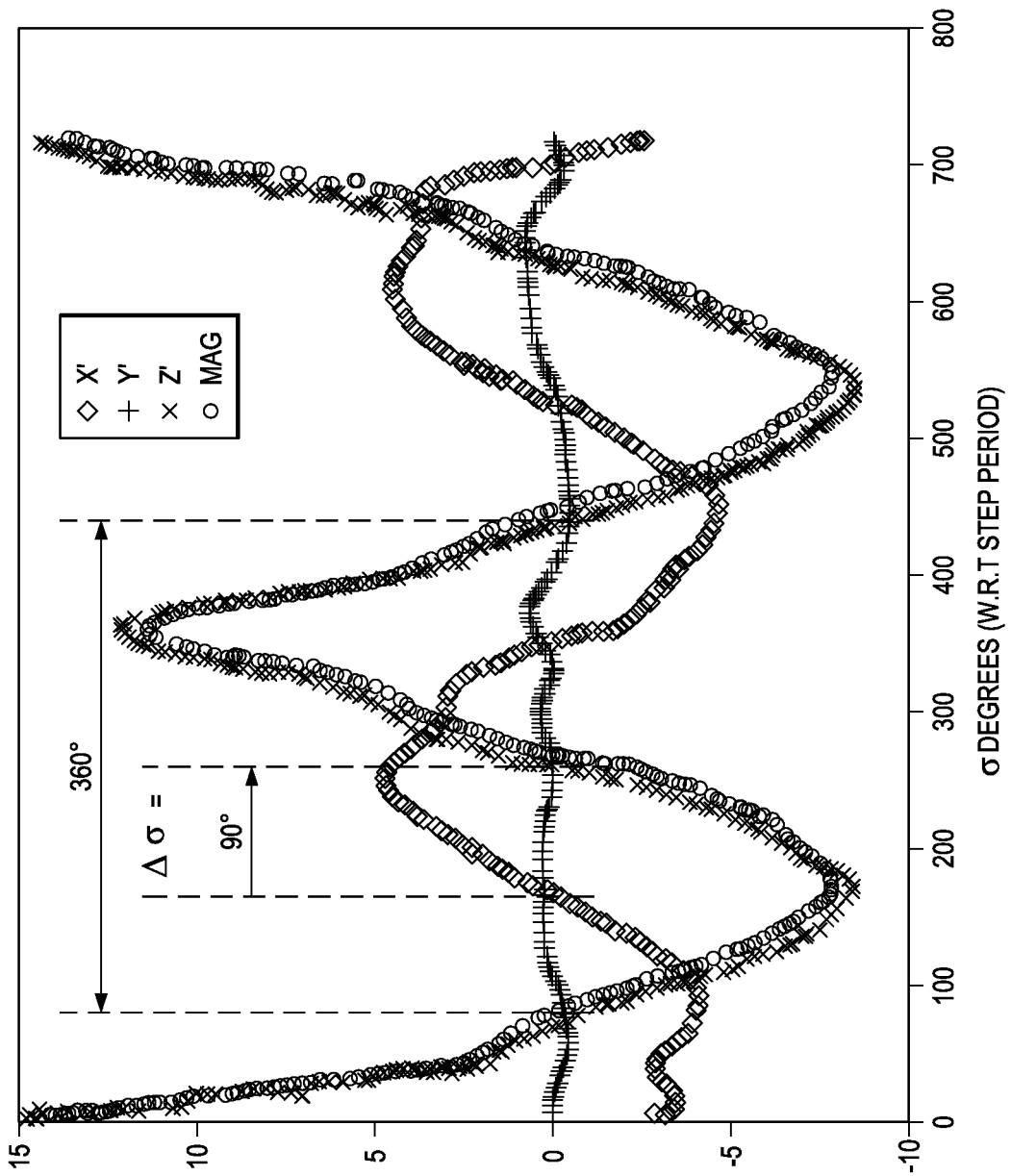
FIG. 2 is a graph of four waveforms of correlation of the four accelerometer measurements correlated with respect to acceleration magnitude, with the vertical axis in arbitrary units and the horizontal in angular degrees with respect to 360 degrees of walking step period.

In FIG. 2, a process embodiment has electronic processing that correlates the vertical acceleration and forward acceleration with the total magnitude of acceleration. The average phase difference Δσ (delta change of phase angle sigma) of both rising and falling is determined from zero-crossings. As the raw acceleration of FIG. 1 is very noisy, a problem of finding the phase difference Δσ is addressed by filtering the acceleration measurements such as by sliding window correlation and then finding the phase difference from zero crossings. The times of the zero crossings can be relatively accurately detected by clocking a time counter into measurement register(s) in response to such zero crossings. A step period is suitably estimated as the respective time interval between every other zero crossing. Because the step frequency (reciprocal of step period) of the varying acceleration may itself vary depending on the user and walking speed, processing the content may be subject to some acceptable estimation error, of course.

In FIG. 2, this remarkable operation is shown as a graph of the labeled forward, lateral, and vertical components of acceleration correlated with acceleration magnitude. These correlations are plotted on a vertical axis as a function of angular displacement in degrees or radians on the horizontal axis. Angular position or displacement values are plotted with respect to the step period or duration wherein one step period is 360° (2π radians). For example, 180° on the horizontal axis corresponds to an elapsed time of 0.5 seconds into an e.g. 1.0 sec step period that starts with a peak. A displacement of 180° on the horizontal axis would represent an interval between predetermined events or characteristics on the graph such as peaks or zero crossings. The step period in seconds may increase or decrease as the walking speed decreases or increases, but it occupies or remains normalized to 360° (2π radians). In FIG. 2, the phase difference Δσ between the vertical and forward acceleration profiles each thus correlated with magnitude is thereby made relatively straightforward to measure. The phase difference Δσ is suitably determined, such as by setting it equal to 2π times the ratio of time difference between corresponding zero crossings of vertical correlation R(AccZ', Mag) (designated Z' for short in FIG. 2) and forward correlation R(AccX', Mag), all divided by the step period. Corresponding zero crossings, for instance can each be rising or each be falling type.

Various embodiments solve problems by using a low cost 3-axis accelerometer (X,Y,Z axes). As FIG. 2 illustrates, properties of 3-axis accelerometer measurements (suitably filtered such as by correlation) during a normal walk remarkably include:

1. The variance $E[(x-\text{mean}(x))^2]$ along the vertical axis is at a maximum. (Small 'x' refers to the filtered data point values, and this variance expression represents the mean-square of a respective waveform disregarding its DC average.)
2. The variance along the lateral axis is at a minimum.
3. The vertical and the forward axis profiles are offset in phase by 90°,
4. The vertical acceleration waveform leads the forward acceleration by 90° i.e. in the way shown in FIG. 2.

Dynamic attitude tracking is thereby made possible by electronically analyzing and deriving attitude based on measurements for a reasonably small number of walking steps, e.g., as few as in a range of one to four walking steps. Moreover, success or failure of the data to conform within reasonable limits to one or more of the above properties can be used in a context determination process to establish a monitoring mode for ordinary forward-walking, or to detect and analyze instances of non-standard gait, or walking backwards, dancing, or walking sideways, or to entirely eliminate walking as the context and branch to some other acceleration monitoring mode.

Direction of motion has a bidirectional ambiguity (0, π radians), i.e. (0, 180 degrees). To resolve this ambiguity, some embodiments recognize a further key idea that vertical acceleration profile leads the forward acceleration profile by about a quarter-cycle or 90 degrees (Δσ=π/2 radians) in phase i.e. as in FIG. 2. For instance, the forward acceleration begins to rise when the vertical acceleration peaks. Accordingly such embodiments electronically find the phase difference between the vertical and forward acceleration profiles wherein Δσ~=90° indicating forward, and Δσ~=−90° indicating reverse or vice versa. Some embodiments rotate axes computationally to find the rotation at which Δσ~=90° for two axes while the third axis has its variance minimum. Then the third axis is used as the lateral axis, and the Δσ~=90° leading axis is used as the vertical axis and the axis that lags is used as forward axis. Some attitude estimation embodiments may employ an accelerometer that has nearly identical gains or at least similar gains on all three sensor axes to promote computationally economical analysis of the variances, phase differences, and computational rotations.

The reader should note at this point that the natural language words 'lead' and 'lag' can be potentially confusing because if one of the waveforms is simply inverted in a data plot relative to the actual X' or Z' voltage, or if sensor leads are reversed, 'lead' becomes 'lag' and vice versa. Leading or lagging can also depend on how the sensor is mounted in the mobile device 10. Accordingly, the waveform relationship and behavior such as represented by filtered clear walking data from the three accelerometer sensor axes as taught herein should be taken as the point of reference for interpretation and implementation.

Notice that various embodiments can detect various the waveforms in various ways, such as by generating the variance according to the definition $$\text{Var}=E[(x-\text{mean}(x))^2] \qquad (2)$$

sampled (and usefully filtered if desired) at many points for each accelerometer axis, or using some proxy for or approximation to the variance, such as the peak-to-peak difference or a computing sum of $(x-\text{mean}(x))^2$ for just a few points, or using an average of absolute differences |x−mean(x)| or some other feasible process of electronic computation for the purpose. Note also that some embodiments can recognize that the integral of the vertical axis profile is ideally approximately in phase (or 180 degrees out of phase) with the forward axis profile and such embodiments can integrate and rotate the accelerometer axes computationally to find such a phase condition.

Integration once or twice acts as a kind of filtering that can reduce the strength of components that are greater in frequency relative to components that are lower in frequency, even when some low pass filtering LPF or band pass filtering may have been applied earlier in the signal processing data path. If pre-filtering is used, then in some of the embodiments, the filtering frequency cutoff(s) is statically configured. In some other embodiments, pre-filtering is adaptively established in a range from e.g. about 0.5 Hz to about 5 Hz depending on changes in walking rate, such as between slow walk, jogging, and running Some of the embodiments provide electronic correlation and periodicity processing by itself without other filtering, and some other embodiments combine the electronic correlation and periodicity processing with other filtering. Different amounts or kinds of filtering may be applied to a given sensor axis relative to the filtering applied to another sensor axis. Polynomial filtering such as Savitzky-Golay filtering can be useful in some embodiments by adapting it to deliver more-useful waveforms to the walking motion analysis blocks of FIGS. 5 and 14 than the unfiltered accelerometer waveforms of FIG. 1 may offer alone. (For some background see the hereby-incorporated U.S. Patent Application Publication 2011006041 regarding Savitzky-Golay filtering.) Various kinds of correlation are employed as sensor waveform filters in different embodiments, such as autocorrelation, cross correlation, folded correlation (FIG. 24), etc. Some embodiments can have firmware or software code formulated in explicitly statistical form and some other embodiments can have code formulated in a technological form calling for phase-computations and matching. Various hardware, software and mixed forms of embodiments are also contemplated.

Turning to FIGS. 3A and 3B, the beneficial impact of yaw (attitude α) estimation is illustrated. FIG. 3A shows undesirable pedestrian navigation monitoring without an effective attitude estimation embodiment. Walking steps (dashed) in the eastward direction of FIG. 3B can be mapped in all directions as shown in FIG. 3A when attitude information is missing and with varying orientations of a mobile device 10. In FIG. 3A, the user walks along one same path, but with any of eight different static orientations of the mobile device 10, i.e. with its sensors directed to any of eight different points of the compass. In the absence of yaw (attitude) estimation, the path determined by the sensor box using acceleration sensors is erroneous (any of eight rays in all different directions) and distracted by some error angle with respect to the true path.

FIG. 3B shows yaw (attitude α) estimation with an embodiment. Yaw estimation with an embodiment in FIG. 3B resolves the error in the estimated device heading, and as a result the path determined using sensors matches closely with the true path (multiple rays all indicating about the same direction, eastward).

FIG. 3C shows a mobile device 10 that is oriented at a Device Heading angle ψ with respect to North, e.g., with respect to NED (North, East, Down) coordinates. Mobile device 10 further has a process herein that can effectively determine an Attitude angle α relating the direction of its attached accelerometer sensor with respect to the user walking direction. FIG. 3C also indicates device unit vectors: Top i emanating beyond the display in the plane of the device, Left j emanating to the left in the plane of the device, and Out k emanating perpendicular to the plane of the device and outward from the display. An inexpensive triaxial MEMS accelerometer is securely attached to the device 10 and suitably has its sensor axes X, Y, Z aligned respectively with the Out, Left, Top unit vectors or axes of the device 10. (Such alignment is convenient but not a requirement if the fixed physical relationship of XYZ to Out, Left, Top is known, whereupon a coordinate rotation is electronically performed or built-in, sometimes as simple as one or more measurement sign reversals. Analogous comments apply to e-compass axes and gyroscope axes.) Notice that the Device Heading angle ψ and the Attitude angle α are in a horizontal plane parallel to the earth's surface, and are superimposed on FIG. 3C for illustrative convenience as if the mobile device 10 were in the horizontal plane. However, mobile device 10 in general may be oriented in any direction, tilt, inclination, or orientation, and right-side-up or upside down. The device 10 Top unit vector i usually has a component in the horizontal plane in FIG. 3C, and the angle clockwise from North made by that component is referred to as the Heading Angle herein.

FIG. 3D shows mobile device coordinate system (X, Y, Z). Without loss of generality, the accelerometer axes rigidly aligned to X, Y, Z so that Z axis is parallel to Top vector i, Y axis is parallel to Left vector j, and X axis is parallel to Out vector k. The reader can visualize the accelerometer as an imaginary observer inside the device 10 and blind to the outside, so that the X-axis always points to device Top no matter what the orientation of the device is with respect to the surroundings or the pedestrian user. In mobile device coordinates (X, Y, Z) an upward, vertical direction (Up, Z', z-prime) is depicted in some generalized direction that is not fixed but instead can vary depending on the orientation of the device. (For some parts of the alignment and attitude estimation methods though, it is useful to have the mobile device orientation vary slowly enough so that it is relatively stable over about one stride worth of windowed measurement data, with respect to the surroundings.)

Further in FIG. 3D, for example, a pair of rotation angles φ (Pitch phi) and θ (Roll theta) are varied in a 3-D search process embodiment that rotates accelerometer measurements [AccX, AccY, AccZ] in various directions to form linear combinations of those accelerometer measurements as if they were values of acceleration components that had been measured with the accelerometer in another reference frame instead. Roll θ rotates device 10 around its roll axis of rotation, Pitch φ rotates device 10 around its pitch axis of rotation. Strictly speaking, Yaw rotates device 10 around its yaw axis of rotation, and in this disclosure the term "Yaw" (Attitude α) of FIG. 3E represents a somewhat different, but related, angular concept relating the user to the device as well. In some embodiments, such a 3-D search process searches for a particular direction represented by angle-pair ($\varphi_{Z'}$, $\theta_{Z'}$) at which maximum variance occurs and also searches for a particular direction represented by angle-pair ($\varphi_{Y'}$, $\theta_{Y'}$) at which minimum variance occurs. The search results thereby effectively locate the directions of FIG. 3E pedestrian personal coordinates (X', Y', Z') relative to the mobile device. Moreover, the process delivers linear combinations of accelerometer measurements [AccX, AccY, AccZ] that become rotated into the acceleration components [AccX', AccY', AccZ'] along the axes of the pedestrian personal coordinate system (X', Y', Z').

FIG. 3E shows the pedestrian personal coordinate system (X', Y', Z') signifying (Forward, Lateral, Up). FIG. 3E shows the mobile device Top vector tilted and pointed along a direction r. FIG. 3E further shows the attitude α (yaw) and a device-pitch angle φ' (phi-prime, 90-φ). In some of the description elsewhere herein, reference is also made to detilted coordinates (i.e., X', Y', Z'), which are these coordinates of the pedestrian's personal coordinate system. In FIG. 3E, coordinate X' corresponds to Forward, Y' to Lateral, and Z' to Vertical (i.e. opposite to NED Down). Notice that an inclination angle φ' (phi-prime) represents the pitch of the device 10 above horizontal, and an angle α (alpha) represents the attitude angle in the horizontal plane. Both the NED coordinate system and personal coordinate system (X', Y', Z') have a horizontal plane so the Device Heading Angle ψ conveniently sums with Attitude α to deliver the User Heading (heading of axis X') relative to North (see sum 780 of FIG. 15).

Because the device 10 is mobile, the sensor suite takes its measurements in FIG. 3D device coordinates (X, Y, Z), or in a way rigidly related thereto, but the information that matters to the user pertains to places and directions geographically in NED coordinates ('go West') or in the FIG. 3E (X', Y', Z') coordinates ('go Forward, turn Left'). As also noted earlier hereinabove, pedestrian navigation compounds the challenge because the user is moving geographically in a manner generally uncoupled with the attitude or orientation of the device with respect to the user, as well as that the mobile device is generally uncoupled in its orientation or heading with respect to the geography.

Figure 4B:
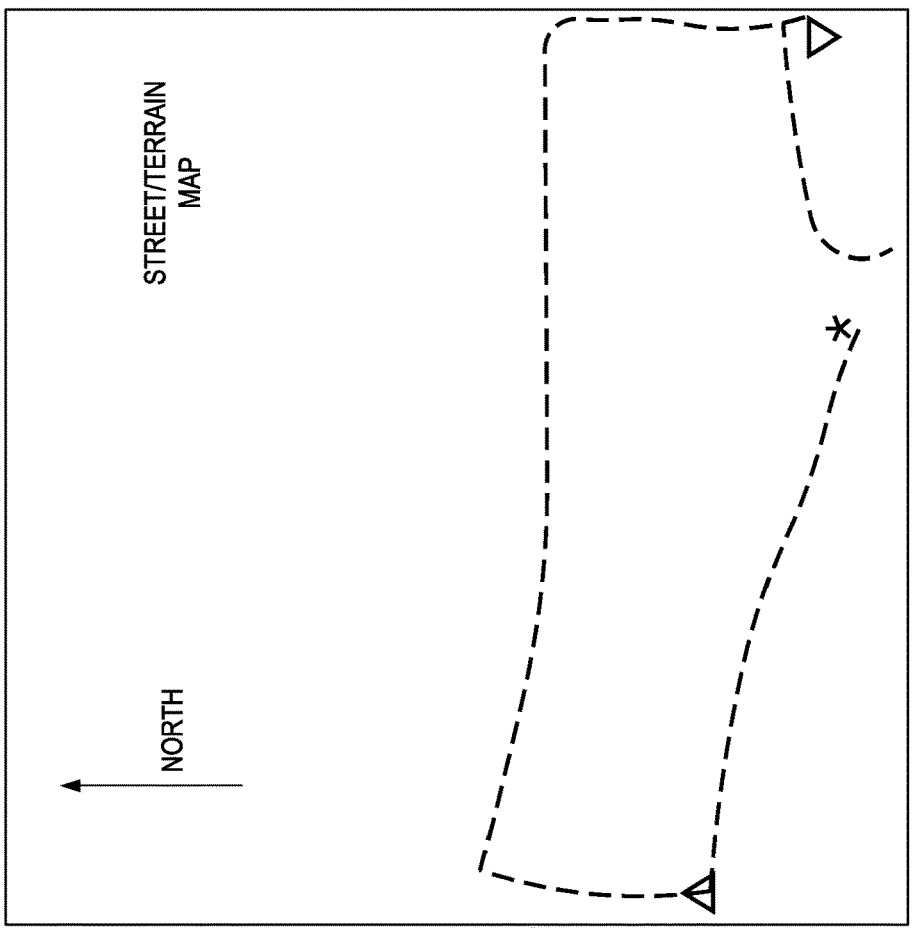
FIG. 4B is a pictorial of user steps much more accurately shown along the walking course by advantageously combining an attitude $\alpha$ estimation embodiment with a step detection embodiment herein.
Figure 4A:
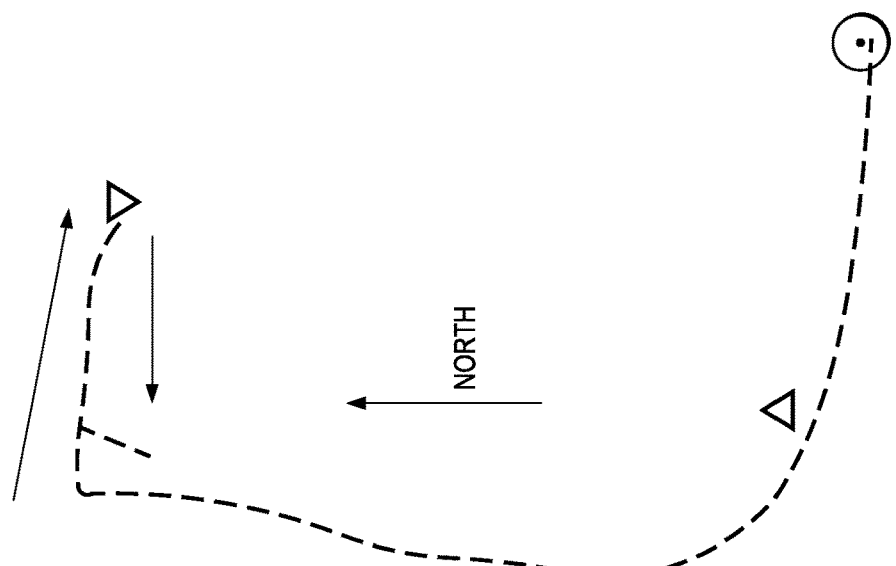
FIG. 4A is a pictorial showing an erroneous pattern of user steps as if along a walking course without effective attitude estimation.

In FIGS. 4A and 4B, the before/after beneficial impact of dynamic attitude change together with yaw estimation is portrayed in an integrated performance illustration of FIG. 4B. In FIG. 4B, a mobile device embodiment and process embodiment successfully determine dynamic change in attitude (quasi-static) of the mobile device 10, as illustrated for a realistic indoor example. The mobile device attitude is changed from (i) 'portrait' mode to 'landscape' mode at the first right turn "Δ"; two further right turns are executed; and the device attitude is changed from 'landscape' back to 'portrait' at a fourth right turn "▼". However, the estimated route in FIG. 4A commences with yaw estimation disabled "O" and is completely erroneous in shape in the absence of yaw estimation. Position determination erroneously also goes beyond boundaries (not shown) of an approximately rectangular space around which walking over a 187 meter walking route is actually occurring in FIG. 4B. In FIG. 4A, back-and-forth arrows are inserted nearby the fourth right turn to indicate the sequence of the later part of the walk, as mis-represented by the lack of yaw estimation.

But in FIG. 4B, by contrast, the mobile device with Attitude estimator (yaw) process embodiment enabled "*" tracks changes in mobile attitude much more accurately and combines them effectively with step detection data. Corresponding symbols are used to indicate the change from (i) 'portrait' mode to 'landscape' mode at the first right turn "Δ"; and the device attitude is changed from 'landscape' back to 'portrait' at fourth right turn "▼". All of the turns are tracked by the embodiment successfully. Consequently, the pedestrian walking path or trajectory determined using sensors of an inexpensive MEMS accelerometer matches closely with the true path. Given a starting position (e.g., latitude and longitude, or pointer(s) in a map library application) supplied to the mobile device, the processing circuitry and an electronically implemented process embodiment determine the path in response to the acceleration sensors with remarkable fidelity.

Figure 5:
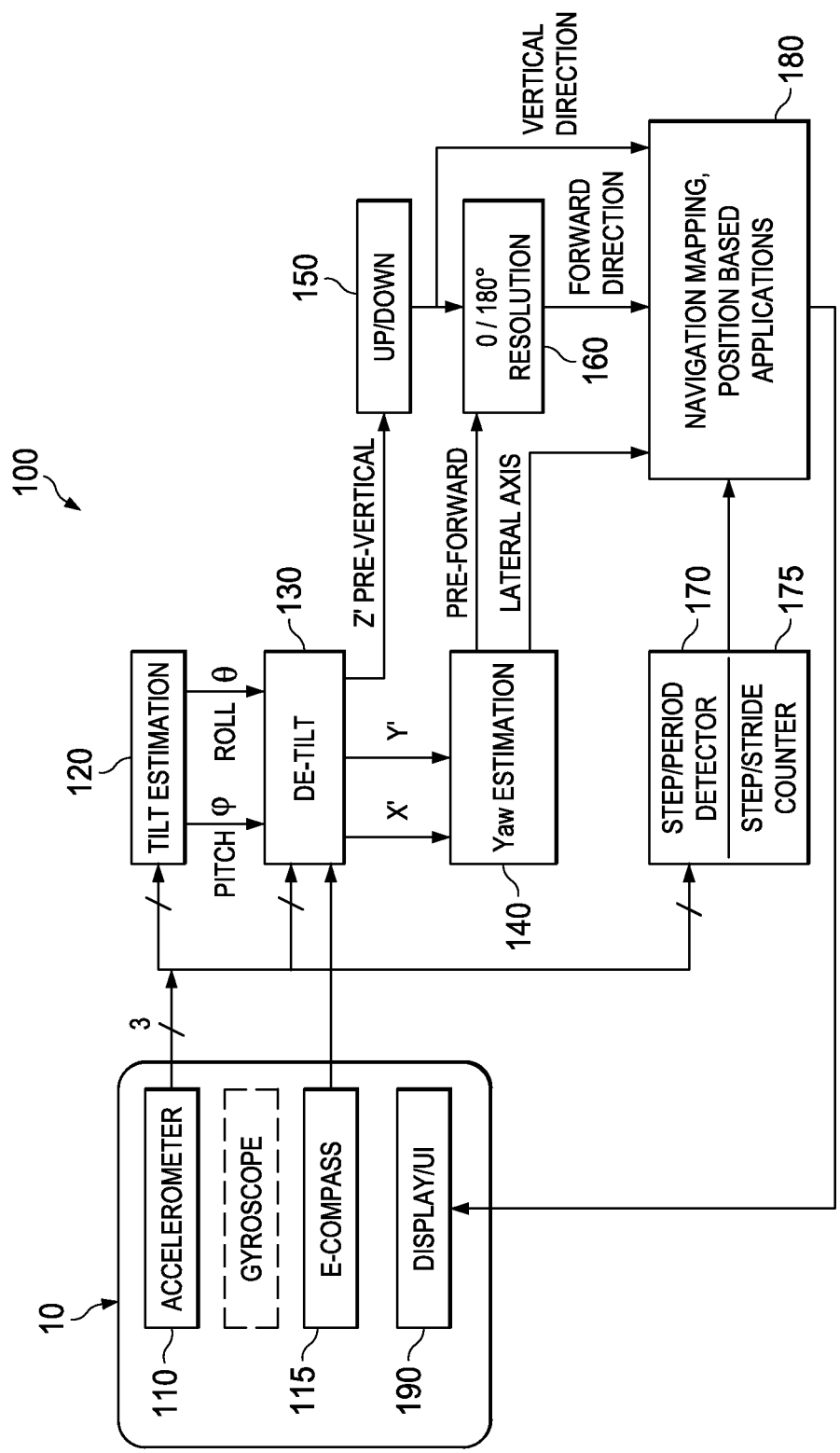
FIG. 5 is a block diagram of a mobile device or system embodiment for pedestrian navigation.

In FIG. 5, mobile device 10 has a three axis accelerometer 110 that provides three raw measurement outputs AccX, AccY, AccZ as a stream of analog-to-digital conversion ADC samples to a pedestrian navigation embodiment 100 in mobile device 10. The pedestrian navigation unit 100 includes accelerometer 110 and ADC, Tilt Estimation 120, De-Tilt 130, Yaw (Attitude) Estimation 140, Up/Down 150, 0/180 Resolution 160, Step/Period Detector 170, Step/Stride Counter 175, and Mapping/Position 180.

Tilt Estimation 120 responds to AccX, AccY, AccZ to produce Pitch φ and Roll θ outputs to De-Tilt 130 using the empirical rules discussed for FIG. 2. Remarkably, tilt can usually be estimated during rest—by averaging the samples during rest to filter the noise. But during walk, the measurements are likely too noisy to average for tilt estimation. However, since the waveforms are in general periodic across a stride—Tilt Estimation 120 in some embodiments conveniently averages across a stride, where the net acceleration usually is zero (except for gravity). Hence, whenever a stride is detected, Tilt Estimation 120 in such embodiment averages over a stride for dynamic tilt estimation (and tracking).

De-Tilt 130 in turn utilizes all of these inputs (AccX, AccY, AccZ, φ, θ) to discover and produce de-tilted axes of pedestrian personal coordinate system (X', Y', Z'), see Equation (9). De-tilted axes X', Y' are fed to Yaw Estimation 140, and de-tilted axis Z' is fed as a preliminary vertical (Pre-Vertical) input for up/down resolution by block 150. Yaw Estimation 140 in a somewhat analogous manner provides a preliminary forward (Pre-Forward) input for backward/forward (0/180°) by a resolution block 160. Lateral axis, Forward Direction, and Vertical Direction outputs are fed respectively from Yaw Estimation 140, Up/Down 150, and 0/180° resolution 160 to a navigation module 180.

In the meantime, Step/Period Detector 170 detects steps and step period and/or stride period, and a Step/Stride Counter 175 provides step counts, walking speed (directionless magnitude), and other pedometer information. The pedometer information along with the step detection events (pulses) are fed to map/position module 180. Alternatively, some embodiments herein are directed to a robust pedometer 170 even with the attitude estimation blocks 120-160 absent and module 180 absent. For example, one category of pedometer embodiment specifically includes some or all of accelerometer 110, a Step/Period Detector 170 with a Distance estimator of step length as parametrized function of step period; a Step/Stride Counter 175 and a distance accumulator of estimated step lengths, and Display/UI 190. Another category of pedometer embodiment is an integrated circuit chip or chipset of flash memory holding instructions for Step/Period Detector 170 and a microprocessor for executing the instructions and providing Step/Stride Counter 175. Another category of embodiment suitably includes one or more further elements from FIG. 5 as well.

Navigation module 180 includes pedestrian navigation software, access to maps and map-based display processes, and position-based applications. As noted hereinabove, module 180 receives Lateral axis, Forward Direction (User Heading), and Vertical Direction as well as the pedometer data such as step counts, walking speed, and stride period. The pedestrian navigation module 180 thus has at its disposal relatively accurate information from which actual displacement vectors, incremental displacement vectors, and velocity vectors can be obtained or constructed in real-time. The user's walk is superimposed on a stored street/terrain map or image as in FIG. 4B. The user's walk is electronically shown on display/UI 190 at position points incrementally corresponding to displacement vectors as time proceeds. References to a map are non-limiting and may include maps of complicated spaces and architectures in multi-story buildings, subterranean locations like mines, underwater, airborne and spaceborne locations, and any venues to which the advantages commend use.

Step pulses from the step detector 170 and time from an internal real-time clock (RTC) of mobile device 10 can also be used to indicate elapsed time and progress in user steps along the walk on the map. Various kinds of walking speed information over time are readily derived, such as currently windowed speed, average speed, and maximum speed. In addition, module 180 suitably supports various kinds of position-based applications. Such applications for example can determine whether a user is near a location of interest, such as a store, facility, or geographically interesting spot and highlight such information on the display 190. The modem in mobile device 10 can also provide location information externally in case of request or emergency. For users under some kind of supervision, the position-based application can detect whether the user is transgressing some boundary, and provide location information for a parent or other supervising person.

Embodiments can be used with a context detection process, so that they do not detect steps during e.g. vehicle navigation and instead operate in another mode such as a vehicular motion monitoring mode if desired.

Figure 6:
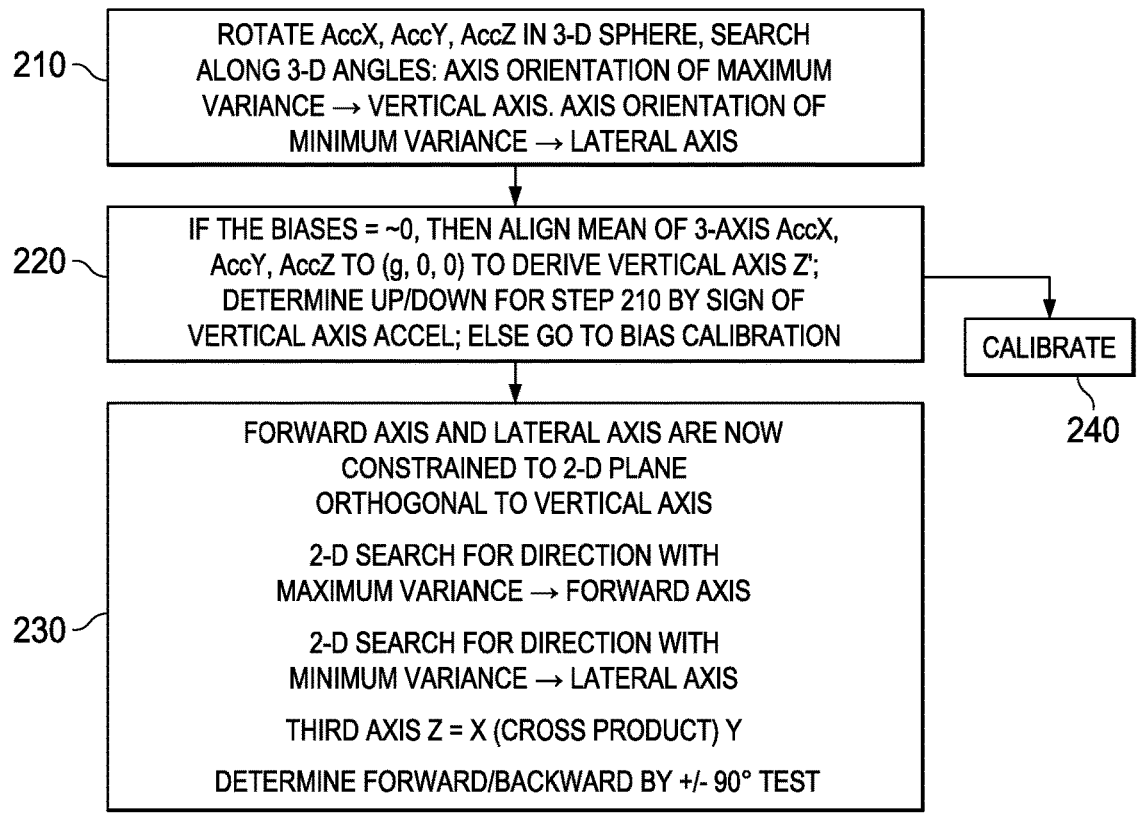
FIG. 6 is a flow diagram of an attitude estimation process embodiment.

In FIG. 6, for another electronic process example, some processing steps include a step 210 that rotates the accelerometer measurements, and a step 220 that checks if the biases are compensated to near-zero and then aligns to the vertical. (In some more-recent accelerometer sensors, the biases may already be negligible, and no bias calibration or compensation is called for.) If the biases are not yet compensated, a branch is made to calibration step 240 see also FIG. 21. Up/down is determined as described elsewhere herein such as by acceleration vector averaging in step 220, and/or by search 210 and disambiguation in step 220 according to the sign of vertical axis acceleration, to compute the vertical direction, After alignment to the vertical in either step 210 or 220, a composite step 230 among other things performs 2-D searches in the horizontal plane to determine the forward and lateral directions of the human body walking motion, and disambiguate forward/backward walking directions. FIG. 6 is presented in generalized way wherein in particular embodiments either of the 2D and 3D searches can be used to the exclusion of the other, or both kinds of searching can be executed and blended. Gravity alignment 220 can be used instead of 3-D step 210 to support the 2-D search of step 230.

Various process versions are described in more detail as follows:

Step 1A: Determine the Vertical, Forward and Lateral Axis of Motion:

Rotate the 3-axis accelerometer measurements in a 3-D sphere along the various 3-D angles, to find an orientation where one of the axes has a maximum variance. The orientation where the maximum variance occurs will be close to the Vertical Z' axis, while the orientation where the minimum variance occurs will correspond to the Lateral axis Y'. The maximum variance will be close to vertical, since the lateral acceleration is usually negligible when compared to the vertical and when compared to the Forward axis. The forward acceleration profile is noisily phase offset by 90° from the vertical acceleration profile as in FIG. 2.

In a Step 1B, the third personal axis (Forward X') of FIG. 3D is derived from the directions of the other two axes, by performing a vector cross product of acceleration vectors along and representing the other two axes, Lateral Y' and Vertical Z'. See Appendix Equation (A-7). For example, X'=Y' (cross product) Z'. In words, X' (Forward) equals the vector cross product of Y' (Lateral) and Z' (Vertical) according to the mathematical right hand rule with resulting magnitude equivalent to) XY sin(angle=90°. (A left hand rule might be used as applicable to the sensor axes. The usual rule is often right handed). The axes thus determined are suitably normalized to unit vectors by dividing them by their lengths (square root of sum of squares of components). The cross products are being executed on vectors represented in device coordinates X, Y, Z, which align with device unit vectors k, j, i of FIG. 3C. Consequently, the resulting cross product triplet of values representing a unit vector for the Forward direction X' are also in X, Y, Z coordinates.

If the accelerometer biases are negligible or already corrected for (as in US Patent Application Publication 20090259424 hereby incorporated by reference), the vertical axis Z' in an alternative Step 1A' (220) is derived by aligning the mean of the 3-axis accelerometer measurements to g=(g, 0, 0), where g is the earth's gravity. This step assumes the user is standing still or walking with approximately constant velocity (so that the user does not introduce a significant average acceleration component to gravity over the time window used). In this Step 1A', the vector sum of the 3-axis accelerometer measurements in the accelerometer frame, e.g. (X, Y, Z), is a vector of varying magnitude and direction and the average over a step or stride of that vector sum substantially cancels out the human body-originated accelerations, leaving only the downward acceleration due to gravity. This way, the vector average (averaged vector sum) determines or estimates the vertical axis Z' and is designated to represent the vertical axis direction. With the vertical downward axis determined as a first axis of the three orthogonal axes, then the other two axes (Forward axis and Lateral axis) are constrained to the 2-D plane orthogonal to the Vertical axis. In a step 1B', a 2-D search adjusts rotation coefficients or angles in device coordinates for maximum variance and thereby determines the Forward axis X' based on those coefficients. Analogously, another 2-D search adjusts rotation coefficients or angles in device coordinates for minimum variance and thereby determines the Lateral axis Y' based on those different but analogously-determined coefficient values.

Step 2: Determine or disambiguate up/down, forward/backward. Step 2A: The sign of Vertical axis acceleration in device coordinates determines whether the sensor is facing up or down. In other words, designate one accelerometer sensor as vertical (up) given nominal vertical positioning of the mobile device to which the sensor is affixed. On average, the dot product with gravity (inner product AB cos(angle)) of output from that vertical sensor is positive (aligned with gravity) if the device is oriented down and negative if the device is oriented up (or vice versa depending on sensor orientation with respect to the device). Step 2B: Determine whether the sensor is facing forward/backward. The raw or native vertical and forward profiles (acceleration vs. time) are too noisy to compute the phase difference. Hence, some embodiments perform respective correlations of individual axes (Vertical and Forward) with the total magnitude of the acceleration. The magnitude of acceleration is given by the sum of squares of acceleration components: sqrt(vertical^2+forward^2+lateral^2). These correlation profiles are much cleaner and smoother for the circuitry to work with and process. Then the processing detects the positions of the maxima of the correlations. In cases of double maxima or a much flatter maximum, the process uses the zero-crossings and takes the average phase difference at both rising zero-crossing and falling zero-crossing, which also takes care of a bad duty-cycle scenario. So, if this phase difference is close to 90° then the processing responds by designating the profiles as representing motion in the forward direction, else if it is close to −90°, then processing indicates the backward direction and reverses the indication to yield the direction of walking motion.

Step 3: In some embodiments, the process may do an adjustment on the axes rotation found in Step 1 based on the departure of said phase difference found in step 2 from the nearest of 90° or −90° and loop to step 2 to iteratively minimize that departure. If an adjustment is not employed at all, or if a computed adjustment is employed but the adjustment is zero, then proceed to use the Vertical, Forward, and Lateral axes with resolved directions thus determined.

Using low cost (MEMS) accelerometer sensors, any of such embodiments economically determines the attitude direction of user motion with respect to the mobile device for example to differentiate if the sensor is held in portrait mode or in landscape mode but maintaining user heading walking north-south/east-west. The accelerometer 110 is rigidly attached to the mobile device 10 but the mobile device 100 is not rigidly attached to the user. The FIG. 5 accelerometer 115, electronic processing circuitry and computational firmware or software are all suitably located as modules in the mobile device 10. Some embodiments alternatively may couple the mobile device 10 via a FIG. 23 modem 1100 to a remote location such as a web server or cloud computing arrangement to provide some or all of the processing circuitry and electronic computations remotely. A gyroscope 1170 (FIGS. 5, 21) may be omitted from some basic e-compass/accelerometer embodiments and the electronic methods taught here in. Alternatively, some other embodiments may include a gyroscope 1170 and combine gyroscope measurements with the results of the e-compass 1150 and accelerometer 110 (1140) measurements as taught herein.

Attitude determination Steps 1 and 2 above are detailed further next.

Step 1.1.1: Determine the Vertical or Lateral Axis of Motion
Step 1.1.1, Example Method 1: Maximum Variance Yields Vertical Axis, Minimum Variance Yields Lateral Axis An accelerometer supplies three-axis accelerometer measurements AccX, AccY, AccZ relative to its own three axes X, Y, Z. Rotate according to Equation (3) the three-axis accelerometer measurements AccX, AccY, AccZ in a 3-D (three-dimensional) sphere along the 3-D angles Pitch $\varphi$ (phi) and Roll $\theta$ (theta) of FIG. 3D. See the Appendix later hereinbelow for further detail. See also FIG. 5 De-Tilt 130 and FIG. 6 step 210. By varying Pitch $\varphi$ and Roll $\theta$ in a search process, indirectly-measured values ($\varphi_{Z'}$, $\theta_{Z'}$) at which maximum variance occurs represent the Vertical axis. Moreover, minimum variance will occur when other particular Pitch $\varphi$ and Roll $\theta$ values ($\varphi_{Y'}$, $\theta_{Y'}$) are close to the Lateral axis. This is a 3-D search. A search loop is executed and has an inner and outer loop for the two angle variables Pitch $\varphi$ and Roll $\theta$, or any other feasible computational search or search optimization method is used. The loops perform roll R* and pitch P* matrix multiplications (Appendix) using successive angle values of Pitch $\varphi$ and Roll $\theta$.

Asterisk (*) represents matrix multiplication, and the superscript letter "T" represents matrix transpose. Pitch $\theta$ and Roll $\varphi$ are each angles in the range [0:2$\pi$], i.e. zero up to but not including 360 degrees. Depending on embodiment, the electronic search can be arranged to search the entire range of both these angles, or only part of it for either or both of the angles $\theta$ and $\varphi$.

As the search proceeds, rotation through any particular pair of angles Pitch $\theta$ and Roll $\varphi$ delivers a scalar value from inner product Equation (3) in the search loop kernel, which delivers the acceleration component in that direction at a given time t of the acceleration data. The mean-subtracted variance is generated based on multiple such scalar values obtained over time t and that correspond to the same particular pair of angles Pitch $\theta$ and Roll $\varphi$ in the loop kernel. The variance of the acceleration component is thus measured and stored in association with the angle-pair to which that variance corresponds, whereupon the search finds the angle-pair ($\varphi_{Z'}$, $\theta_{Z'}$) that is associated with a maximum variance, and also finds the distinct angle pair ($\varphi_{Y'}$, $\theta_{Y'}$) that is associated with the minimum variance. These two angle pairs identify the orientation of the Vertical Z' and Lateral Y' pedestrian personal coordinate axes of FIG. 3E in reference to device coordinates of FIG. 3D. (In a system where processor performance permits and power dissipation is acceptable for running the correlation of FIG. 2 inside the search loop kernel, some embodiments filter the correlation of acceleration along each rotated axis with the acceleration magnitude and prior to the variance calculation for each angle pair of Pitch $\theta$ and Roll $\varphi$.)

In some embodiments, the search loop generates rotated scalar acceleration values [AccX(t), AccY(t), AccZ(t)] for all pairs of angles Pitch $\theta$ and Roll $\varphi$ from the accelerometer measurement data [AccX(t), AccY(t), AccZ(t)] for a first instant, whereupon the operations advance to the next instant, etc. The variance values are then generated for the respective angle-pairs. In some other embodiments, a time-windowed set of accelerometer measurements has been assembled, and the search loop operates on the windowed data as just described. Or alternatively with the time-windowed measurements, the search loop generates rotated scalar acceleration values measurement by measurement over the entire window for any one pair of angles Pitch $\theta$ and Roll $\varphi$ and immediately computes the variance, whereupon the operations advance through successive pairs of angles Pitch $\theta$ and Roll $\varphi$ operating analogously. (Note also that time t can be replaced by any monotonically-related value such as sample number s or the FIG. 2 degrees $\sigma$ into a stride.)

$$\text{Rotation}(t): [AccX(t), AccY(t), AccZ(t)] * [DirX, DirY, DirZ]^T \quad (3)$$

where:

$$DirX = \cos(\theta)\cos(\varphi) \quad (4X)$$

$$DirY = \cos(\theta)\sin(\varphi) \quad (4Y)$$

$$DirZ = \sin(\varphi) \quad (4Z)$$

A strategy explanation of Equation (3) is illustrated with FIG. 3D. As angles Pitch $\theta$ and Roll $\varphi$ are varied by the search process, a latest vector direction representing a candidate for Z' (Up) is generated. This latest vector direction is represented by the direction unit vector [DirX, DirY, DirZ]$^T$ in Equation (3). Equations (4X)-(4Z) are verified by inspection of FIG. 3D and represent the components of that direction unit vector in device coordinates. To find the acceleration component in that direction at a given time, an acceleration vector [AccX(t), AccY(t), AccZ(t)] is measured in those same device coordinates and pre-multiplies that direction unit vector using an inner product operation. The variance will be maximum in one direction Vertical=[$v_1$ $v_2$ $v_3$]$^T$ (and in a direction diametrically opposite as well) and a minimum in another direction Lateral=[$L_1$ $L_2$ $L_3$]$^T$ that is 90 degrees away in 3-D (and in its respective diametrically-opposite direction as well). Thus, FIG. 5 provides resolution blocks 150, 160 to supplement De-Tilt 130. (Additionally, some embodiments can also be arranged to approach the quarter-cycle phase relationship of FIG. 2 as closely as possible by adjusting the pitch and roll angles to minimize departure of the signed cross-correlation from zero as between the candidate Z' direction and X' direction. Candidate X'=Y' cross Z'.) See Appendix Equation (A-7).

Figure 6A:
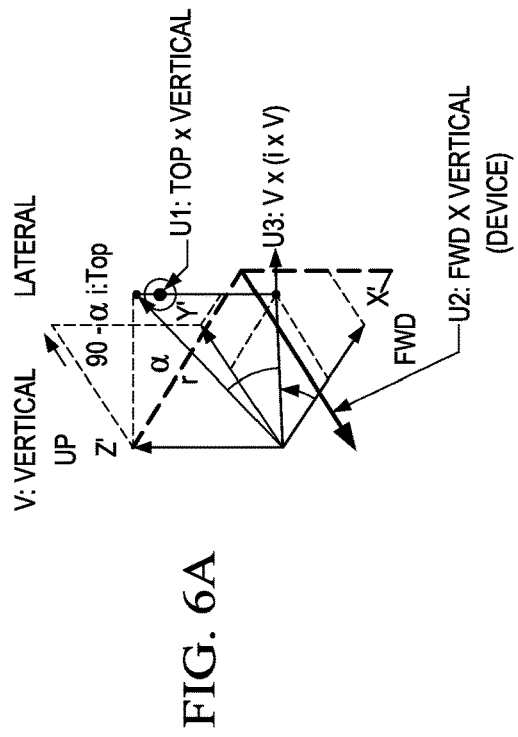
FIG. 6A is a vector diagram in pedestrian personal coordinates (X', Y', Z') signifying (Forward, Lateral, Up) and showing the mobile device Top vector pointed along a direction r, and FIG. 6A further showing unit vectors U1, U2, U3 that are expressable in mobile device coordinates (X, Y, Z) in Equations but suppressed in FIG. 6A, and those unit vectors are useful for electronically generating estimates of the attitude $\alpha$ (yaw) and describing process embodiments.
Figure 15:
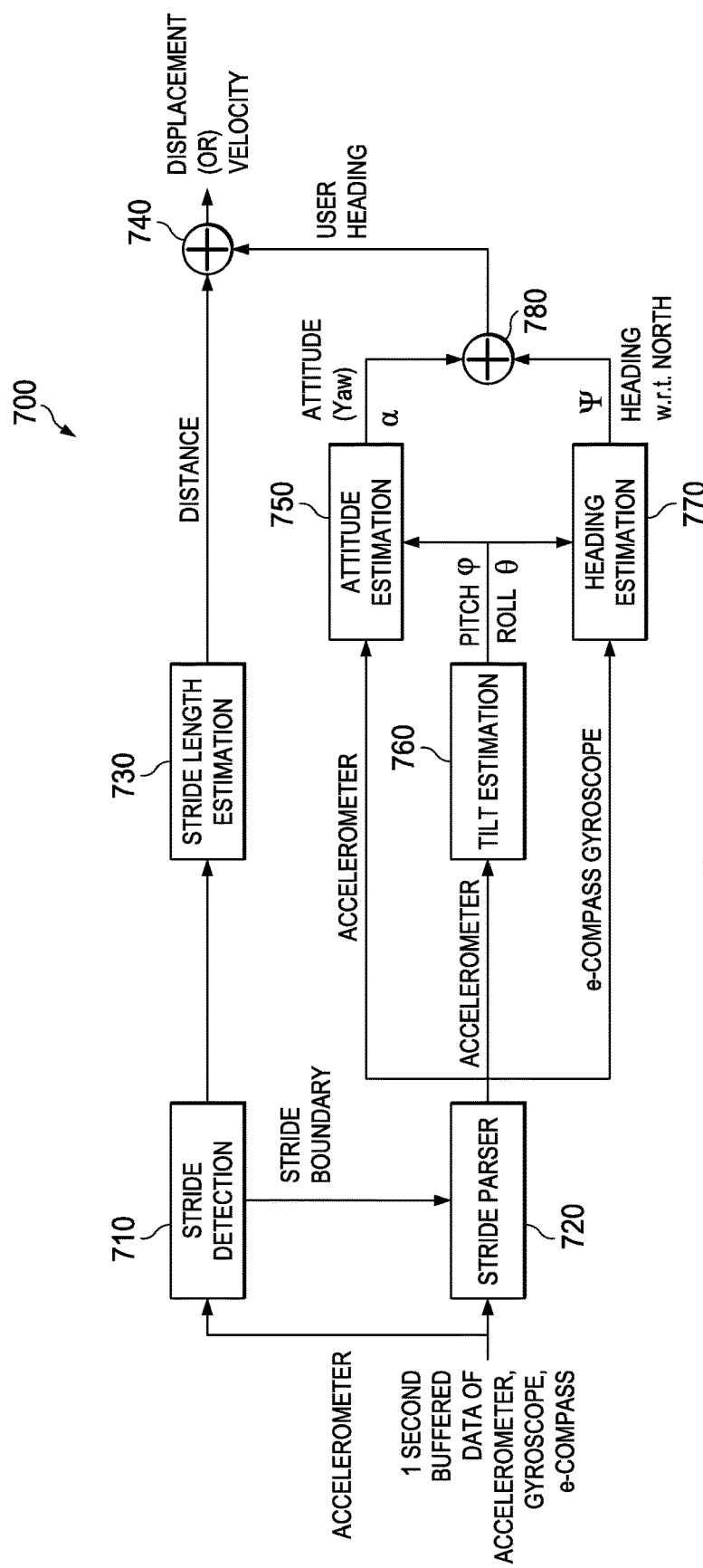
FIG. 15 is a flow diagram of a process embodiment for pedestrian navigation for use in FIG. 14 or FIG. 5 including and combining both a distance determination and a user heading determination.

Step 1.1.2: Determine Attitude α from Vertical and Lateral Axes:

This step 1.1.2 uses FIG. 6A to show how block 180 of FIG. 5 or block 750 of FIG. 15 can determine estimated attitude angle alpha from the results of 3-D search 210 of FIG. 6. Referring to FIG. 6A, notice that the vectors for Vertical and device Top define a first plane. Further, the vectors for Vertical and Forward (of pedestrian) define a second plane. The angle between the first and second planes is the Attitude angle α. The cosine of the Attitude α is equal to the inner product of unit vectors U1 and U2 perpendicular to the first and second planes. Accordingly, Step 1.1.2 forms those unit vectors based on cross products divided by their norms:

$$U1 = \text{Top} \times \text{Vertical}/\|\text{Top} \times \text{Vertical}\| = i \times V/\|i \times V\| \quad (5A)$$

$$U2 = -L = -[L_1 \, L_2 \, L_3]^T = \text{Fwd} \times \text{Vertical}/1 \quad (5B)$$

Notice that the vector cross product of Equation (5A) is uncomplicated not only because the Vertical unit vector $[v_1 \, v_2 \, v_3]^T$ is already determined in device coordinates by a variance-maximizing search in Step 1.1.1 but also because the Top unit vector, expressed by $i=[1\,0\,0]^T$, is one of the unit vectors designated for device 10 itself. Moreover, Equation (5B) obviates an electronic vector cross product computation because the Lateral axis was determined by a variance-minimizing search in Step 1.1.1 where the Lateral unit vector is formed. To form U2, only a sign reversal in Equation (5B) is introduced to the Lateral components in device coordinates. Equation (5A) is expanded using Appendix Equation (A-7) to yield Equation (5C):

$$U1 = [1\,0\,0]^T \times [v_1 \, v_2 \, v_3]^T/\text{Norm} = [0 \, -v_3 \, v_2]^T/\sqrt{v_2^2 + v_3^2} \quad (5C)$$

Step 1.1.2 processing then electronically completes the estimation of Attitude α as the inverse cosine of the inner product U1·U2 as represented using device coordinate values $v_2, v_3, L_2, L_3$ by Equation (5D):

$$\alpha = \cos^{-1}(U1 \cdot U2) = \cos^{-1}[(L_2 v_3 - L_3 v_2)/\sqrt{v_2^2 + v_3^2}] \quad (5D)$$

Equation (5D) is heuristically supported by considering a special case with Top i in the horizontal plane (device 10 horizontal as in FIG. 3C) and Fwd having an attitude α relative to Top. Let Out coincide with Vertical so $v_3=1$ and $v_2=0$, and $U1=[0\,-1\,0]$ (unity opposite to Left, i.e. Right). Lateral L components on the device axes are $L_1=\sin(\alpha)$ Forward, $L_2=\cos(\alpha)$ to Left, $L_3=0$ vertically. In Equation (5D), the Attitude is $\cos^{-1}[(\cos(\alpha)\times 1 - 0 \times 0)/\sqrt{0^2+1^2}]=\alpha$. $L_2 v_3$ is the operative numerator term. If device 10 is rolled around the horizontally-oriented Top axis so that Lateral coincides with Vertical instead, then $L_3 v_2$ is the operative numerator term instead and the same attitude result is obtained. Depending on the amount of Roll generally, both terms in the numerator ($L_2 v_3 - L_3 v_2$) can be nonzero.

The plus/minus sense of Attitude α is resolved, for instance, by using an IF statement based on condition (5E) or (5F) to check whether the vector cross product U1×U2 is in the same direction as Vertical V. In other words, attitude α has a sign that tracks the sign of the inner product of Vertical V with cross product U1×U2:

$$[v_1 \, v_2 \, v_3]^T \cdot \{[0 \, -v_3 \, v_2]^T \times [-L_1 \, -L_2 \, -L_3]^T\} \quad (5E)$$

Use a triple product identity V·(U1×U2)=(V×U1)·U2 to simplify attitude resolution condition (5E) to form pseudo-code (5F):

$$\text{IF } [((v_2 L_2 + v_3 L_3)v_1 - (v_2^2 + v_3^2)L_1) > 0] \text{ THEN } \alpha \leftarrow -\alpha \quad (5F)$$

With this embodiment version, the Attitude α is generated in the FIG. 5 navigation module 180 from the de-tilted coordinate axes determined by blocks 120-160. Also, this type of attitude estimation embodiment can be used to provide the Attitude α output of a module such as Attitude Estimation 750 of FIG. 15.

Alternative Step 1.1.1, or Example Method 2: Align pedestrian Vertical axis Z' to g (Earth's gravity vector in the Down direction). See also FIG. 6 step 220. If the biases are negligible, the Vertical axis can also be found by aligning the vector mean of 3-axis accelerometer measurements to gravity vector bold-g: g=(g, 0, 0), where g (in light-face type) is the magnitude of the Earth's gravity. Notice that a vector average (vector mean) over a stride or step period is thus used, and not a scalar. The computed vector average (vector mean) is the trio of scalar average of AccX, scalar average of AccY, and scalar average of AccZ. Dividing this trio of scalar averages by the magnitude of acceleration in Equation (8) and reversing all their signs yields a unit vector expressed by $V=[v_1 \, v_2 \, v_3]^T$ in the Vertical (Up) direction in device coordinates (X, Y, Z). Notice that this gravity-alignment vector-averaging operation resolves the direction of Vertical for block 150 and for comparison, resolution, and/or blending with the results of De-Tilt 130.

The magnitude Mag of the acceleration $\|A\|$ measured by the accelerometer is also called the norm and is defined in Equation (8). Note that the direction of the Vertical axis also corresponds to an equivalent angle pair ($\varphi_{Z'}, \theta_{Z'}$). See also FIG. 3D.

$$\text{Pitch } \varphi_{Z'} = -\sin^{-1}(\text{AvgAccZ}/\|A\|) \quad (6)$$

$$\text{Roll } \theta_{Z'} = \tan^{-1}(\text{AvgAccY}/\text{AccX}) \quad (7)$$

$$\|A\| = \sqrt{Ax^2 + Ay^2 + Az^2} \quad (8)$$

Equations (6) and (7) represent one way or example of electronically computing in a process. Other formulations may also be used. Note that Ax, Ay, Az respectively mean the same thing as X-axis scalar average acceleration AvgAccX, and Y-axis AvgAccY, and Z-axis AvgAccZ.

Equations (6) and (7) assume the user is standing still or walking at a constant average walking velocity, and that the device is held substantially steady with respect to the user during the time used for the aligning process. (To verify this, the electronic processing can suitably introduce an enable step that is either statically active or, in some embodiments, dynamically conditioned on an electronic determination that the average walking velocity is currently within an acceptable percentage range of being constant. Such determination, for example, generates and subtracts window-averaged forward velocities based on windows offset by a second or so of walking time, and checks whether the difference magnitude exceeds a threshold.)

Step 1.2: Determine the Forward and Lateral Axis of Motion:

Maximum Variance in 2-D Plane Yields Forward Axis

Step 1.2, Example Method 1A: One of the axes is determined first, say the Vertical axis as in step 210 and/or 220. Then the other two axes (Forward axis and Lateral axis) are de-tilted and thereby constrained to the 2-D plane orthogonal to the vertical axis determined in Step 1.1. In other words, the search in step 230 is conveniently constrained to a 2-D plane orthogonal to the Vertical axis, which can further economize processing time and processing power. A single-angle search loop is executed and has one angle variable for Pitch φ. The loop performs pitch P* matrix multiplications of Appendix I using successive angle values of Pitch θ.

Step 1.2, Example Method 2A:
De-Tilt the Acceleration Components AccX, AccY, AccZ by Equation (9).

$$(X', Y', Z') = \text{detilt}(AccX, AccY, AccZ, \theta, \varphi) \quad (9)$$

In the de-tilt result, the detilted acceleration in the direction of primed axis Z' is substantially equal to gravity vector g; and primed axes X', Y' are situated in the 2-D plane orthogonal to the Vertical axis Z'. For an electronic computational process example, the vector sum of the 3-axis accelerometer measurements in the accelerometer frame is generated and averaged over time. Since this vector average (vector mean) is a vector that approximates the downward acceleration due to gravity, it is designated the Vertical axis. The process generates a respective dot product of this Vertical axis vector with a given acceleration component AccX, AccY, or AccZ to generate three direction cosines for use as DirX, DirY, DirZ. These direction cosines are plugged in or trigonometrically converted into the values for the matrix multiplication P*R of the Appendix, Equation (A-4). For instance, $\sin(\varphi) = DirZ$ and $\cos(\varphi) = \sqrt{1 - (DirZ)^2}$. These values for $\sin(\varphi)$ and $\cos(\varphi)$ are substituted into the P*R matrix. This leaves angle θ as a free variable to be varied in the 2-D search described next.

Step 1.2A, Example Method 1B:
A 2-D search for the direction of maximum variance yields the Forward axis, while the direction of minimum variance yields the Lateral axis. This search (e.g. of FIG. 6 step 230) is analogous to the 3-D search described earlier hereinabove, except in 2-D. One way of doing the search Method 1B is to form P*R of the Appendix and execute an angle θ search loop using P*R*[AccX, AccY, AccZ]$^T$ as loop kernel. The search loop identifies the angle θ value (i.e. the Yaw angle for Step 1.2) at which maximum variance occurs, and the angle θ value of minimum variance which should be 90 degrees away. As noted earlier hereinabove, since the pedestrian's Forward and Lateral axes are orthogonal by definition, the process can generate a combined metric of distance of high variance from its maximum and distance of low variance from its minimum and search on angle θ for the value that minimizes that combined metric, thereby to find the orientation of these orthogonal two axes for Forward and Lateral. The angle $\theta_m$ value of maximum variance is substituted into matrix P*R of the Appendix, which is here designated [P*R]($\theta_m$). Performing a matrix product [P*R]($\theta_m$)*[AccX, AccY, AccZ]$^T$ yields Z' as Vertical axis, X' as the Forward axis, and Y' as the Lateral axis, all expressed in device coordinates. The Attitude angle alpha α is then equal to the angle value $\theta_m$ of maximum variance in the horizontal plane.

Some software code equations for facilitating such an electronic 2-D search are listed as follows:
div_seq=linspace(0,pi,180); % with 1 degree resolution
dir_cos=[cos(div_seq); sin(div_seq)];
ACC_vector=[AccX AccY]*dir_cos; % AccX, AccY are the axes in the horizontal plane (obtained after detilting)
ACC_var=var(ACC_vector);
[var_max indx_fwd]=max(ACC_var);
[var_min indx_lat]=min(ACC_var);
Yaw_fwd=-a tan 2(dir_cos(2,indx_fwd),dir_cos(1,indx_fwd));
Yaw_lat=a tan 2(dir_cos(2,indx_lat),dir_cos(1,indx_lat));

Step 1.2B. (Example Method 1C). Vector Cross Product Approach to Single-Angle Search in 2-D Plane (see FIG. 6 step 230) to Determine Attitude α:

The P*R process embodiment version and software code taught hereinabove are mathematically closely related to the vector operations of the process embodiment version in this sub-section. However, their expression in preparing an embodiment is sufficiently different in appearance that it is useful to describe various ways of expression.

Referring to FIG. 6A, Step 1.2B alternatively forms unit vectors U1 and U3 as basis vectors to define the horizontal plane, based on cross products divided by their norms.

$$U1 = Top \times Vertical / \|Top \times Vertical\| = i \times V / \|i \times V\| \quad (9A)$$

$$= [0 \; -v_3 \; v_2]^T / sqrt(v_2^2 + v_3^2)$$

$$U3: V \times (i \times V) / \|V \times (i \times V)\| \quad (9B)$$

Unit vector U1 points horizontally out of the page toward the reader in FIG. 6A. Notice that the vector cross product for U1 of Equation (9A) is uncomplicated not only because the Vertical unit vector $[v_1 \; v_2 \; v_3]^T$ is already determined in device coordinates by a gravity alignment alternative Step 1.1.1 (Method 2) but also because the Top unit vector, expressed by i=$[1 \; 0 \; 0]^T$, is one of the unit vectors designated for device 10 itself. The vector element positions are identified by subscripts 1, 2, 3 for Top, Left, Out. Unit vector U3 points horizontally and perpendicular to both Vertical V and unit vector U1 because Vertical V is crossed into U1 to form U3. To form unit vector U3 for electronic operations employing it herein, Equation (9B) is expanded using Appendix Equation (A-7) and a vector triple product identity V×(i×V)=$\|V\|^2 i - (V \cdot i)V$ to yield Equation (9C):

$$U3 = [v_1 \; v_2 \; v_3]^T \times \{[1 \; 0 \; 0]^T \times [v_1 \; v_2 \; v_3]^T\}/Norm \quad (9C)$$

$$= (v_1^2 + v_2^2 + v_3^2)[1 \; 0 \; 0]^T - [v_1^2 \; v_1 v_2 \; v_1 v_3]^T /$$

$$sqrt\left((v_2^2 + v_3^2)^2 + v_1^2 v_2^2 + v_1^2 v_3^2\right)$$

$$= [(v_2^2 + v_3^2) \; -v_1 v_2 \; -v_1 v_3]^T /$$

$$sqrt\left((v_2^2 + v_3^2)^2 + v_1^2 v_2^2 + v_1^2 v_3^2\right)$$

Step 1.2B processing then does a search on single-angle θ around part or all of a circle of directions in the horizontal plane, with a search criterion based on the variance of the component of the measured acceleration along the horizontal direction DirHz indicated by search angle θ. That horizontal direction DirHz is expressed as a vector-sum function of angle θ by Equation (9D).

$$DirHz(\theta) = U1 \sin(\theta) + U3 \cos(\theta) \quad (9D)$$

Equation (9E) expresses the component of the sampled, measured acceleration along the horizontal direction DirHz as an inner product:

$$Acc(\theta, t) = [AccX(t) \; AccY(t) \; AccZ(t)] \cdot DirHz(\theta) \quad (9E)$$

Equation (9F) expresses the variance of Equation (9E) acceleration component Acc(θ). Equation (9F) generates a mean-subtracted variance value Variance(θ) from samples n in a time window, with the search angle θ held constant in the variance computation. In words, the variance is generated in a loop kernel by forming the average of squares of mean-subtracted values of horizontal acceleration Acc(θ, t) in the direction indicated by angle θ. The average can be formed over time t represented such as by sample number.

$$\text{Variance}(\theta) = Avg[Acc(\theta, t) - \text{mean}(Acc(\theta, t))]^2 \quad (9F)$$

$$= 1/Ns \sum_{n}^{Ns} [Acc(\theta, n) - \text{mean}(Acc(\theta, n))]^{\wedge}2$$

The single-angle search increments, or otherwise varies, angle θ and finds the value $\theta_m$ of search angle θ at which the Variance(θ) of the measured acceleration component is maximum in a particular horizontal direction represented by value $\theta_m$. That particular horizontal direction is interpreted as being the Forward direction of pedestrian motion. Accordingly in Equation (9G), the sought-after Attitude α is set equal to that value $\theta_m$ i.e. a maximizing value $\theta_{max}$.

$$\alpha = \theta_m = \theta_{max} \quad (9G)$$

Some embodiments alternatively search on angle θ to find the value $\theta_{min}$ for the Lateral axis at which the Variance(θ) of the measured acceleration component is minimum in the horizontal plane, especially if experimental data indicates it has less error spread. In Equation (9H), an independent estimate of Attitude α' is then set equal to the sum of 90 degrees plus that value θ. (Notice that such experimental error data can be obtained by offline separately computing a conceptually distinct 'attitude variance' using squared differences of known attitudes subtracted from either Equation (9G) or (9H) attitude data obtained when the pedestrian walks with different known attitudes with respect to the device 10 heading.)

$$\alpha' = 90 + \theta_{min} \quad (9H)$$

Some embodiments concurrently search angle θ to find the respective values $\theta_{max}$ and $\theta_{min}$ for the Forward axis and Lateral axis at which the maximum and minimum of Variance(θ) occur. In Equation (9J) or (9K), a combined estimate α" of Attitude is respectively expressed by the arithmetic average or some weighted average if that is experimentally found to minimize estimation error. (A combined run-time estimate α" helps average out errors in or contributed by each of the attitude estimates α and α' to the extent that those errors are statistically independent and have comparable 'attitude variances' determined offline experimentally).

$$\alpha'' = \frac{1}{2}[\theta_{max} + (90 + \theta_{min})] \quad (9J)$$

$$\alpha'' = c_1 \theta_{max} + (1 - c_1)(90 + \theta_{min}) \quad (9K)$$

The Attitude from Equation (9G), (9H) or (9K) is output from a module such as Attitude Estimation 750 of FIG. 15, as determined by electronically executing operations represented by Equations (9A)-(9K) in this embodiment version. Thus, this embodiment version represents an alternative way of generating the Attitude α in the FIG. 5 navigation module 180 from the de-tilted coordinate axes determined by blocks 120-160.

The skilled worker picks any particular one(s) of the processes based on considerations of ease, accuracy, error-freedom of resolution of any angle ambiguity, overall processing burden, and power/energy consumption.

Note that all three pedestrian personal axes X', Y', Z' are machine-expressed as three-vectors in device coordinates X, Y, Z and the cross product actually represents the corresponding electronic operations on those three-vectors. See Appendix Equation (A-7).

Step 2: Do 0/180° Resolution—Determine Forward or Backward (Block 160):

Raw vertical and forward acceleration profiles of FIG. 1 appear to be too noisy to compute phase difference accurately for present purposes. Accordingly, in a substep (2.1), a first alternative (2.1.1) filters the raw vertical and forward acceleration profiles, if the step frequency or periodicity is known (see description later hereinbelow). In a second alternative (2.1.2), processing instead correlates the vertical and forward axes individually with the total magnitude of acceleration (∥Am∥, Equation (10)) over time as in FIG. 2. Correlation appears to yield desirably clean, smooth profiles. At this point in the process, the magnitude of acceleration is generated as the square root of sum of squares of the acceleration components $A_V, A_F, A_L$—for the Vertical, Forward, and Lateral axes.

$$\|Am\| = \sqrt{Av^2 + Af^2 + Al^2} \quad (10)$$

Note that the maxima of the correlation are noisy. Accordingly, for time determination of walking steps, some embodiments use and detect zero-crossings instead, which are much more sharply defined and determined in time and consequent radian angular position in the user's stride. The processing also generates and uses the average phase difference of both the rising and falling zero crossings, so that the processing thereby addresses and takes care of a scenario of bad duty-cycle. If the phase difference is close to 90°, the process has already determined the forward direction and no further determination is needed. Otherwise, if the phase difference is close to −90° (minus 90 degrees), the process reverses the direction computed thus far. With the direction reversed, the actual direction of motion is provided as output from the process.

Figure 7:
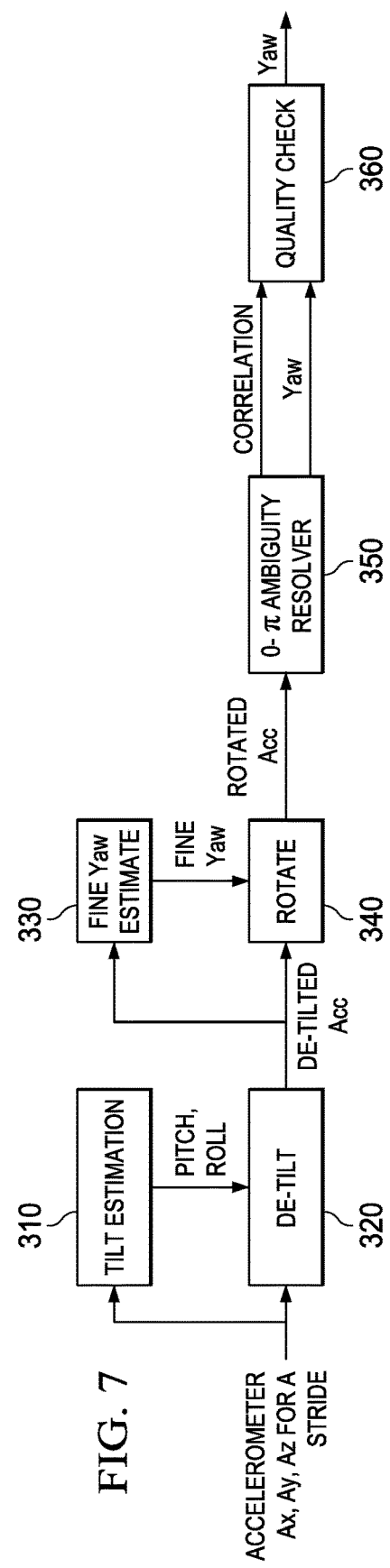
FIG. 7 is a flow diagram of another attitude estimation process embodiment.
Figure 14:
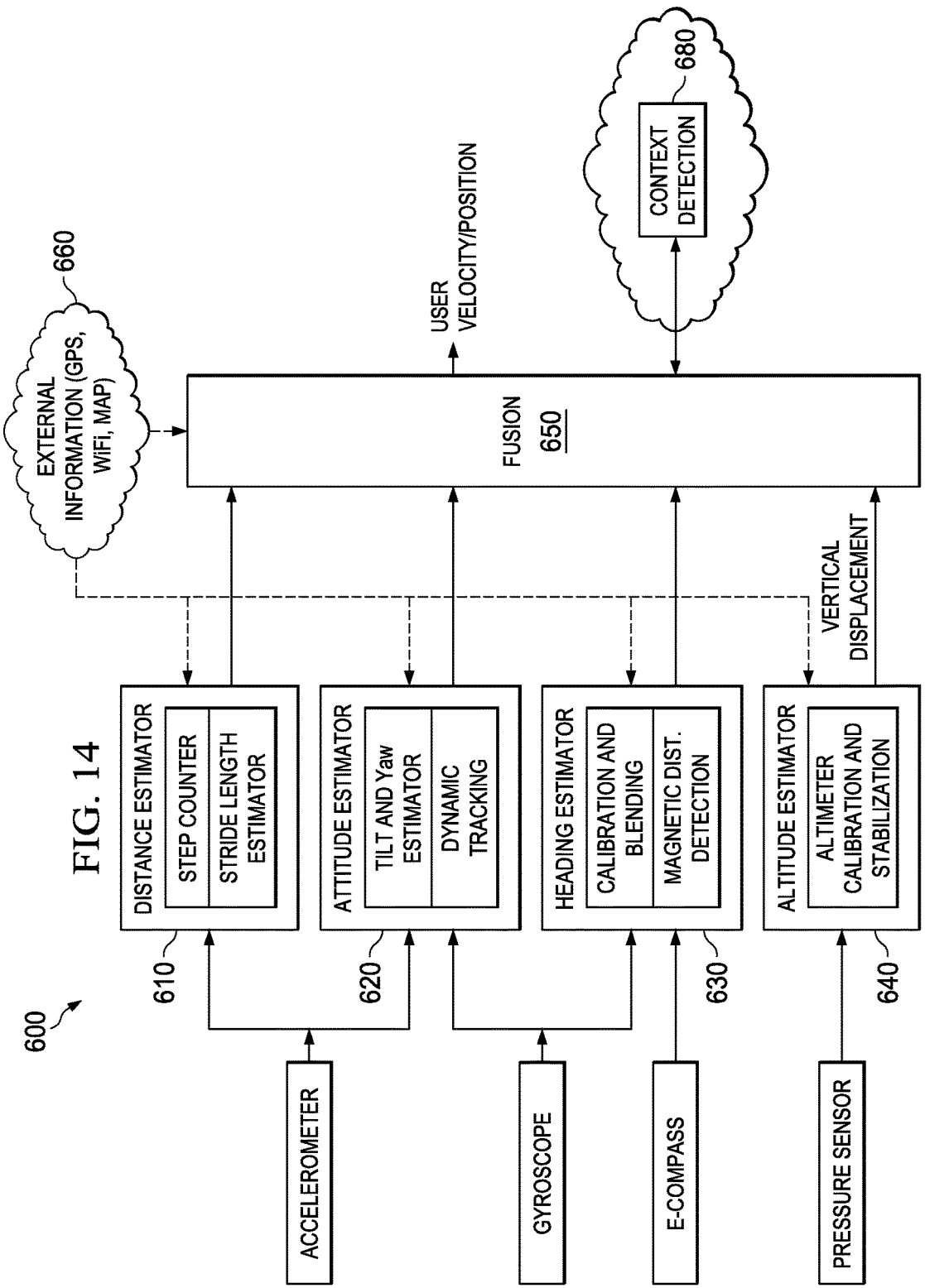
FIG. 14 is a block diagram of a mobile device or system embodiment for pedestrian navigation using several sensors, estimation modules, a fusion module, and context detection.

Turning to FIG. 7, an Attitude Estimation module 400 is detailed; see also FIG. 14 attitude estimation module 620 in a system 600, and FIG. 5 attitude estimation blocks 120-160). In FIG. 14, a pedestrian navigation embodiment includes an Attitude Estimator block 620 with modules for Tilt&Yaw (i.e., Pitch, Yaw) Estimator, and Dynamic Tracking Parameters include A) an Attitude Change Threshold (e.g., about 30°) for detection of attitude change for averaging, and B) an Attitude Valid Threshold (e.g., about 0.75) that helps check the level of correlation for determining whether a valid estimate is present.

Focusing more on FIG. 7, it parallels FIG. 5 regarding Tilt Estimation 310 (120) and De-Tilt 320 (130). De-tilted acceleration from De-tilt 320 is fed to both a Fine Yaw Estimate block 330 and a Rotate block 340 as input thereto. The Fine Yaw Estimate block 330 provides a Fine Yaw estimation output as a second input to the Rotate block 340. The Rotate block 340 provides an output RotatedAcc to a 0-π Ambiguity Resolver 350 that produces a resolved Yaw output as well as a Correlation output to a Quality Check module 360. The Quality check module 360 executes determinations on computed data as described in connection with FIG. 8 steps 450 and 480, and on sequences of such data for consistency, and otherwise as described elsewhere herein to provide and maintain a high-quality stream of attitude estimations. The herein disclosed quality checks used by the Quality Check module 360 beneficially provide moderate constraints on, or corrections or adjustments to, the processed accelerometer data that are reasonable in view of the physical and kinesiological properties of the human body and experience with walking motions and actual observed patterns of pedestrian data. Different embodiments can use different sequences of processing and circuitry connections as indicated by comparing FIGS. 7 and 8, among other Figures herein.

Figure 8:
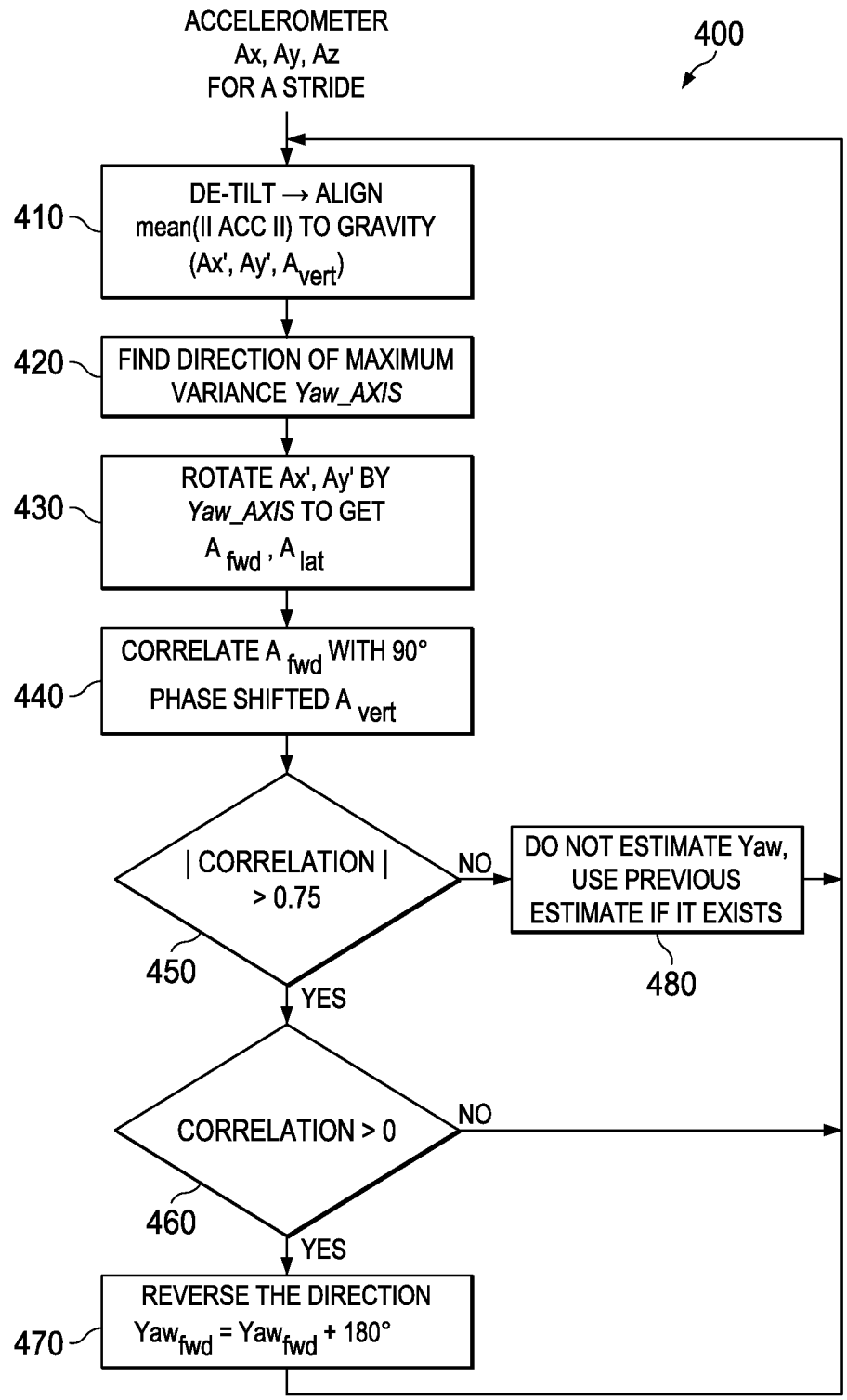
FIG. 8 is a flow diagram detailing another attitude estimation process embodiment.

In FIG. 8, an Attitude Estimation process embodiment for use with the FIG. 5 or 14 Attitude Estimation module remarkably and operates in a Detilt step 410 to find axes (Ax', Ay', Avert) such that variance of acceleration is minimum along the lateral direction Ay' of motion, and is maximum along the vertical axis Avert. Then with electronic analysis constrained to the horizontal plane, a step 410 recognizes the variance is maximum along the forward direction. Step 410 electronically determines that Forward direction (Ax', Yaw axis, $\alpha=\theta_m$). Once the Forward axis is determined in step 410, the circuitry determines if the sensor is oriented in the forward direction or the reverse (0-π ambiguity), since the Vertical acceleration profile leads the Forward acceleration profile by 90° in phase (see FIG. 2).

In FIG. 8, to find the Forward direction of maximum variance, process embodiment 400 operates on packets of data (window) of e.g. about one (1) stride according to the following steps in TABLE 1.

tion. Attitude estimation in some embodiments is delivered by processing accelerometer data without other sensors like gyroscopes in them, which enables use in less expensive mobile devices with advanced attitude estimation performance.

Testing for desired attitude estimation and dynamic attitude tracking operations in pedestrian navigation is suitably accomplished by controlled and instrumented testing procedures. Accurate attitude estimation without gyroscopes or with only the accelerometer inputs enabled is a useful testing criterion. Controllably increasing Lateral acceleration variance, such as by subjecting the accelerometers to it or by sending different recorded acceleration input signals, should cause the estimated direction (attitude, yaw) to change. Another test step artificially introduces signal streams representing measurements such that the Vertical acceleration profile (e.g., voltage vs. time) leads or lags the Forward acceleration profile, and each may be correlated beforehand. The detected direction should reverse in response to the change between lead and lag, to indicate operation of the (0,

TABLE 1

ATTITUDE ESTIMATION PROCESS EXAMPLE 3

Detilt the data in step 410 based on assumption that acceleration in the horizontal plane is negligible compared to gravity g.
Filter the acceleration to retain only the step-frequency component of the acceleration (to remove the harmonics and sub-harmonics of step-frequency)
Find the direction of maximum variance in the horizontal plane, by step 420.
A succeeding step 430 rotates measured accelerations Ax' and Ay' by the angle alpha to electronically generate forward and lateral acceleration values Afwd and Alat.
Step 440 further checks for unreliable data by a suitable metric of similarity to FIG. 2 waveforms for which Δσ=90 degreees. If low, operations then branch from step 450 to step 480 at which the estimated yaw is considered to be incorrect and not used further. Instead, step 480 either uses an earlier yaw estimate if available, or waits until the yaw is estimated, and back-propagates it. Operations go from step 480 to the beginning of the process 400 to electronically process another stride of accelerometer data.
If at step 450 the reliability is deemed adequate, then operations proceed to a decision step 460 that resolves 0-180 degree ambiguity.
If the estimated Yaw differs from the existing average Yaw (e.g., determined from a predetermined number of previous Yaw measurements), by more than a Threshold value, then operations electronically validate the Yaw change with or by comparison to any detected significant change in Gyro measurements (if any are available, accumulated over a stride) within the last few (e.g. 5) strides, else ignore the Yaw change. Compare Quality Check 360 of FIG. 7.
If there is no significant Yaw change, then estimated Yaw is used for averaging to update the existing average Yaw.
Then operations loop back from either step 470 or step 460 (No), whichever is applicable, to the beginning of the process 400 to electronically process another stride of accelerometer data.

In summary, some of the attitude estimation embodiments perform attitude estimation in response to input data representing a user walk profile. The attitude (yaw) α is derived by maximizing variance of acceleration, or some embodiments minimize that variance or do both. Resolution of the bidirectional ambiguity (0, π) is obtained by determining when the vertical acceleration leads or lags the forward acceleration by 90° (π/2 radians). Moreover, the navigation attitude of the user can be tracked dynamically. Noisy acceleration profiles are suitably smoothed in some embodiments by correlation processing method embodiments. The various embodiments can feasibly, advantageously, and economically operate with good accuracy using a low-cost, low performance MEMS accelerometer for pedestrian naviga- π) bidirectional ambiguity resolver process. Other tests are facilitated by introducing artificial measurements from the sensor suite into the navigation embodiment and looking for the response operation to be expected from the circuitry embodiment and its electronic processing methods. One simple test is performed by holding the accelerometer sensor and portrait or landscape mode and then checking to see that the attitude measuring device can determine (e.g. in either mode) if a user is walking in a same north or south direction, or in an east or west direction.

Turning to FIGS. 9-13 and Step Detection, a system and process embodiment provides a low cost MEMS 3-axis accelerometer (X,Y,Z axes) to perform the operations listed in TABLE 2. See also blocks 170 and 175 of FIG. 5.

TABLE 2

PEDOMETER PROCESS EXAMPLE 1

1. Compute the norm (or the magnitude), (Acc_Norm) of the acceleration vectors (Acc_X, Acc_Y, Acc_Z). The norm is independent of the orientation.
2. A sliding window of Acc_Norm is correlated with a reference window of Acc_Norm. Mean is subtracted before correlating, (it is also called covariance), to keep the output centered around zero. Such mean subtraction also more nearly ensures the process is independent of accelerometer biases. The correlation output is independent of spikes present in most accelerometer walk profiles, enabling easy zero crossing detection.
3. A zero crossing detection (or peak detection) on this correlation output is used to determine steps.
4. Additionally, a check on periodicity is done such as to check if the left leg step and right leg step periods are almost equal. This promotes robustness of accurate step detection in different use scenarios and avoids false detection when the periods are not sufficiently near equality.
5. A stride (2 steps) is correlated with the next stride, instead of a step, because the left leg step profile can be different from the right leg step profile in some normal walking gaits.

Such embodiment is independent of accelerometer's bias and gain variations and noise, so error does not grow with square of time. Such embodiment is independent of the orientation of the accelerometer, as against solutions which rely on forward acceleration, and does not use a zero (or a mean) crossing of accelerometer measurements themselves, which is subject to false detection, even if the user is not walking. Such embodiment is able to detect slow walk steps, where other pedometers are believed to fail, and detects steps properly even in presence of dominant harmonics. Among other advantages of such embodiments, the detection is robust because it does not detect false steps, if the user is not walking, and can be used as a context detection of whether the user is walking or not. Such embodiment is independent of orientation of the accelerometer and independent of accelerometer bias and gain variations and noise.

Some of the embodiments provide a remarkable step detection process and structure 170 using correlation of accelerometer measurements. To solve the above-noted problems, some embodiments recognize that for typical pedestrian user dynamics, the accelerometer measurements across strides are similar. A stride includes both a right step and a left step. A stride can be measured right-left-right or left-right-left. Some of the embodiments exploit self-similarity of strides to determine the number of steps.

Figure 9:
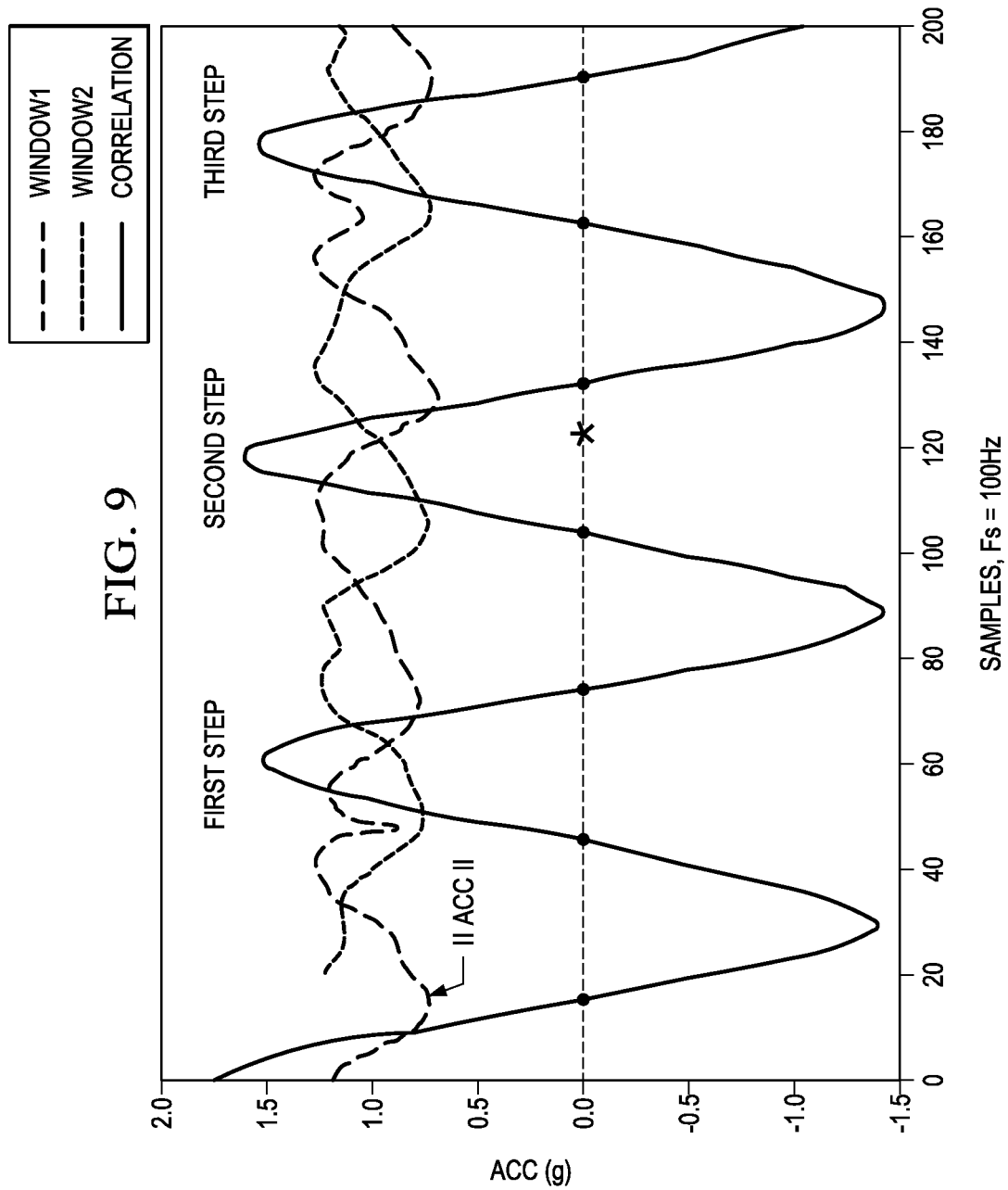
FIG. 9 is a graph of magnitude of pedestrian measured acceleration and auto-correlation versus time-wise sample number.
Figure 13:
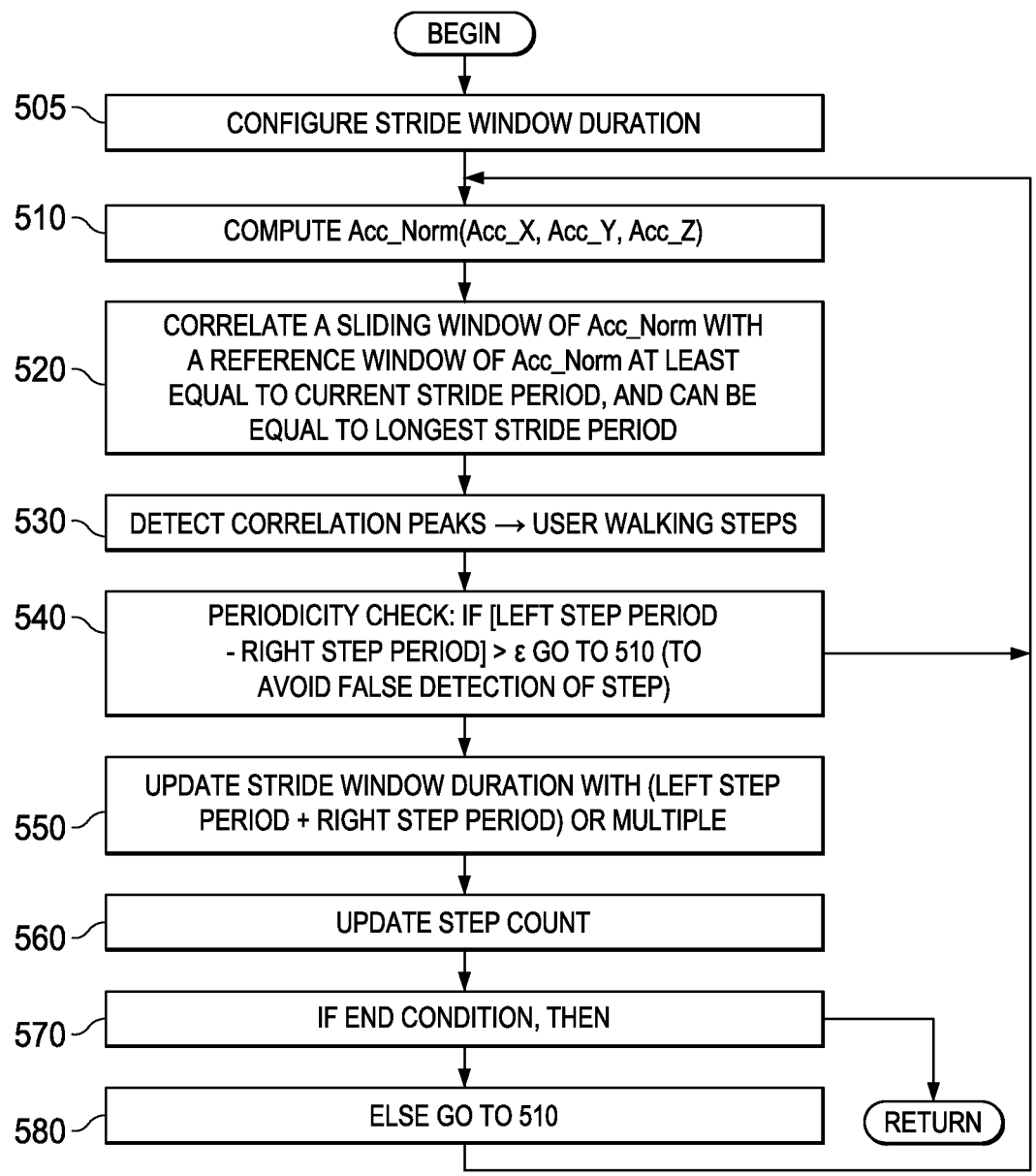
FIG. 13 is a flow diagram of a pedometer process embodiment among several examples given.

Using a correlation-based process such as in FIGS. 9 and 13, a category of such embodiments performs self-correlation of the acceleration profile and computes the number of peaks. According to such process embodiment, electronic processing in a first step (1) generates the magnitude (norm) ‖A‖ of 3-axis accelerometer measurement inputs Ax, Ay, Az or coordinate axes x, y, z, according to Equation (15), repeated in substance here. This process makes the stride solution independent of the orientation of the accelerometer in the mobile device.

$$\|A\|=\sqrt{Ax^2+Ay^2+Az^2}$$

A second electronic step (2) executes a sliding window self-correlation on that magnitude ‖A‖, as shown in FIG. 9. A pre-set window size is used for initial step detection after rest. Then the process correlates ‖A‖ for a stride with that of the next stride. Stride-based cross correlation is employed to obviate variation as between the right leg step and left leg step individually. This correlation output is independent of spikes present in most accelerometer walk profiles.

A third electronic step (3) counts the number of peaks. The occurrence of peaks indicates steps, and so the estimated number of steps is electronically generated equal to the number of peaks.

Figure 10A:
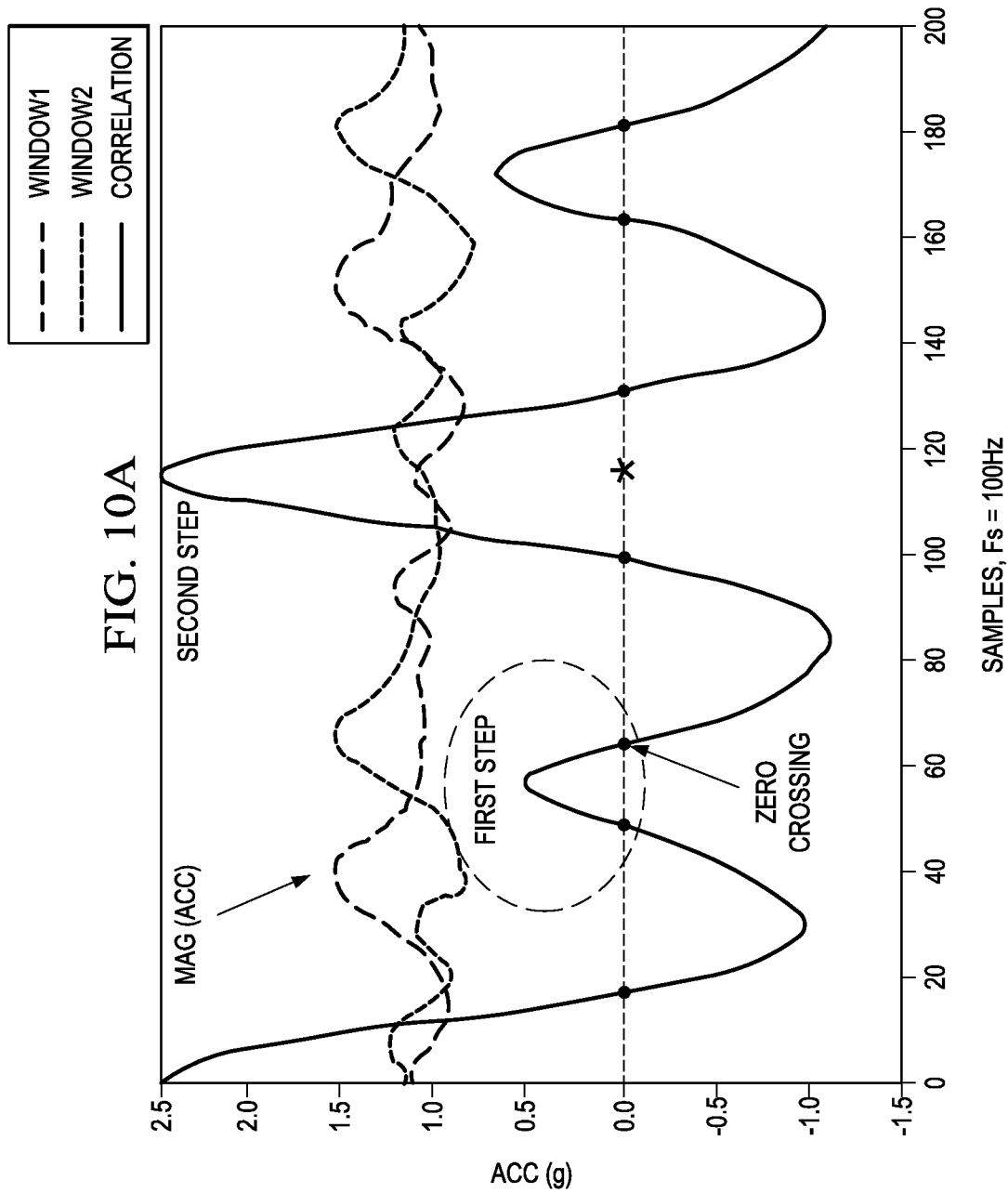
FIG. 10A is another graph of magnitude of pedestrian measured acceleration and auto-correlation versus time-wise sample number, in normal walking with hands swinging.

Alternatively, see FIG. 10A, a zero-crossing detection on the correlation output from electronic step (2) is executed to determine and detect steps. Zero-crossing detection is useful because it does not depend on comparison of a peak with a threshold. The peak may be a valid peak but too low for a given threshold, and thus is not detected. On the other hand if the threshold is set too low, false indications of steps may be output. Zero-crossing detection might also be subject to zero crossings due to sufficient-amplitude, higher frequency components inconsistent with the actual periodicity of stride, so periodicity checking in post-processing is introduced according to a step (2A) as described later hereinbelow. Nevertheless, using either peak detection or zero-crossing detection on the electronic cross correlation of the acceleration magnitude, rather than the raw acceleration inputs or some mean (average) thereof, substantially reduces false detection of artifacts which can be present even if the user is not walking.

In FIG. 10A, analogous waveforms represent acceleration magnitude measurements and the multistep cross correlation output under a scenario of normal walking by a user with swinging hands. The interaction of swinging hands and stride produces variations in amplitude, but stride period remains regular and readily detected by zero crossing detection.

Figure 10B:
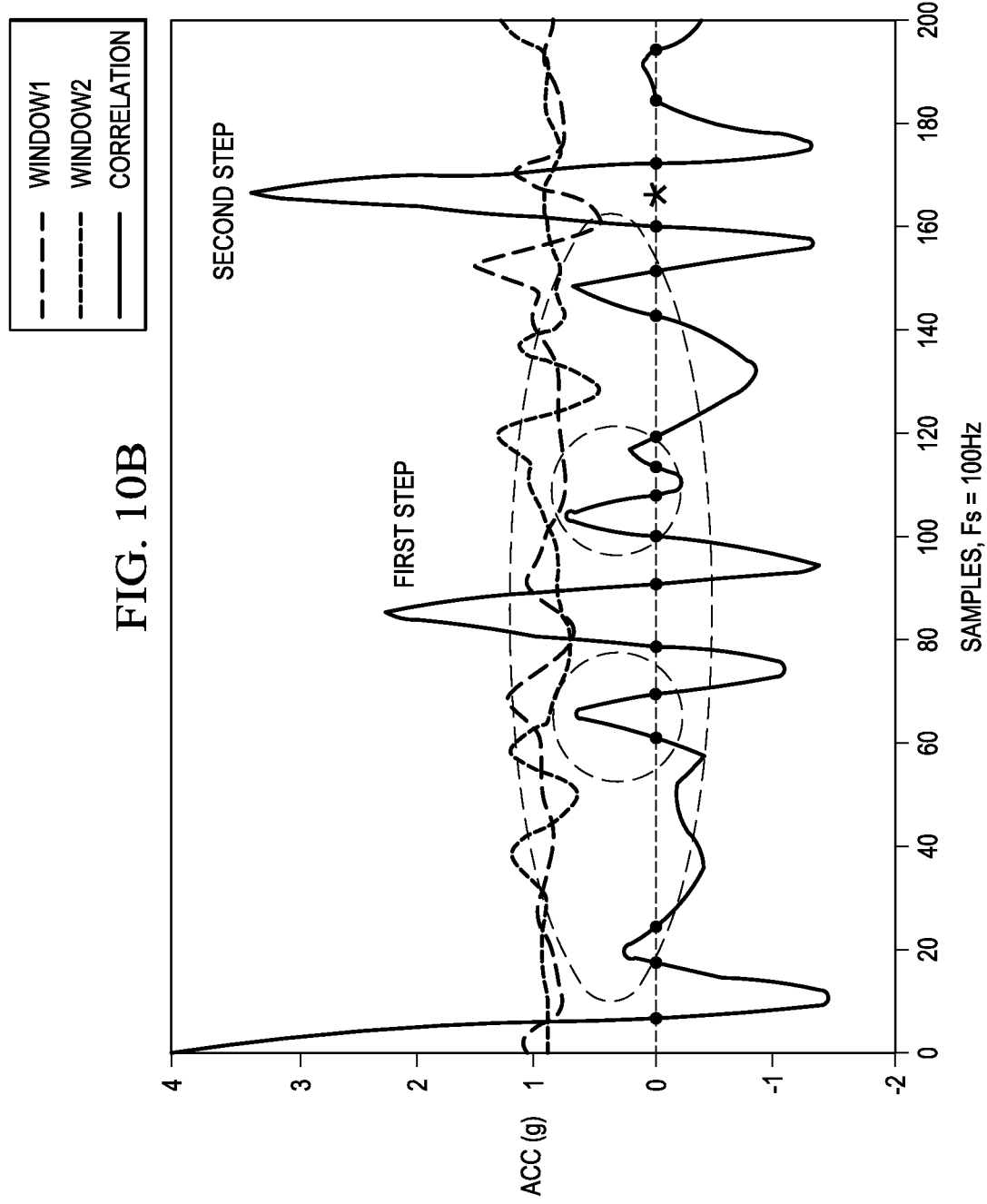
FIG. 10B is another graph of magnitude of pedestrian measured acceleration and auto-correlation versus time-wise sample number, in slow walking with belt-mounted accelerometer.

In FIG. 10B, a challenging scenario of slow walk by a user with accelerometer on belt shows considerably more variation in the amplitude of correlation peaks so that threshold-based detection might also detect false peaks or miss a peak, as indicated by the small circles around low amplitude peaks in FIGS. 10A and 10B. Accordingly the process includes an intermediate step (or steps detailed in FIG. 19) that processes a wide window of the correlated data from FIG. 10B (see wide oval in FIG. 10B) and thereby electronically executes a consistency check of periodicity between a first step and a second step, or between consecutive steps. Harmonics in the step waveform are rejected and thereby the robustness of the step measurement process is improved. In this way, the process then cross correlates the magnitude of acceleration of every two steps with that of the successive two steps (instead of one step) to increase the reliability of measurement, as the right step and the left step could vary in duration. The check on periodicity suitably determines whether the left leg step period and the right leg step period are within a specified percentage of being equal. Left steps in separate strides are correlated with left steps, and right steps in the strides are correlated with right steps. Moreover, the periodicity check eliminates false detection of irregular or occasional side-to-side accelerations even though the acceleration magnitude of Equation (2) is independent of accelerometer orientation.

Also, some embodiments execute the electronic process steps in parallel with each other, or in a pipelined manner or otherwise, and feed updates of parameters such as periodicity to follow increasing and decreasing speed of walking.

Figure 11:
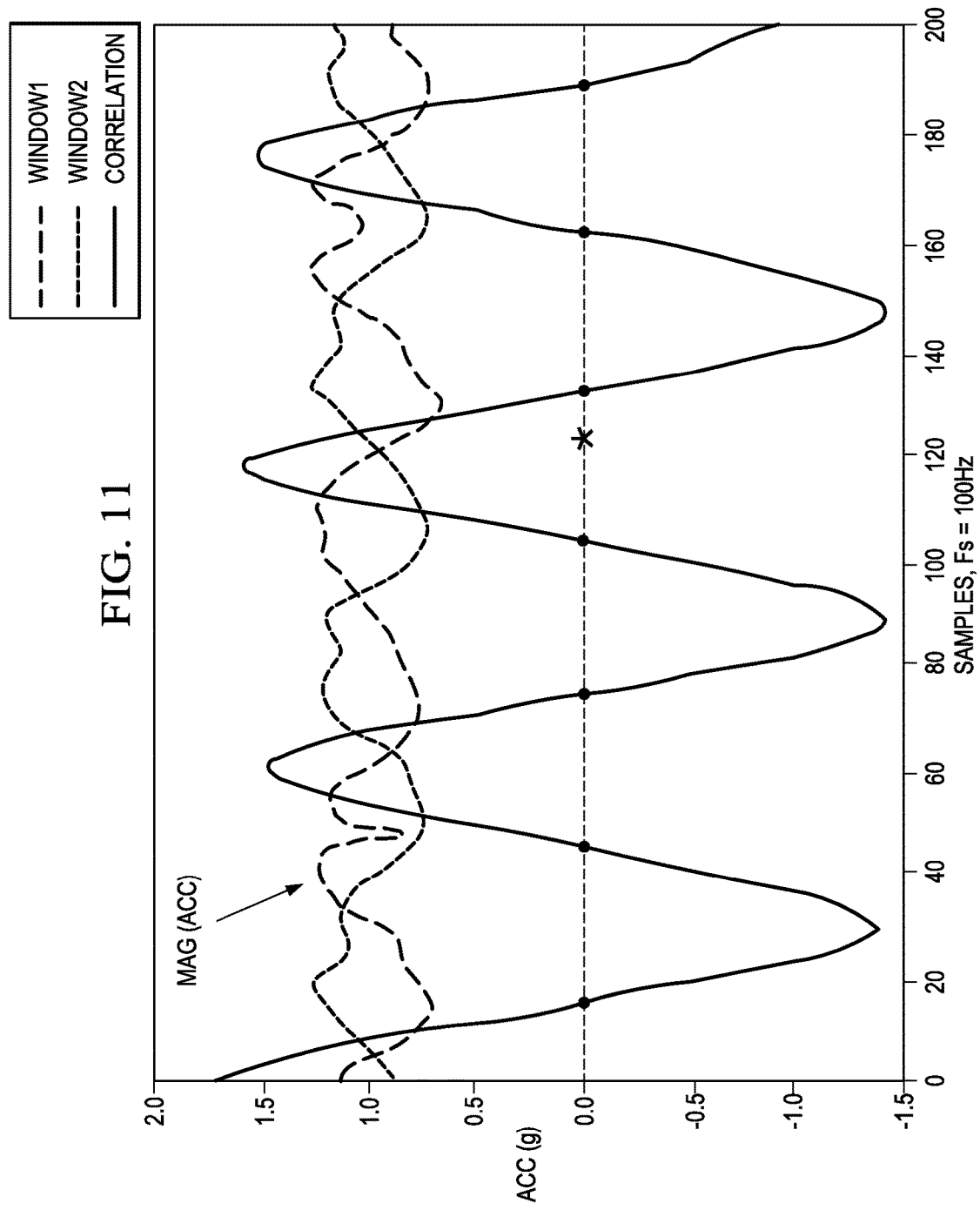
FIG. 11 is another graph of magnitude of pedestrian measured acceleration and auto-correlation versus time-wise sample number, in normal walking with accelerometer in a shirt pocket.

In FIG. 11, analogous waveforms represent the scenario of normal walking by user with the mobile device/accelerometer in a shirt pocket. The self-correlation output is strong and regular in both period and amplitude.

Figure 12:
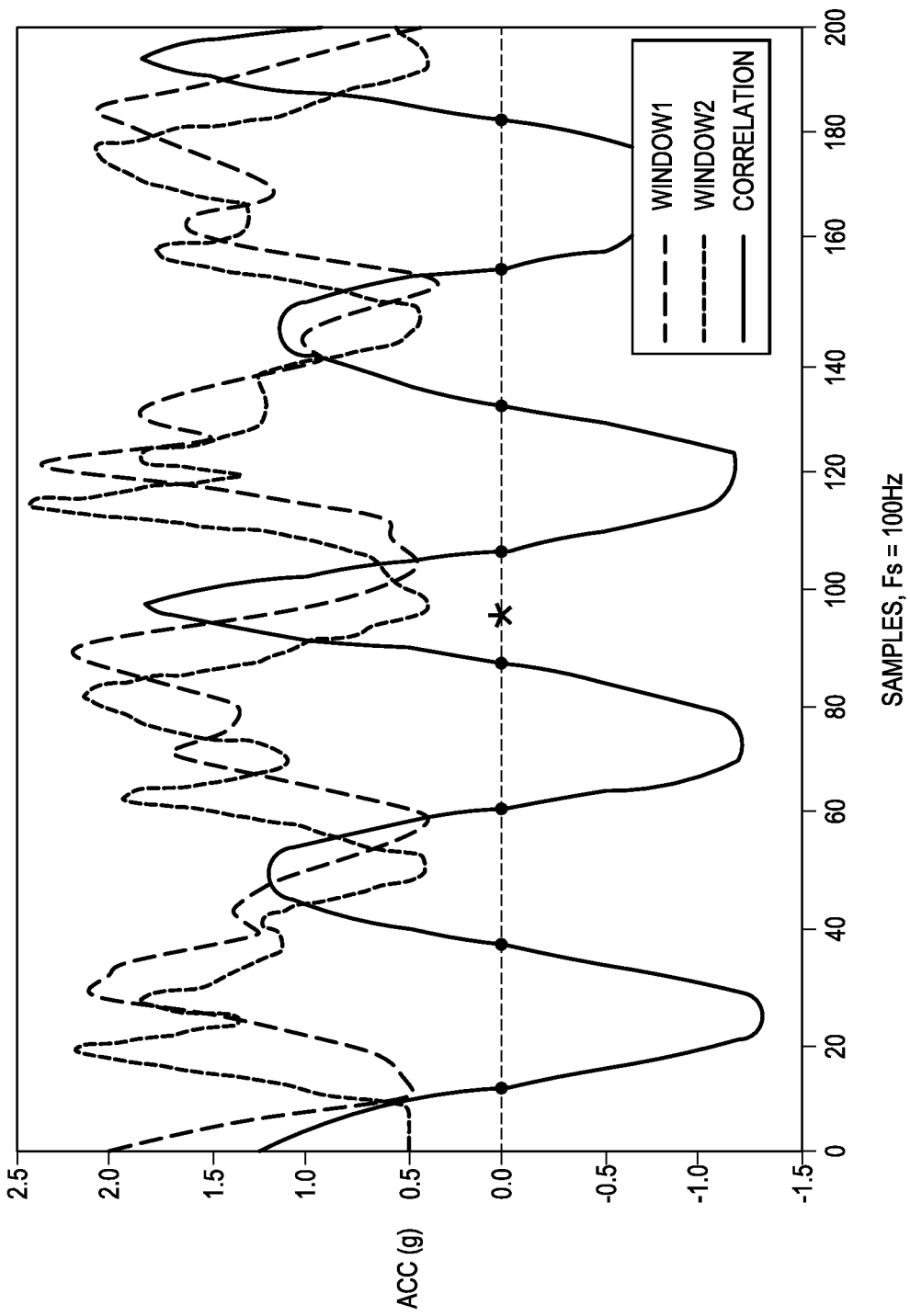
FIG. 12 is another graph of magnitude of pedestrian measured acceleration and auto-correlation versus time-wise sample number, in fast walking with belt-mounted accelerometer.

In FIG. 12, analogous waveforms represent the scenario of fast walking by user with the mobile device/accelerometer on a belt. Again, the self-correlation output is strong and regular in both period and amplitude.

An electronic embodiment was compared for step count and error percentage against three commercially available pedometers. The step count was same or more accurate in normal walk scenarios involving belt-worn, shirt-worn, trouser-worn, chest-mounted, and swinging arms. The average errors in step count for different rates of walking for the embodiment were: Normal—0.6%, Fast—2.3%, Slow—5.5%. Under the slow-walking scenario, the error rate of the embodiment was far less than in all three of the commercially available pedometers. The step detection embodiment of circuitry and process thus appears to have a consistent and robust performance over a variety of scenarios. Such embodiments detects steps correctly or appropriately even in the presence of dominant harmonics. Detection is independent of the orientation of the accelerometer and is robustly resistant to accelerometer bias, gain variations and noise. Such embodiments overcome a trade-off that otherwise might be considered insoluble in conventional pedometers—avoiding false detections of steps while at the same time being able to detect steps during slow walking in which the acceleration amplitudes are small.

Step detection performed by correlation thus appears to outperform simple threshold-crossing detectors that can be prone to false detections. Moreover, step detection effectively cross-correlates adjacent strides (2 steps or more at a time) which promotes reliability, as the duration of the right step and the left step individually could vary. Furthermore, an additional periodicity check in a process embodiment checks as between right and left step. Step detection is performed by electronic analysis of the acceleration magnitude profile window-wise instead of detecting steps from the instantaneous measured acceleration magnitude itself.

In FIG. 13, a pedometer process example 2 commences with a Step 505 that configures stride window duration. Then a Step 510 computes overall acceleration magnitude Acc_Norm(Acc_X, Acc_Y, Acc_Z). A succeeding Step 520 correlates a sliding window of Acc_Norm with a reference window of Acc_Norm at least equal to current stride period, and some embodiments may make it equal to longest expected stride period. (A longer window holistically comprehends more data from which to detect the strides, and a less-long window provides a possibly-finer resolution such as for combining step data with attitude estimation and varying walking directions.) Correlation peaks correspond to user walking steps. A further Step 530 finds such peaks by any appropriate procedure such as finding maxima directly, or detects zero crossings of the correlation by which the times of user walking steps are identified from next-previous peak, or instead even are identified from and attributed to the zero crossings. A decision step 540 electronically executes a periodicity check wherein: IF |Left step period−Right step period|>ε Goto Step 510. This means that the magnitude of difference between the right and left step periods is checked to determine if it is more than an amount epsilon ε that would be expected of sufficiently-similar periods. If so, the FIG. 13 process loops back to Step 510 to avoid a false detection of a pedestrian step. If periodicity check of Step 540 is OK (passing), then a Step 550 updates a stride window duration value. Step 550 generates this stride value or proxy for it in any appropriate electronic procedure based on the detected walking steps or periods. A stride is two steps, and a step period is basically half a stride period. The process embodiments can even determine which is left and which is right. So, the interval between a first two valid correlation peaks is one step period, and interval between the subsequent two valid correlation peaks is the second step period, and addition of these two step periods is one stride period. 1 stride=1 left step+1 right step. Left step period is, e.g., the time interval between right step peak and subsequent left step peak, and right step period is the succeeding time interval between left step peak and subsequent right step peak. The sum of these periods is a stride period. The stride duration or period can thus be generated directly from intervals between correlation peaks that validly represent corresponding step events. Or stride averaging can be used with (Left step-to-Left-step period+Right step-to-right-step period)/2 or represented by a proxy value involving some multiple thereof. Then a process step 560 updates a pedestrian step count. A Step 570 determines if an END condition is reached, such as the application or whole device is being de-activated or turned off. If End condition is present, then RETURN, Else Goto Step 510 in a Step 580.

Various embodiments estimate the number of steps in a pedestrian navigation system on the basis of user walk dynamics. A step detector electronically employs self-correlation of accelerometer measurements across a specified sliding time window. One type of embodiment sets the time window interval to at least one stride duration. The window interval is suitably configured statically in one version, and in another version the time window interval is adjusted dynamically to encompass the desired number of one or more strides. Still another alternative embodiment electronically performs the self-correlation over the time window interval of each single step, such as an average step duration. It is believed that about one stride duration of window width represents a good tradeoff.

Another aspect of an embodiment tests periodicity of the cross-correlation peaks between left step and right step for consistency to mitigate false detections of steps. Robust detection and automatic analysis of self-correlation trigger pulses to the self-correlation based step detector are executed to detect and differentiate contexts as between vehicular and pedestrian scenarios. The embodiments can be useful not only with more expensive accelerometers but also with low-cost, low performance MEMS accelerometers for pedestrian navigation sensing. In this way, self-correlation peak-detecting embodiments perform better than simple threshold-crossing detectors that are more likely prone to false detections of user steps.

The embodiments are suitably tested by checking the measurement of total number of steps and detection accuracy as above. Further controlled and instrumented testing procedures are suitably conducted to artificially introduce measurement inputs as if from a 3-axis accelerometer, such that the acceleration profile is not correlated, but is significantly high or low to cross or not-cross possible thresholds. If steps are not detected, the self-correlation process embodiment is likely operating properly for step detection.

Also, an artificial waveform for testing can make the right step and left step significantly different in their step duration. If steps are not detected, this will indicate that the automatic periodicity checking described for some of the embodiments is probably operative. Note that many other experiments are feasible by artificially moving an actual 3-axis accelerometer in ways representing non-walking scenarios or introducing artificial measurements and/or recorded measurements from the sensor suite into the personal navigation embodiment under test.

Some embodiments also can be configured statically or dynamically to learn the step and stride dynamics of the particular current user to still further improve step counting accuracy and reduce error rate for users with usual dynamics. Electronic estimation of step-length is suitably refined statically or dynamically according to available physiological models based on height and stride frequency, and calibration can also be checked and adjusted when the user walks in a straight line, the length of which can be measured with good accuracy over sufficient distance when the quality of GNSS satellite fix is good.

When the user is on a treadmill, some embodiments are simply turned off either by user or by automatic sensing of some electronic indication or code applicable to the treadmill apparatus itself. Other embodiments are kept on and integrate the accelerometer outputs involved in getting and off the treadmill with the body-generated accelerations while on the treadmill, and velocity and position estimations are substantially accurate.

Moreover, such embodiments can be employed by users with unusual step and stride dynamics such as due to neurological or neuro-muscular injuries, or other conditions. In that case, the automatic periodicity checking is also used to detect the unusual stride dynamics and output information about it. The latter types of embodiments suitably also introduce post-processing to detect changes in stride dynamics from expected to unexpected patterns indicative of attention by a caregiver or medical professional. Other such embodiments have a display interface or data interface to provide a feedback response to the user or analyst that may be useful in maintaining a serviceable walking gait in case of diminishing walking ability, or in re-learning to walk if walking ability has been temporarily lost. Accordingly, sensor-aided pedestrian navigation embodiments can enhance volume products for pedestrian navigation, as well as specialized configurations or products for users with impaired stride.

FIG. 14 shows a block diagram of another pedestrian navigation sensor engine 600. A sensor suite includes an accelerometer, a gyroscope, e-compass, and a pressure sensor. A set of estimation modules includes a distance estimator module 610, an attitude estimator module 620, a heading estimator module 630, and an altitude estimator module 640. A fusion or blending module 650 combines the information from the estimation modules and delivers various outputs including user velocity and position. The estimator modules and the fusion module suitably are provided with any available external positioning and/or mapping unit 660 information such as from GPS, WiFI, and/or Map database. Context detection 680 also suitably provides input to the system 600 such as determining modes for the fusion module 650 to operate the processes and circuitry according to such modes depending whether the user is walking, running, sitting, riding in a vehicle, riding in an elevator or some other context and then performing navigation computations for that context or mode. Context detection 680 suitably also includes signal lines from, or parts of, distance estimation 610 and attitude estimation 620 that determine whether the accelerometer measurements are indicative of pedestrian walking. If so, then context detection 680 and fusion module 650 cooperate for delivering output data in a pedestrian navigation mode. If the measurements do not indicate pedestrian walking, then context detection 680 determines another mode for fusion module 650 to execute the appropriate navigation mode.

In FIG. 15, a block/flow diagram of a processing module 700 shows buffered data from the sensor suite of FIG. 14 provided to each of two electronic blocks or process modules: 1) Stride Detection 710 based on accelerometer data, and 2) a Stride Parser 720. Stride Detection block 710 provides stride boundary signals to the Stride Parser 720. Stride Detection block 710 also feeds a Stride Length Estimation block 730 that delivers a Distance output to a summer or first combiner 740 process. The operations of blocks 710, 720, 730 are described in FIG. 16-19 for example. Meanwhile, Stride Parser 720 delivers parsed acceleration data to each of two blocks: 1) Attitude Estimation 750, and 2) Tilt Estimation 760, while parsed data from e-compass and/or gyro goes to 3) Heading Estimation 770. Data is parsed for purposes of blocks 750, 760, 770 in the sense that sections, segments, or windows of data are established by Stride Parser 720 identifying respective beginning-time and ending-time instants associated to or indexed by their particular strides. Tilt Estimation 760 delivers a Pitch/Roll output to each of Attitude Estimation 750 and Heading Estimation 770. Heading Estimation 770 is discussed further in connection with FIG. 21 later hereinbelow. Attitude Estimation 750 delivers Yaw angle output as an estimated attitude value. A second combiner 780 receives the Yaw angle (Attitude) output from block 750 as well as Heading Estimation (Device Heading Angle) output from block 770 representing a heading angle with respect to North. That second combiner 780 delivers an estimated angle-sum output designated User Heading to the first combiner 740. (FIG. 3C illustrates the angle-summing rationale of second combiner 780. Note that if for some reason the e-compass sensor direction and the accelerometer sensor direction are not the same, then a further constant adjustment angle as between these two sensor directions may be included in the angle sum.) The first combiner 740 electronically forms and delivers a displacement and/or velocity output as a joint function of A) the distance from the Stride Length Estimation 730 and B) the User Heading fed from the second combiner 780.

The speed estimation of fusion module 650 of FIG. 14 and/or first combiner 740 in processing module 700 of FIG. 15 is used to determine the speed of the user with the aid of the accelerometer measurements. Step detection in the time domain detects zero crossings (risings) on mean subtracted data, to find the walking steps, see also FIGS. 16-17. The process filters high frequency components to remove harmonics. Initially, the process performs a sliding window correlation of accelerometer measurements—peaks indicate steps. The correlation step contributes to robust detection of peaks. This correlation processing is used to correlate adjacent strides (2 steps) of accelerometer measurements. Further processing also checks for consistency in periodicity of $1^{st}$ step with $2^{nd}$ step (between right leg step and left leg step). Step or stride length estimation is suitably provided by processing that in fact electronically performs a curve fit of StepFrequency vs StepLength, i.e., for an estimated StepFrequency, there is a corresponding StepLength. Some embodiments recognize that the curve fitting is also desirably made dependent on the user height also. In other words, the user height is included as a parameter for the curve fit process. Also, the next process example, a StepPeriod is electronically generated, and StepFrequency=1/StepPeriod i.e. the reciprocal.

In FIG. 15, first combiner 740 suitably electronically generates a position determination output by executing a vector summation based on the successive step lengths based on step/stride detections and then combined with direction cosines respective to those step lengths. Second combiner 780 effectively sums the heading angle and attitude angle (compare FIG. 3C) and generate the direction cosines of the angle-sum with respect to a reference direction (e.g., North). Each step length is multiplied in first combiner 740 by its set of direction cosines to generate each latest displacement vector as the walking proceeds. The successive displacement vectors of the evolving pedestrian trajectory are vector summed. Put another way, the position determination is the sum of a triplet of numbers representing a known initial position plus a triplet of multiply accumulates of the step length over time with the three direction cosines respective to each step length at each instant. (If altitude changes are omitted from pedestrian navigation estimation in the device, then two direction cosines in the horizontal plane are sufficient.)

Pedestrian speed is suitably electronically generated by first combiner 740 dividing each step length by the step duration and window averaging if desired to smooth the output. Pedestrian velocity (vector) is further obtained by an analogous process that also includes multiplying each step length by its three direction cosines. Pedestrian acceleration as a scalar or a vector is suitably electronically generated by differencing the speed or velocity. Note that the pedestrian acceleration here is a highly processed output compared to the triaxial accelerometer inputs.

Figure 16:
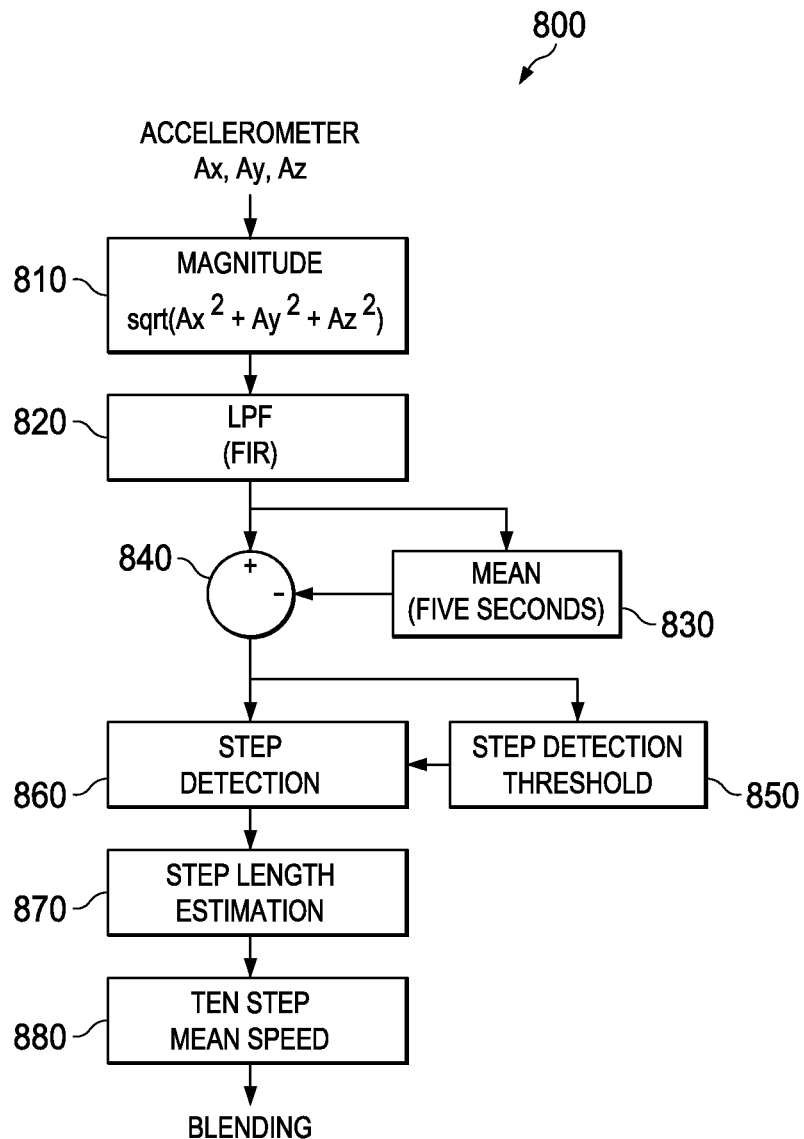
FIG. 16 is a flow diagram of another pedometer process among several examples given.
Figure 17:
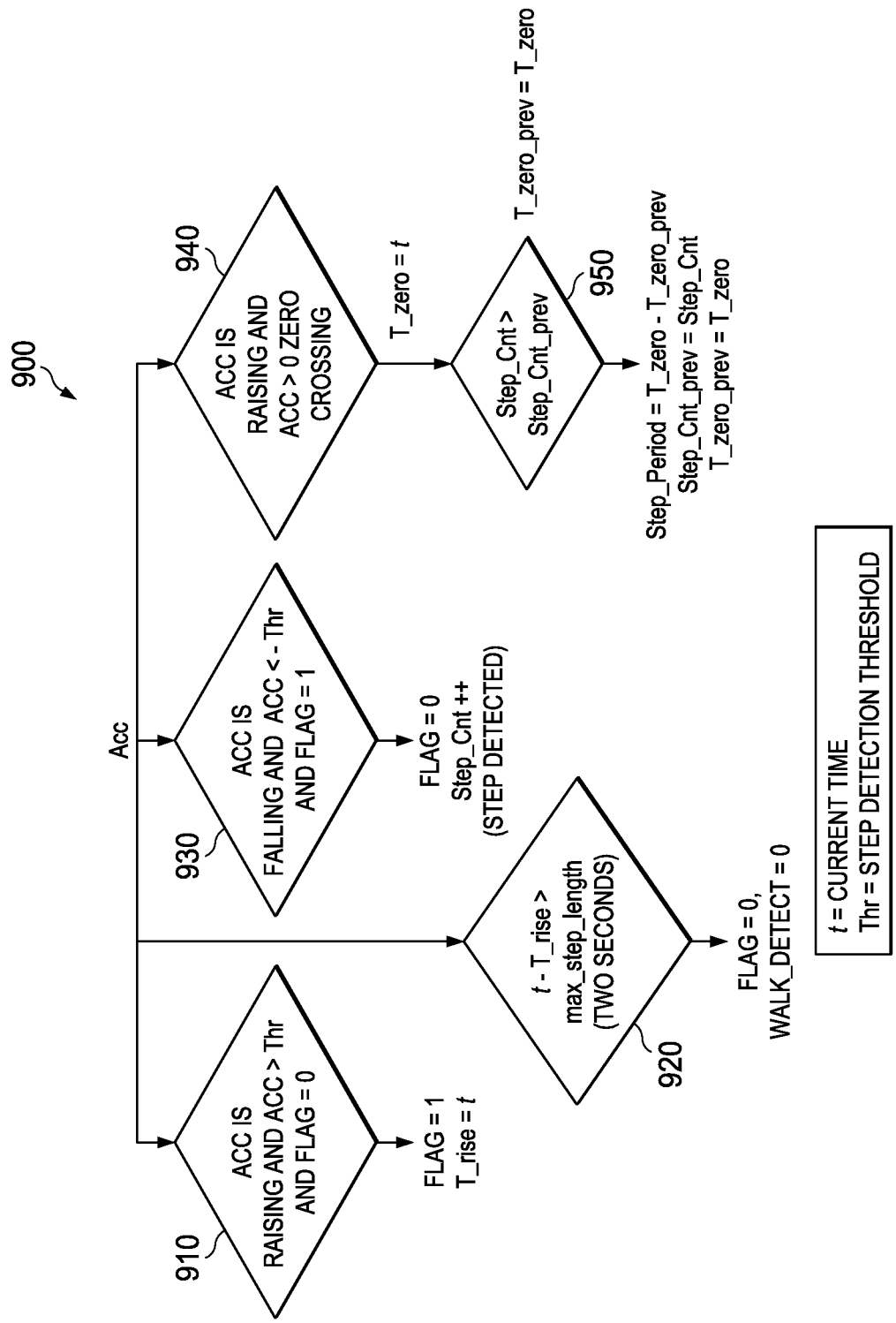
FIG. 17 is flow diagram detailing a process for detecting steps based on rising and falling values and zero crossings in any of FIGS. 1-4 for a pedometer process embodiment of other Figures.

In FIGS. 16-17, two pre-existing flows are illustrated that can be adapted and dramatically improved in process embodiments herein. The process of FIG. 16 operates on packets of data (a window) of about 1 second or more, e.g., can be two (2) sec or five (5) sec, according to example pseudocode listed in TABLE 3. The various blocks of FIG. 16 represent a pipeline process for instance wherein a stream of information is processed through the blocks like an assembly line. FIG. 17 details the Step Detection block 860 of FIG. 16, which corresponds to step (5) entitled Step Detection in the process to perform the operations listed in TABLE 3. Process step 5 of TABLE 3 and FIG. 17 are also descriptive of each other. In FIG. 17 and TABLE 3, the symbols "=" and "←" both mean "is replaced with". Braces { } enclose composite operations and braces may be nested. StepCount and StepCount_Prev are initialized equal to each other and to zero.

TABLE 3

PEDOMETER PROCESS EXAMPLE 3

0. Compute the magnitude of acceleration from individual accelerometer measurements (X,Y,Z) in process step 810:
AccMag = sqrt($A_x^2 + A_y^2 + A_z^2$)
1. Low-pass filter (LPF) the acceleration magnitude in a process step 820 using a finite impulse response (FIR) filter to remove the high frequency components. High frequency rejection by LPF in step 820 suitably provides on the order of 20 dB attenuation at about 3 Hz and above, should pass frequencies of 2 Hz and less with relatively little attenuation. (The useful walking signal bandwidth is assumed to be in a range from about 1 Hz to about 2 Hz.)
2. Mean for e.g. 5 seconds is computed in a mean (averaging) process step 830 and subtracted in a subtraction process step 840 that provides a data stream of mean-subtracted LPF acceleration magnitude values. The mean-subtracted result is provided as a filtered acceleration output AccFilt directly to process step 4 below or preferably to an additional correlation process step (3) next before process step 4 (850).
3. Autocorrelation: AccFilt ← AUTOCORR(AccFilt).
4. A walking step detection threshold is generated in process step 850:
(StepThreshold) = 0.75 * standard_deviation( AccFilt).
If above is less than 0.01, (lower) limit it to 0.01.
If above is more than 0.065, (upper) limit to 0.065.
5. Step Detection 860: Initialize Flag to zero (0). ("Acc" of FIG. 17 is AccFilt here.)
  910. IF [(AccFilt is rising) & (AccFilt > StepThreshold) & (Flag = 0)], THEN
    {Flag ← 1. Assign value to Trise ← current time t at moment the IF is True.}
  920. IF [(Current Time − Trise) > max_step_length (e.g., 2 seconds)], THEN
    {Flag ← 0, Walk_Detect = 0.}
  930. IF [(AccFilt is falling) & (AccFilt< -StepThreshold) & (Flag = 1)], THEN
    {Flag← 0. (Notice the minus sign ahead of StepThreshold.)
    StepCnt ++} ( Step cycle is detected, so store step counter value to
    StepCntPrev and then increment step counter to hold incremented value
    StepCnt)
  940. IF [(AccFilt crosses zero) & (AccFilt is rising)], (i.e. Zero crossing detection,
    step period) THEN
    {Tzero ← Interpolated Value to get accurate time of zero
      crossing of AccFilt.
  950.  IF StepCnt > StepCntPrev THEN
    { StepPeriod = Tzero − TzeroPrev
    StepCntPrev = StepCnt
    TzeroPrev = Tzero
    Step 870 estimates StepLength based on StepPeriod using curve fit
    (discussed earlier hereinabove, e.g. access lookup table LUT)
    Speed = StepLength / StepPeriod TABLE 3-continued

PEDOMETER PROCESS EXAMPLE 3

Step 880 computes the mean of Speed over e.g. 10 steps.
Output to Blending Module (if used, e.g. FIG. 21 engine 3720) and
to first combiner 840 to generate a latest position.
}
ELSE TzeroPrev ←Tzero
}

---

In FIG. 16, a speed estimator flow/block diagram is thus illustrated and described as above in TABLE 3 and partly detailed in FIG. 17. Step 860 is repeatedly performed in a manner that advances through the correlation output as if going from left to right in any of FIGS. 9-12. In another way of describing, after the decision steps 910-950 have been checked one after the other on the latest correlation output according to TABLE 3, then the TABLE 3/FIG. 17 process repeats to feed further correlation output to the step 860 and the decision steps 910-950 are repeated. If step 940 and then step 950 detect true conditions, then a walking step is detected and a Speed computation is generated and output.

Figure 18A:
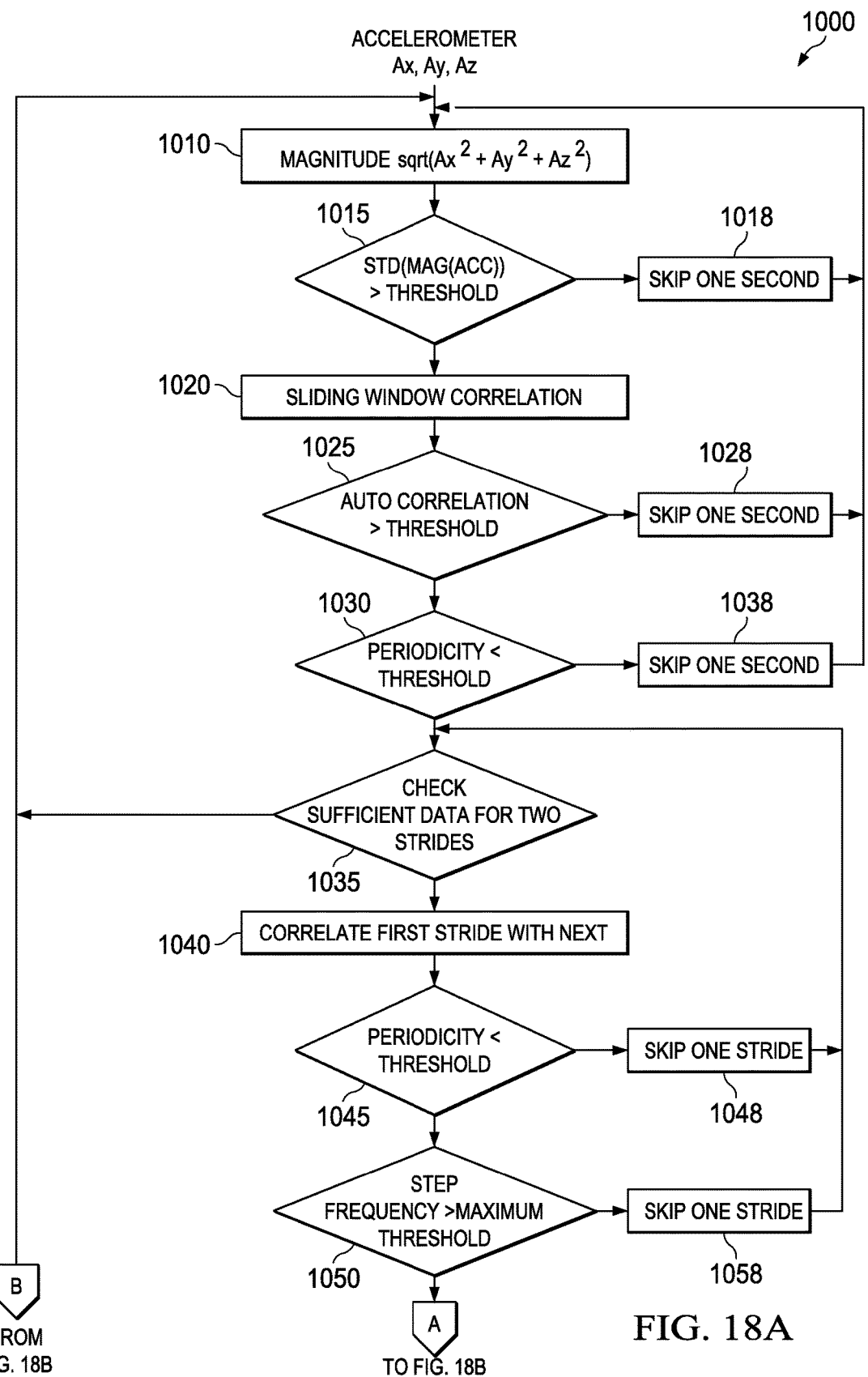
FIG. 18A and FIG. 18B are flow diagrams of a pedometer process embodiment among several examples given and having correlation and post-correlation processing and periodicity checking in stride determinations.
Figure 18B:
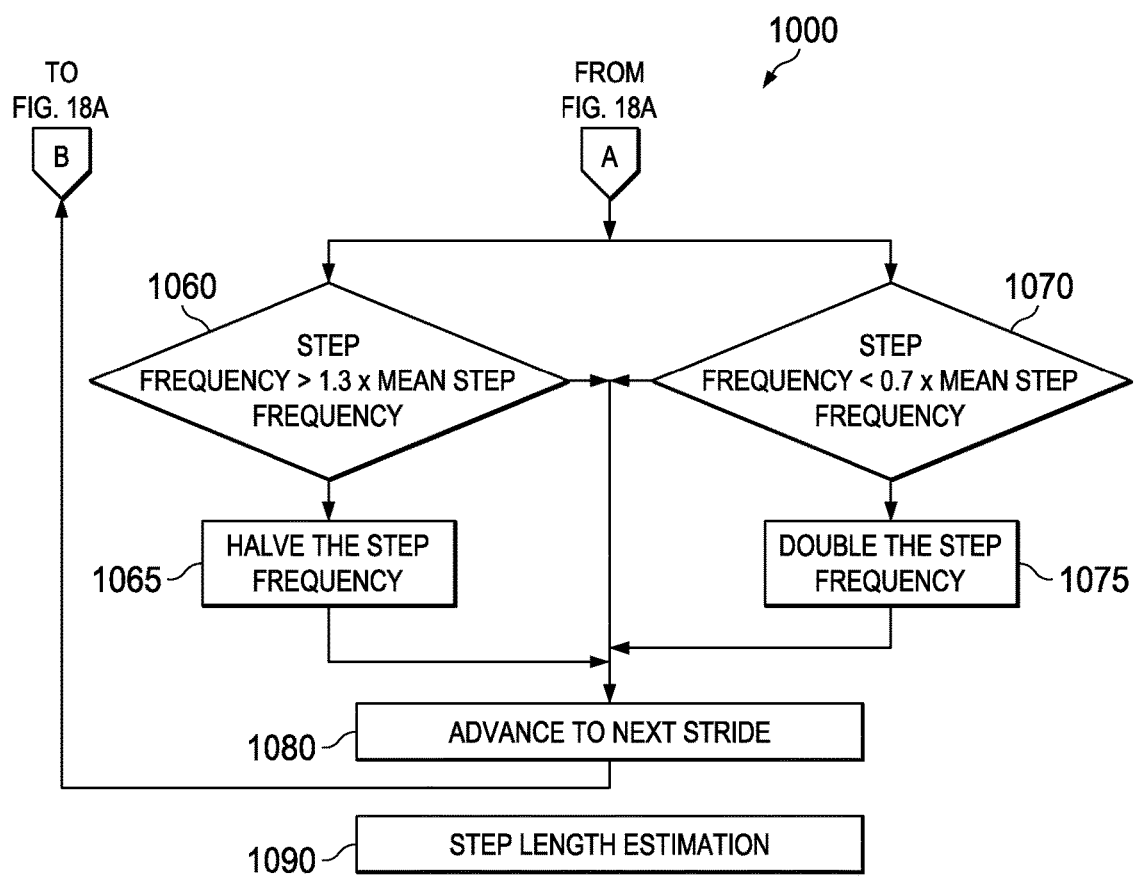

FIG. 18 shows a block diagram of a Step Detection (Time Domain) process embodiment for Step Detection—Correlation described step-by-step as follows to perform the operations listed in TABLE 4:

TABLE 4

PEDOMETER PROCESS EXAMPLE 4

Operate in packets of data (window) of 1 second (or 2 sec or 5 sec), and append the data to an internal buffer described later hereinbelow.
1. Compute the magnitude of acceleration from individual accelerometer measurements (X,Y,Z). AccMag = sqrt($A_x^2 + A_y^2 + A_z^2$) at step 1010. Buffer the data in a Buffer for a length of time configured in a register Corr_Win_Tot, e.g. 4 seconds.
2. IF the standard deviation of AccMag, i.e. StD(mag(Acc)), in above Buffer satisfies a condition (AccMag > Threshold) at step 1015, THEN proceed, ELSE no step detected and step 1018 does loopback for more data and skips one second)
3. Correlate an initial amount (e.g. one (1) second) of AccMag data in the buffer with the entire buffered AccMag in a step 1020.
Subsequently/successively/alternately, Correlate the latest 1 second AccMag data (in the Buffer) with the entire buffered AccMag. A sliding window correlation is done - Peaks indicate steps.
4. IF (Auto-correlation > Threshold) at a decision step 1025, THEN proceed, ELSE no step detected, StepFlag = 0, Walk = 0, flush out earliest 1 second of data at a step 1028 and loop back.
5. Check for consistency in periodicity of $1^{st}$ step with $2^{nd}$ step (between right leg step and left leg step) at a step 1030. IF no consistency is found => THEN no step detected, StepFlag = 0, Walk = 0, flush out earliest 1 second of data at a step 1038 and loop back.
6. Based on stride period estimated above, a step 1035 checks for sufficient data and if present, then buffers an extra 2.5× of stride period data in addition to initial stride, to account for possibility that stride period estimated above could be half the actual. If insufficient data, a branch from step 1035 loops back for more data.
7. Correlate at step 1040 each (or first) stride with next stride to actually detect a stride by generating correlation peak (maximum) and zero crossing due to the correlation.
8. Step 1045 checks IF consistency in periodicity of $1^{st}$ step with $2^{nd}$ step (between right leg step and left leg step) AND correlation maximum is greater than threshold, THEN proceed to Step 9 below (i.e. to step 1050 in FIG. 18), ELSE skip 1 stride of data at step 1048, do not detect stride, and IF Walk =1 AND consistency in periodicity is not present THEN set Walk = 0.
8A. At this point, Stride Period is electronically determined from, or given by, the time position of the maximum correlation value of a current peak, less the time position of the previous peak that similarly satisfied the conditions for a valid peak. Store the time position of each such peak and of each such value of Stride Period. (Some embodiments may instead use an interval between respective zero crossings next to the peaks to compute Stride Period.)
9. Step 1050 checks IF Step Frequency (=1/StepPeriod = 2/StridePeriod) is greater than Maximum possible Step Frequency (MaxThreshold) OR the peak detected is either at the beginning or end of the (buffer) window, THEN skip one stride using step 1058 (or on startup by a suitable time interval to search for an additional valid peak), do not detect the stride.
10. IF Step Frequency at Steps 1060, 1070 has changed by more than +/−30% of average (mean) step frequency, THEN (10A) step 1075 doubles StepFrequency if it is less than the mean by 30% (<0.70×MeanStepFreq), or (10B) step 1065 halves it if it is more by 30% (>1.30×MeanStepFreq). (Alternatively or otherwise, reset it to the average step frequency.)
Steps 11 and 12 perform an Advance 1080 to Next Stride operation in FIG. 18.
11. IF [(Walk = 0) & (first step is detected)] THEN {Set Walk = 1, Increment StrideCount, (extra count for first stride), Set StrideTime = start of stride window (start of correlation window)- if required.}
ELSE goto Step 12.

TABLE 4-continued

PEDOMETER PROCESS EXAMPLE 4

12. Set StepFlag = 1, Increment StrideCount, (extra count for first stride)
    Set StrideTime = start of stride window (start of correlation window) -if required.
    Increment data window by previous StridePeriod, for the first stride it is the same
    as current StridePeriod.
13. Step Length estimation 1090 is executed along with each Advance 1080.

Note that Step 10 represents a process of handling indications of step frequency that lie outside a given range of mean step frequency. For example, suppose that the process has been detecting a given step frequency with some regularity and then begins detecting only every other step so that the computed step frequency is much less. (Or vice-versa.) Then from physical considerations and recognizing that a very sudden change of step frequency is unlikely, the process usefully to doubles a computed step frequency that has suddenly decreased out of range, or halves a computed step frequency that has suddenly increased out of range. The doubled or halved value is likely to lie within the physically-probable frequency range (0.7 to 1.30)*Mean_Step_Frequency. In other words, the probable frequency range is represented by Mean_Step_Frequency plus-or-minus thirty percent (+/−30%) and the percentage is not critical. In this way, fewer outliers or noise values are introduced into the series of generated step frequencies. Thus the process embodiment produces more nearly physically-probable StepFrequency output, and less noise in the mean step frequency values upon which the frequency range is based.

Further considering step 8A, note that each new computation of the StepFrequency also is input to update the mean step frequency. Thus, the process gracefully adapts the actual width of the frequency range (0.7 to 1.30)* Mean_Step_Frequency by using the mean step frequency as a scaling factor therein for that plus-or-minus thirty percent (+/−30%) range. The mean step frequency procedure is optimized so that it involves fewer walking steps than would cause its value to change too slowly compared to likely physical acceleration/deceleration of walking speed, and yet have enough walking steps involved so that the mean step frequency value changes gradually enough so that a sudden departure of a latest single step frequency value from the range can be detected.

In FIG. 18, the flow/block diagram of Step Detection (Correlation) flows downward on the diagram under passed conditions (YES). Under any failed condition (NO) at step 2, 4, 5 or 6, operations skip that one-second and loop back for more data and to step 1 as they do not detect a step. Under any failed condition (NO) at step 8 or 9, operations skip that would-be stride and loop back to Step 6 as they do not detect a stride. A periodicity consistency process embodiment flow is detailed in FIG. 19 later hereinbelow.

Compared with FIG. 18, an alternative and further process embodiment example involves correlation-based stride detection, and accommodates "C" software code implementation and has Stride Parser steps for FIG. 15 integrated, and all performing the operations listed in TABLE 5:

TABLE 5

PEDOMETER PROCESS EXAMPLE 5

The following steps are executed when WalkFlag equals '0':
IF WalkFlag =0 THEN
{
1) Compute the magnitude of acceleration from individual accelerometer
   measurements (X,Y,Z) AccMag = sqrt($A_x^2 + A_y^2 + A_z^2$)
2) Populate the data buffer with new data (AccMag).
3) IF Buffer has at least e.g. 3 seconds of data, THEN proceed, ELSE StrideFlag is
   optionally set to −1 to indicate insufficient data, and Goto last step 18).
4) IF the variance of the last 4 seconds of AccMag data (or however much is
   available) in the buffer > Threshold, THEN proceed, ELSE Goto last step 18).
5) Correlate the latest one second of data with the entire data in the buffer. Flip the
   correlation outputs left to right. A sliding window correlation is done - Peaks
   indicate steps.
6) IF autocorrelation > Threshold, THEN proceed, ELSE Goto last step 18).
7) Check for consistency in periodicity of $1^{st}$ step with $2^{nd}$ step (between right leg
   step and left leg step).
8) IF a consistent period is found, THEN proceed, ELSE Goto last step 18).
9) Based on stride period estimated above, buffer at least 2.5× of stride period data.
   IF data encompassing an interval 2.5 times the stride period is present in the data
   buffer, THEN proceed, ELSE Goto last step 18).
10) Correlate a first stride worth of data from the start of the buffer (reference
    window) with the entire data in the buffer.
11) Check for consistency in periodicity of the first step in the stride with the second
    step (between right leg step and left leg step) and correlation peak > Threshold.
12) IF a consistent period is not found, slide the reference window by one stride
    (provided sufficient data is available in the buffer) and repeat the correlation step
    10) and periodicity consistency step 11).
13) IF a consistent period is found in any of the iterations, THEN proceed, ELSE
    Goto to last step 18).
14) Increment the stride count by two (2).
15) Set WalkFlag to '1'.
16) Stride Parser: Send all data in the buffer including the current stride to all
    subsequent blocks (including attitude, heading and tilt estimation blocks). Data
    from the start of the buffer to the start of the stride may be sent in chunks of a

TABLE 5-continued

PEDOMETER PROCESS EXAMPLE 5 maximum of e.g. 1 second each. Data from the start of the stride until the latest
  stride (inclusive) are suitably sent in chunks of length e.g. equal to the stride
  period.
  IF data sent corresponds to that of stride, THEN Set StrideFlag = 1,
  ELSE set StrideFlag = 0, (i.e., data sent does not correspond to that of stride).
  StrideFlag accompanies each chunk of data to signify whether the data
  corresponds to a stride or not.
17) Store the most recent stride as a reference for future correlations.
  IF WalkFlag = '1' THEN Goto step 3).
18) IF the data buffer is full, (buffer length >= 10), THEN
  {Send the oldest 1 second worth of data to all subsequent blocks, including
  attitude, heading and tilt estimation blocks, and exit the module. (Walking mode
  not found.) Set StrideFlag = 0.}
}
ELSE The following steps are executed when WalkFlag equals '1':
{
1) Compute the magnitude of acceleration from individual accelerometer
  measurements (X,Y,Z) AccMag = sqrt($A_x^2 + A_y^2 + A_z^2$)
2) Populate the data buffer with new data (AccMag).
3) Buffer at least 2.5 times the stride period worth of data including reference stride
  data estimated during a previous run, ELSE retain the reference stride estimated
  during that previous run;
  StrideFlag may be optionally set to −1 to indicate insufficient data and go to last
  step                                                  12).
4) Correlate the reference stride with the entire data in the buffer.
5) Check for consistency in periodicity of $1^{st}$ step with $2^{nd}$ step (between right leg
  step and left leg step) and correlation peak > Threshold.
6) IF a consistent period is not found, THEN slide the reference window by one
  stride (provided sufficient data is available in the buffer) and repeat the
  correlation step 4) and periodicity consistency step 5).
7) IF a consistent period is found in any of the iterations, THEN proceed, ELSE
  Goto last step 11).
8) Compute the mean stride period (moving average of 10 strides). IF the ratio of the
  current stride period to the mean stride period exceeds +/−30%, THEN set the
  current stride period as the mean stride period. Check for data sufficiency and
  proceed. IF data is insufficient, THEN retain the reference stride (estimated
  during the previous run); StrideFlag may be optionally set to −1 to indicate
  insufficient data and go to last step 12). Take care if the buffer for moving
  average of 10 strides is populated, to remove this data.
9) Increment the stride count StrideCount by one.
  Operations in the Stride Parser send all data in the buffer including the current
  stride to all subsequent blocks (including attitude, heading and tilt estimation
  blocks). Data from the start of the buffer to the start of the stride may be sent in
  chunks of a maximum of 1 second each. Data from the start of the stride should
  be sent in chunks of length equal to the stride period.
  Set StrideFlag = 1, if data sent corresponds to that of stride,
  else set StrideFlag = 0, if data sent does not correspond to that of stride.
  StrideFlag accompanies each chunk of data, to signify if the data corresponds to a
  stride or not.
10) Store the most recent stride as a reference for future correlations and go to step
  3). It is not necessary to perform the next step 12) because at this stage the buffer
  cannot be full by design.
11) IF data in the buffer exceeds 2.5× maximum stride length, THEN
  set the WalkFlag to '0', Clear the reference stride data.
12) IF the data buffer is full, THEN Set StrideFlag = 0, send the oldest 1 second
  worth of data to all subsequent blocks (including attitude, heading and tilt
  estimation blocks). Exit the module.
}

Figure 19:
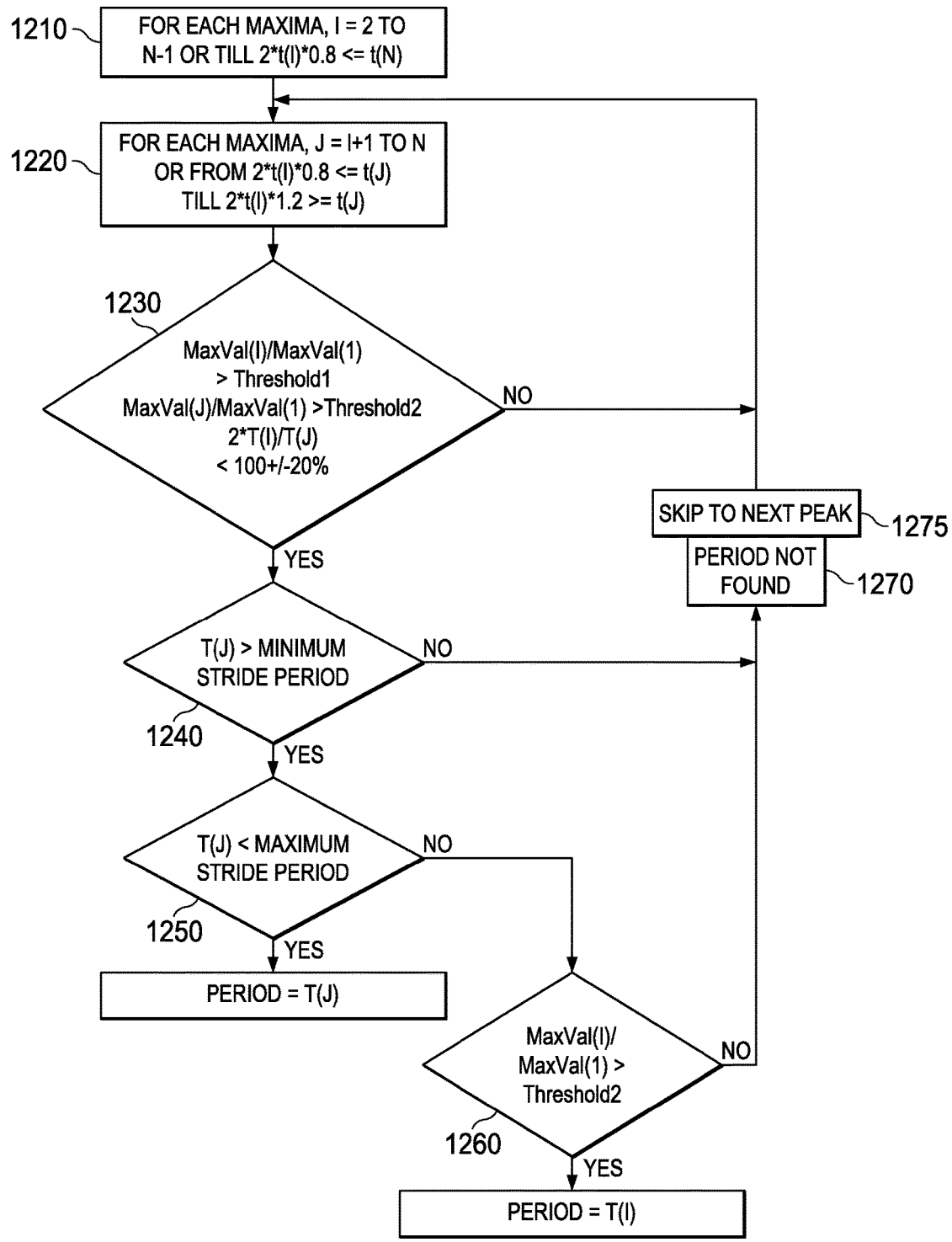
FIG. 19 is a flow diagram detail of periodicity checking and stride period determinations for a pedometer process embodiment of other Figures and examples.

In FIG. 19, a Periodicity consistency process embodiment flow is detailed. See, e.g., periodicity check steps 5 and 8 in FIG. 18. This process finds maxima (0:N) between zero crossings. First zero crossings are detected, and the first maximum before (just previous to) a zero crossing is taken as a true peak or true maximum representing a step. Successive steps are regarded as pertaining to different feet, e.g., right foot followed by left foot followed by right foot, etc.

In FIG. 19, the Periodicity consistency process in a step 1210 identifies peaks or maxima indexed on an index I and lying within the buffer. Then a process step 1220 identifies next-maxima by an index J=I+1 so as to identify a successive step by the opposite foot. A time range for the time of a valid succeeding peak t(J) is set based on the time of a previous peak plus step period plus/minus 20%. This process screens for a valid correlation peak meaning it is within such time range relative to a previous valid peak and has a peak intensity or height exceeding a variable threshold. The threshold is adaptive—higher if recent maxima are high, or lower if recent maxima are low. Put another way, each peak height MaxVal(I) or MaxVal(J) is normalized, meaning it is divided by the average height of recent maxima before comparing with a configured threshold constant. This increases robustness in slow walking or low acceleration scenarios that also produce lower correlation peaks. A decision step 1230 performs three different ratio tests, on the peak I and peak J normalized and thresholded individually, and on their periodicity ratio to make sure they pass as plausibly-detected footsteps. When they pass, operations proceed to a set of decision steps 1240, 1250, 1260 to further establish that the steps indexed on index j lie within an expected range of Stride Period. If not, operations reach a flow point Period Not Found 1270, which represents a No or False state for purposes of IF tests on consistency in periodicity of $1^{st}$ step with $2^{nd}$ step (between right leg step and left leg step) in the various pedometer process examples of TABLES 1-4 and FIG. 13. Operations skip to the next peak at step 1275. But if step 1240 determines Yes and either step 1250 or 1260 determines Yes, then operations determine either a latest one-side stride period T(I), or a latest other-side stride period T(J). Either way, this latter result represents a Yes or True state for purposes of IF tests on consistency in periodicity of $1^{st}$ step with $2^{nd}$ step (between right leg step and left leg step) in the various pedometer process examples of TABLES 1-4 and FIG. 13. (Some embodiments may omit step 1260 as optional and go directly from No at step 1250 to step 1270.) Twice the reciprocal of the average of stride period values yields a StepFrequency value, see Equation (8) later hereinbelow, and then StepLength is determined. Given time measurements for the strides or steps, the speed is also generated as output along with the elapsed step count and distance traveled.

At step 1270, if only a relatively very few peaks out of many pass the tests, such as indicated by a ratio of valid peak counts to elapsed time less than a low threshold or by numerous nonconsecutive strides, then a branch is made from step 1270 itself out of the process of FIG. 19 to indicate that the user is not in a walking mode. See also FIG. 20 step 1340 described later hereinbelow.

The periodicity check includes screening for a correlation peak within a time range in which a step can be expected relative to a previous correlation peak representing a step. In other words, the process executes a set of electronic analytical tests as in FIG. 19 on correlation peaks in data over a period of time including and later than each peak that is analytically tested. Notice that the peak determinations may lag the data by one or two stride durations not because of processor speed but because of the use of subsequent data to organize and select a peak from earlier data. For example, if a given peak exceeds a high threshold and is later followed by another peak that is within an expected stride duration range, then the given peak passes the test and the other peak is analyzed relative to succeeding peak data. Note also that accelerated walking and decelerated walking are robustly monitored by at least some of the embodiments due to effective normalization of the stride duration checking window using one or more previous stride lengths, and also by normalizing height thresholds for validating peaks that can be or become lower in height when the walking is slow. In other words, the peak-screening process is adaptive.

On the other hand, if the given peak fails to pass the analytical tests, operations proceed or skip to the timewise-next peak in the data just after the given peak and apply the analytical tests to that next peak. This process behavior is called a skip or skipping herein. Note that that next peak might or might not exist at a time point earlier than in the expected stride duration range after the given peak. Also skipping is useful when a pedestrian is standing still or making small leg motions here and there in about the same location and that produce insignificantly-low peaks that should not be counted for pedometer or pedestrian navigation purposes.

The above analysis that utilizes a stride duration range is useful and especially when previous operations have determined the stride duration with good confidence. If the previously determined stride duration were erroneous and/or that range set for it were too narrow, then risks of hangups, or periods of failure instead to detect actual strides, might increase in some scenarios. A scenario wherein this could occur is a map-based pedestrian positioning application were in the pedestrian enters building at a known address, temporarily stands still and starts up the pedestrian navigation application while entering the address, and then proceeds to slowly walk further into the building. Or, in an otherwise similar scenario, the pedestrian enters the building continues slowly walking, turns on the pedestrian navigation application and keys the building address into the mobile device. In these scenarios, not only is the stride duration subject to uncertainty but also the slow walking presents more-complicated accelerometer data that is more challenging to analyze, see e.g. FIG. 10B.

Various embodiments provide processing alternatives that on starting up and thereafter rapidly detect or adaptively home in on the correct stride duration. Such processing desirably avoids 1) getting into an erroneous local point of stability called a hangup herein, avoids 2) establishing a set of parameters and analysis processing that repeatedly skips over otherwise good data and fails to detect actual strides, and 3) is resistant to hangups being caused by "noise" in the sense of temporary instances of data that departs from stride detectability and leading to an erroneous local point of stability.

A Category I of embodiments operates to detect a peak and then skip to detect an additional valid peak, e.g., as in FIG. 18 steps 1030, 1045, 1050 and in TABLE 4 at steps 5, 8 and 9 and the description is as hereinabove. On starting up the process, or during some subsequent occurrence of lack of valid peaks, the periodicity steps loop back. The process builds up correlation data and peaks until a stride is detected.

Figure 19A:
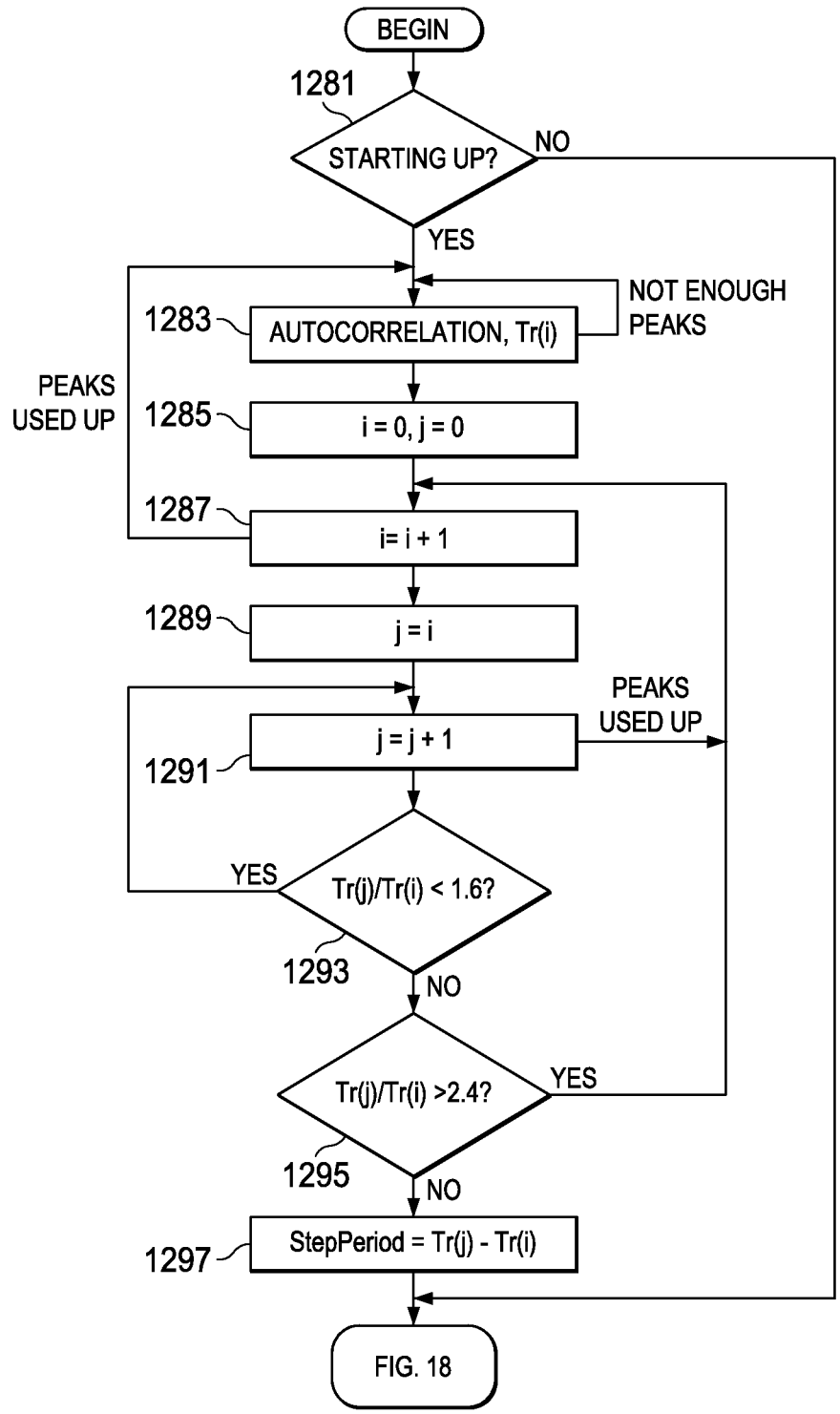
FIG. 19A is a flow diagram detail of periodicity checking and stride period determinations on starting up and other run-time use for a pedometer process embodiment of FIG. 19 and/or other Figures and examples.

In FIG. 19A, a depiction of initial startup determining the step period and stride period. Suppose on initial startup the step period and stride period are unknown. Accordingly, a step 1281 in Category I leads to a following determination process or some equivalent of it. If step period is already known, operations go to FIG. 18 instead. The determination process at a step 1283 generates peaks, e.g. performs a sliding window autocorrelation out of successive subsets each latest set of e.g. 300 acceleration magnitude samples derived from the accelerometer. The autocorrelation of samples e.g. 0-100 is multiply-accumulated (MAC) with itself and if a step has occurred therein, a sufficiently-high correlation peak will occur that is assigned relative time Tr=0. The autocorrelation process proceeds to multiply samples e.g. 0-100 with samples 1-101, then with samples 2-102, etc corresponding to relative times Tr=1, 2, etc. If another step occurs, then it correlates positively with a previous step and produces another peak at some time Tr, and so forth, so that a series of peaks is obtained that range over an observation interval of a couple of seconds. Notice that if at least one walking step occurred in the window, the process has a peak at T=0 (zero window sliding) because the autocorrelation of the data in the window produces a peak there because each walking step correlates with itself given zero window sliding. If any additional walking steps are present in the window, then sliding the window various amounts generally will produce additional correlation peaks as the walking steps correlate with each other. If peaks are insufficiently high so that not enough peaks are found, then operations branch back to repeat step 1283 on more samples. This situation can naturally occur if the pedestrian is standing still while starting up the device. If and when enough peaks are found, then operations go to step 1285. The correlation is done window by window until a first set of at least three peaks is found in a window. If desired, the code may also be suitably written to handle sets of correlation peaks that occupy consecutive windows.

Operations 1285-1297 operate overall as follows 1) Index the successive peaks in the observation interval by successive values κ, 1, 2, 3, etc of an index number such as i or j. With stride detection or interval detection, the time (amount of window sliding (T(j)–0) from zero to some correlation peak can indicate a stride period. 2) Tabulate the relative time Tr of each of the peaks in the observation interval. 3) Execute a double-index search of pairs of the times Tr(i), Tr(j) over those peaks indexed >0 in succession to find the first pair of peaks for which the condition 1.6<Tr(j)/Tr(i) <2.4. In other words, the heuristic condition expects the second and first successive step-peaks (Tr>0) are expected to have relative times in the ratio of (2+/−20%): 1. 4) Store the initial estimate of step period as StepPeriod=Tr(j)−Tr(i), StridePeriod=2*StepPeriod, StepFrequency=1/StepPeriod, and StrideFrequency=1/StridePeriod. Thus, Stride Period can equal Tr(j), because first step period is Tr(i)−0. And second step period Tr(j)−Tr(i) can have a certain mismatch or discrepancy in step period relative to the first step period Tr(i), due to possible right step and left step mismatch of periods. Thus, a stride period based on the first and second step periods found from correlation has a value Tr(j)−Tr(i)+Tr(i)−0=Tr(j). The process example can correlate or use stride period or a function of stride period to generate the step length as described elsewhere herein instead of directly using individual steps step-by-step to do so. This promotes a stream of output data that is more uniform and that changes more gradually or gracefully, and that can facilitate subsequent processing and mapping.

In FIG. 19A, using a numerical example, suppose the relative times of the successive peaks 0, 1, 2, 3, 4 are 0, 0.2, 0.7, 1.3, 1.4. The process step 1285 initializes two indices i, j to zero that are then used for independently pointing to peaks. Then a step 1287 increments the first index i. If at any point in the process step 1287 is reached and has no further peak i to point to, then a branch is made back to autocorrelation 1283 to acquire more peaks. A further step 1289 sets second index j=i, and a succeeding step 1291 increments that second index j. If at any point in the process, step 1291 is reached and has no further peak j to point to, then a branch is made back to step 1287 to test another peak i to compare with. The kernel of the double-loop peak-searching process forms a latest ratio of relative times Tr(j)/Tr(i) of peak j to peak i as the process proceeds. A decision step 1293 checks whether this ratio is low out of range (<1.6, i.e. 20% less than 2) and if so loops back to step 1291 that increments the second index j. In the numerical example, Tr(2)/Tr(1)=0.7/0.2, which is high out of range at step 1295, and step 1293 detects no need to inner-loop-increment index j to form Tr(3)/Tr(1) etc. since the latter ratio will evidently either be outside the range also or not exist. So the process at step 1295 branches back (Yes) via its outer loop to steps 1287-1291 and forms a new ratio Tr(3)/Tr(2)=1.3/0.7=1.8. This ratio 1.8 is inside the range 1.6-2.4 and therefore operations pass through decision steps 1293 and 1295 to reach step 1297. Step 1297 then electronically generates and stores StepPeriod=Tr(3)−Tr(2)=1.3−0.7=0.6 sec as a result. Then StridePeriod=1.2 sec, StepFrequency=1.6 Hz, and StrideFrequency=0.8 Hz. These results are then applied in FIG. 18 and any other described process, Figure or Table herein in which such results are usefully applied on starting up.

A Category II of embodiments utilizes majority voting by a set of sub-processes that each consist of a different subset of the analytical tests (such as pieces of Booleans used in the decision steps of FIG. 17). In one example, a first sub-process detects whether the given peak exceeds a threshold, perhaps relatively high. A second sub-process detects whether both the given peak and some later peak (located anywhere within a relatively long time duration thereafter) both exceed a threshold, perhaps relatively more moderate in height. A third sub-process detects whether the given peak exceeds some moderate threshold and some other peak exists within a range centered around an expected stride duration, if any value for such duration is available. A fourth sub-process detects whether the given peak is free of multiple zero crossings within a predetermined range of times. Various embodiments may add further sub-processes, and/or omit or vary one or more of the stated processes. If the given peak, in the context of the other data as applicable, fails any such sub-process or its sub-processes does not pertain, then that sub-process generates a signal representing a No vote. Any sub-process that pertain votes Yes for which the given peak and applicable other data passes. A vote evaluation process then provides logic (e.g., majority vote logic or otherwise) to determine whether enough of the sub-processes voted Yes to justify validation of the given peak. A rationale of Category I is that when stride detection is clear, almost all of the sub-processes vote Yes along with that third sub-process, and that starting up the pedestrian navigation process generalizes the stride detection process somewhat to validate some peaks upon which the overall process can build a pedestrian navigation output. Moreover, applications in which an internal map of the building is available (e.g., from FIG. 14 block 660 Map) can provide some plausible constraints such as that the pedestrian does not walk through walls and fusion module 950 can then increment the position by detected steps along the direction of the velocity vector component parallel to the wall, etc.

A category III of the embodiments operates the third sub-process alone much of the time. All the sub-processes and the vote evaluation process are activated for a predetermined interval (e.g. 30 seconds) after startup of the application, and in case the third sub-process subsequently were to fail to return stride data for a least a predetermined number of most-recently-determined stride intervals.

A category IV of the embodiments operates somewhat like category III except that all the sub-processes and the vote evaluation process are activated all the time and generate parallel determinations that are then only pasted into the stride stream when the third sub-process fails to return stride data either on start up or thereafter.

A category V of the embodiments electronically operates in a manner that effectively analyzes the data by focusing on validating strides rather than validating step peaks. Accordingly, a process embodiment detects all peaks in the correlation data that exceed some moderate threshold. Then the process tabulates all pairs of the detected peaks that are separated by close-to-equal time intervals (predetermined ratio range around unity). The process further finds a selection of the pairs of the peaks that best fit into a succession of alternating right-leg strides and left-leg strides. If equally plausible sets of the peaks are found based on stride considerations, then the set of peaks with the higher average height is suitably selected. Notice also that the stride determinations may lag the data by a couple of stride durations not because of processor speed but because of the use of subsequent data to organize and select strides from earlier data.

The reader will recognize that each of these categories, and other related categories of embodiments that can be devised based on the teachings herein, has different levels of pedestrian navigation accuracy, computing complexity, power consumption, latency, etc. The skilled worker in developing particular implementations suitably specifies or chooses among the engineering trade-offs according to good engineering practice and customer needs.

Figure 20:
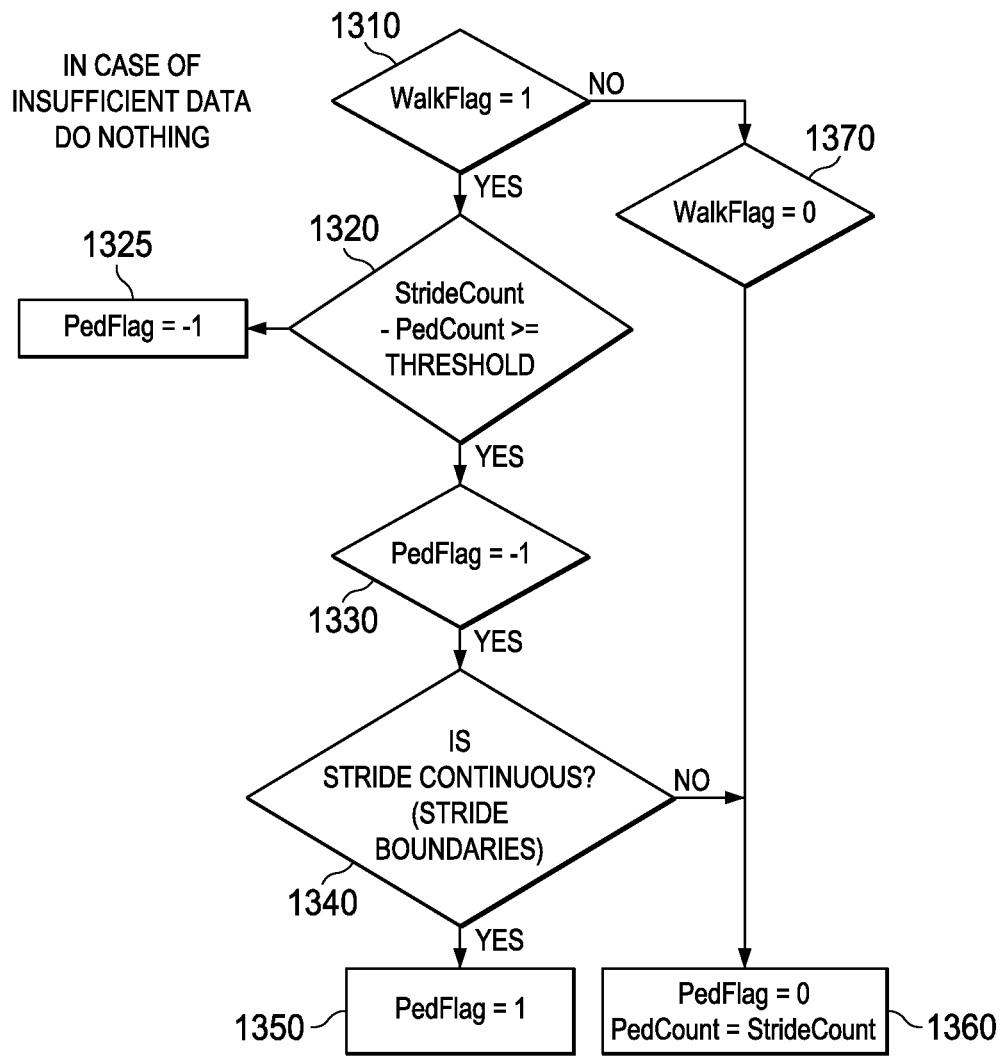
FIG. 20 is a flow diagram of context checking to determine if walking is occurring, for use with a pedometer process embodiment of other Figures and examples.

In FIG. 20, a flow chart of a Walk Detect module is shown using a three-state flag PedFlag for Pedestrian Navigation mode detection, i.e., to detect whether the user is walking The three states are:

1. PedFlag=0, the user is not walking
2. PedFlag=1, the user is walking
3. PedFlag=−1, the user is probably walking The operations in FIG. 20 are combined in some embodiments with those of other examples tabulated hereinabove wherein WalkFlag or Walk is also suitably used at a step 1310 in the process for generating PedFlag. TABLE 4 shows its Example 5 wherein StrideFlag is coded in a manner integrating the PedFlag in substance into the TABLE 4 listing. The FIG. 20 embodiment helps reduce step/stride counting errors.

In FIG. 20, operations commence with a decision step that determines whether WalkFlag has been set active (e.g., =1). If so, then a step 1320 checks whether the difference of StrideCount less PedCount equals or exceeds a configured threshold. StrideCount and PedCount represent two different ways of estimating the number of steps or strides. For example, let StrideCount represent a count of strides derived from the FIG. 18 processes. Let PedCount represent a count of steps (/2, =stride estimate) derived directly from analysis of correlation peaks and zero crossings as in FIG. 17 or otherwise. At step 1320, these numbers should be quite similar. If they are not, a branch is made from step 1320 to provide PedFlag=−1 as an output from the process indicating probable walking and less certainty of estimation. If the numbers are quite similar, then operations proceed from step 1320 to a step 1330 that sets PedFlag=+1 as a tentative value pending further evaluation at a remarkable decision step 1340. In Stride Continuity check 1340, the Stride detector module identifies and outputs the stride start and end times (stride boundaries). Stride continuity means that the next stride is found to start immediately after the previous stride without any gap or samples in between the two strides. If a skip occurs, see discussion of FIG. 19, then a discontinuity in the detected strides exists. If numerous skips are occurring at a rate or number exceeding a threshold, step 1340 determines No, stride continuity not found. Otherwise, stride continuity is found (Yes) in step 1340, operations proceed to output a determination of PedFlag=+1 at a step 1350. If stride continuity is not found (No), a branch is made to a step 1360 to output a determination of PedFlag=0 (not walking), and PedCount is made equal to StrideCount. Step 1360 is also reached if WalkFlag=0 at step 1310 and 1370.

Description now focuses on Step Length estimation in more detail. Step Length can be estimated based on any suitable physiological model, such as a model using user height and step frequency. The estimate can be further improved with calibration from other systems like GNSS, WiFi etc. One suitable physiological model defines a curve fit that provides a function StepLength versus StepFrequency and a given user height H. For the given user height H (in centimeters), operations electronically compute the straight line fit coefficients from a straight line fit.

First, StepLength is represented as a joint function of StepFrequency and height H.

$$\text{StepLength} = f(\text{StepFrequency}, \text{Height } H). \quad (11)$$

The coefficients themselves are represented as functions of height H:

$$\text{StepLength} = \text{StepLenCoEff } 1(H) * \text{StepFrequency} + \text{StepLenCoEff } 0(H). \quad (12)$$

TABLE 6 represents a fit wherein the coefficients are straight line functions of height H:

$$\text{StepLenCoEff } 1(H) = \text{HeightCoEff11} * H + \text{HeightCoEff01} \text{(Row 1)} \quad (13)$$

$$\text{StepLenCoEff } 0(H) = \text{HeightCoEff10} * H + \text{HeightCoEff00}. \text{ (Row 0 beneath)} \quad (14)$$

Substituting:

$$\text{StepLength} = (\text{HeightCoEff11} * H + \text{HeightCoEff01}) * \text{StepFrequency} + (\text{HeightCoEff10} * H + \text{HeightCoEff00}). \quad (15)$$

TABLE 6

STEP LENGTH ESTIMATION COEFFICIENTS

| | HeightCoEff 1 (Slope) | HeightCoEff 0 (Constant) |
|---|---|---|
| StepLenCoEff 1 (Slope) | +0.0199 | −3.4843 |
| StepLenCoEff 0 (Constant) | −0.0091 | +1.9946 |

The tabulated values for the coefficients from TABLE 6 are substituted into Equation (15) to represent the electronic computation performed for the Step Length Estimation blocks of FIGS. 14, 15, 16 and 18. Stride length is determined as twice the step length, or is the sum of the right step length plus the left step length in embodiments where these lengths are obtained as separate values. Since the height H units are in centimeters for this example (e.g. a person is often about 160 cm tall), the contributions of all the various terms in Equation (7) are significant and approximately the same order of magnitude.

With the TABLE 1 coefficients and user height input, the coefficients required to compute StepLength using computed StepFrequency are computed.

$$\text{Step Frequency} = 2/\text{Stride Period}. \quad (16)$$

And then with the computed set of coefficients and StepFrequency input the StepLength is estimated. Whenever a positioning system like GNSS or WiFi has good accuracy, StepLength can also be calibrated based on long term average speed estimates from the systems.

Figure 21:
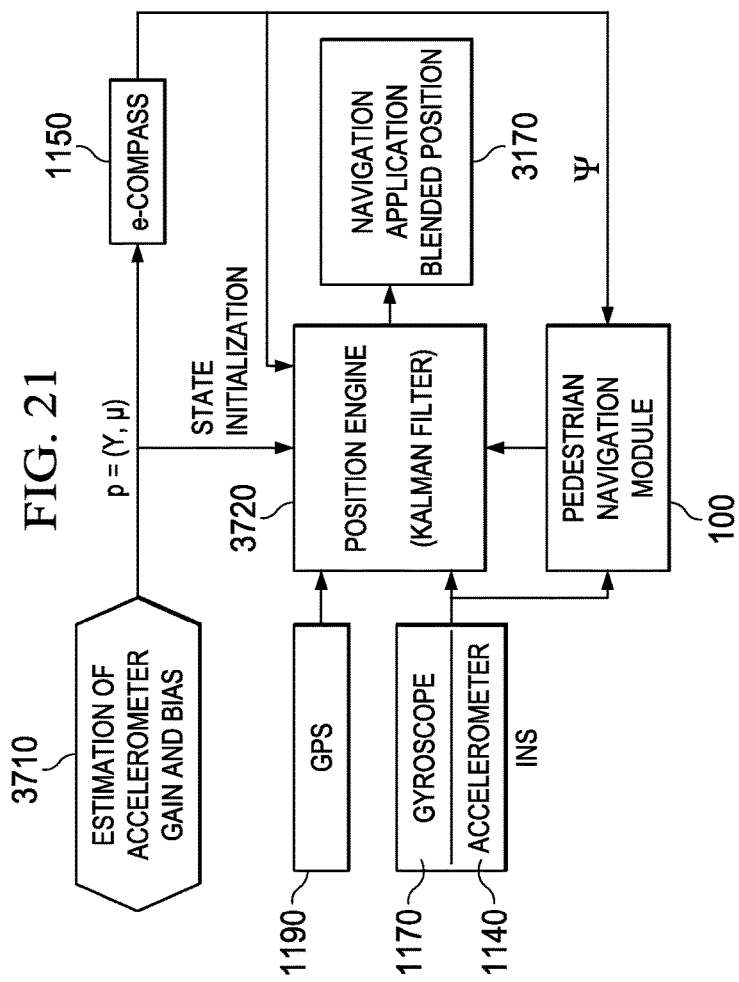
FIG. 21 is a block diagram of a system that blends various types of measurements to produce a blended position determination.

Turning to FIG. 21, a position engine 3720 is provided to receive GPS (Global Positioning System) 1190 and Gyro 1170/accelerometer 1140 (Inertial navigation system INS) measurements and then blend the inertial output with GPS measurements obtained by the GPS engine 1190 and measurements by pedestrian navigation unit 100 (or 600). Conveniently calibrated triaxial MEMS accelerometer 1140 herein provides a seamless navigation experience to end users even when GPS visibility is absent or poor, such as when the environment is severely affected by multi-path satellite signal propagation. Estimation of parameters for accelerometer 1140 and e-compass 1150 further improves runtime pedestrian navigation measurement accuracy and dead reckoning of position in the absence of GPS, as well as usefully blending with GPS 1190 when GPS has moderate quality.

For some background on convenient accelerometer calibration for a mobile device in case such calibration is desired, see US Patent Application Publication 20090259424 "Parameter Estimation for Accelerometers, Processes, Circuits, Devices and Systems" dated Oct. 15, 2009, and which is incorporated herein by reference in its entirety. For some background on e-compass and calibration, see US Patent Application Publication 20090254294 "Processes for More Accurately Calibrating and Operating E-Compass for Tilt Error, Circuits, And Systems", dated Oct. 8, 2009, and which is incorporated herein by reference in its entirety. The recalibration processes, circuits, devices, and systems taught in the hereby incorporated references can be accurate, reliable, and easy to use. Also, various processes taught herein can be robust with respect to less-than-fully-calibrated accelerometers.

With a miniature gyroscope acting as an inertial platform, the user walking direction with respect to North (angle-sum of device heading plus attitude) in urban canyon or inside a steel building is also readily obtained in case e-compass 1150 is inaccurate there, or omitted from the particular embodiment. When any one (or some blended combination) of gyroscope, e-compass and satellite positioning mode can give a high-probability heading estimation, an applicable heading mode is utilized at that moment. Note also that gyroscope 1170 is simply used as an inertial platform for heading determination purposes by the pedestrian navigation module 100. Accelerometer biases are or can be negligible for tilt estimation, heading estimation and/or attitude estimation in the embodiments herein; however, such biases even when small might not be negligible for INS based computations that involve double integration of acceleration. Therefore, the gyroscope 1170 with accelerometer 1140 does not introduce quadratically-increasing errors in position determination when combined with the step detection process embodiments taught herein to form pedestrian navigation module 100.

In FIG. 21, accurate parameter estimates of a given INS including accelerometer 1140 in some embodiments help to define the state initialization for a position engine 3720 that combines pedestrian navigation 100 with GPS input and INS outputs. Accelerometer parameters 3710 are applied to a Tilt Compensation Process of the incorporated US Patent Application Publication 20090254294 to calibrate e-compass 1150. E-compass 1150 supplies heading information to pedestrian navigation 100. Also, calibration of the e-compass parameters also supports locally-inertial navigation by providing an accurate estimate of components of magnetic vector H in the device frame. NED (North, East, Down) vectors are generated by the indicated vectors {(H×g)×g, H×g, g} normalized for use by pedestrian navigation module 100 and position engine 3720. (The Earth's magnetic vector H points southward and is inclined differently at different geographic locations, so the cross products formed by Appendix Equation (A-7) are used to provide vectors parallel to the Earth's surface. The NED vectors are electronically generated and represented by their vector components in the respective (Top, Left, Out) unit vector directions i, j, k of the device reference frame in FIG. 3C. The Device Heading ψ with respect to North is electronically generated by FIG. 15 block 770, as given by the cited US Patent Application Publication 20090254294 "Processes for More Accurately Calibrating and Operating E-Compass for Tilt Error, Circuits, And Systems", dated Oct. 8, 2009, that is incorporated herein by reference in its entirety. Any other suitably effective procedures for determining Device Heading angle ψ are also useful for alternatives to or forms of block 770 in various embodiments.

For greater position accuracy, and to remove the effects of statistical error in various measurements, multiple GPS vector position measurement $x_{gps}$ over occasional times and/or multiple computed actual acceleration measurements over independently-occasional time in some embodiments are combined using a Kalman filter for position engine 3720 as depicted in FIG. 21.

Figure 22:
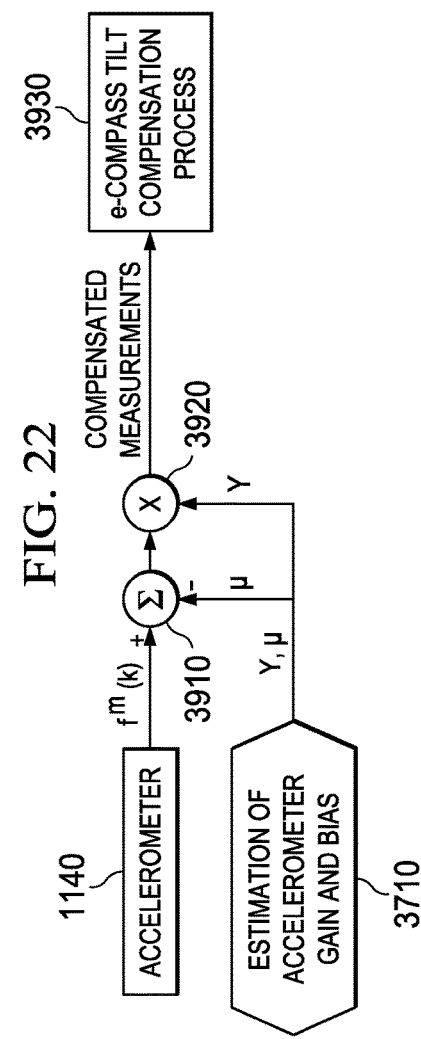
FIG. 22 is a block diagram of an accelerometer measurement compensation process to remove bias and sensitivity error from measurements.

In FIGS. 21 and 22, a well-defined state initialization is provided by step 3710 with gain parameter estimates Yxx, Yyy, Yzz for the accelerometer 1140 and analogous gain parameters for the e-compass 1150, as well as bias parameter estimates μx, μy, μz for the accelerometer 1140 and offset parameter estimates Mx, My, Mz for the e-compass 1150. Thus, step 3710 facilitates quick convergence or settling of a suitably arranged Kalman filter for position engine 3720. For some background on Kalman filter processing applied in various ways, see US Patent Application Publication 20100103033 "Loosely-Coupled Integration of Global Navigation Satellite System and Inertial Navigation System" dated Apr. 29, 2010, which is incorporated herein by reference; and see incorporated US Patent Application Publication 20090259424 (paragraphs 121-138).

In this way, position engine 3720 usefully supplies a blended position output for display or further analysis and use by the navigation application 3670 (2524).

In FIG. 22, accelerometer 1140 measurements are first adjusted by subtracting biases μ in a step 3910 and then multiplying by the estimated accelerometer gain in a step 3920. The accelerometer measurements as thus compensated are then used by a module 3930 for e-compass tilt compensation.

It is emphasized that some embodiments are or can be adequately constituted by omitting the Kalman filtering or one or another sensor or the GPS or otherwise fewer than all of the structures and process steps illustrated in the various Figures too. Likewise, some of the embodiments are embedded in more complex combination embodiments.

Because of the electronic operations representing various filtering, autocorrelation, cross-correlation, and vector and matrix operations as described hereinabove, a processor with one or more fast multiply-accumulate (MAC) units, and ability to implement decision steps based on conditions checked, provides desirably high performance in some embodiments. Each processor can have a pipeline for high performance and selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other micro-control blocks using any one or more of the foregoing.

Figure 23:
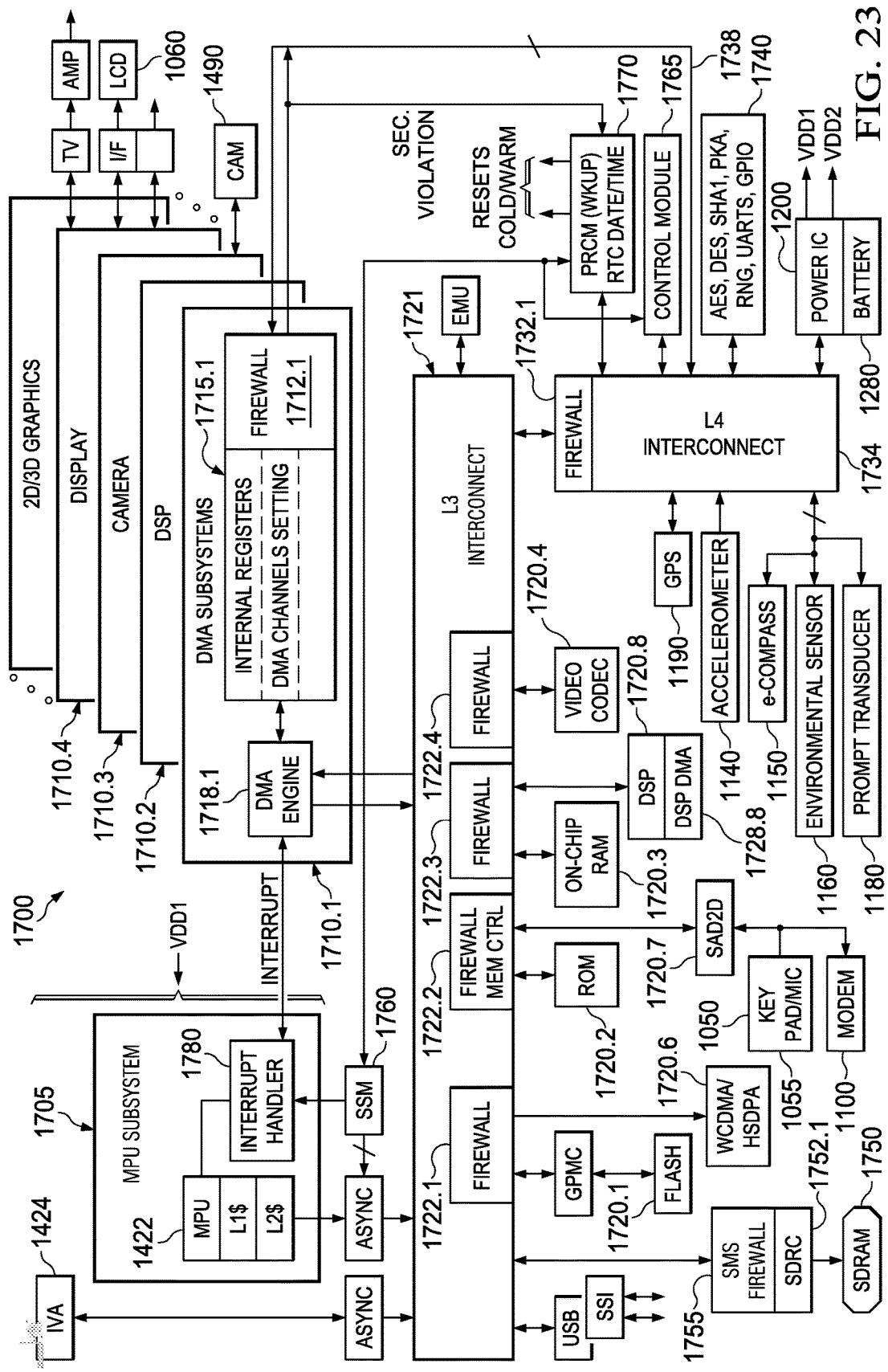
FIG. 23 is a system block diagram of application processor embodiment with modem, accelerometer, and other sensors and peripherals and utilizing various kinds of sensor data according to the other Figures.

In FIG. 23, personal and/or vehicular navigation is supported by an accelerometer 1140 and an electronic compass (e-compass) 1150. An environmental sensor 1160 is provided to check any one, some, or all of the temperature, humidity, pressure and/or other environmental physical variables. A miniature Gyro 1170 (gyroscopic inertial assembly) can be provided, with dimensions compatible with the form factor of the portable device. As part of a display screen or in addition, prompting transducers 1180 are provided for emitting flashing light signals, audible speech, and/or audible sounds such as calibration orientation prompts and distinct calibration confirmation prompts to the user. Processor integrated circuit 1022 is coupled to a satellite positioning integrated circuit 1190 for GPS or otherwise. GPS (Global Positioning System) is an earth-satellite-based electronic system for enabling GPS receivers in ships, aircraft, land vehicles and land stations to determine their geographic and spatial position such as in latitude, longitude, and altitude. Discussion of GPS herein is without limitation to other analogous satellite-based electronic systems.

In this way, advanced networking capability for services, software, and content, such as cellular telephony and data, navigation applications, audio, music, voice, video, e-mail, gaming, security, e-commerce, file transfer and other data services, internet, world wide web browsing, TCP/IP (transmission control protocol/Internet protocol), voice over packet and voice over Internet protocol (VoPNoIP), robotics, medical-related services, and other services accommodates and provides security for secure utilization and entertainment appropriate to the just-listed and other particular applications.

In combination with the GPS circuit 1190, and the video display, the RISC processor 1422 and/or IVA (imaging and video applications unit) DSP 1424 support location-based embodiments and services of various types. These services provide roadmaps and directions thereon to a destination, pictorials of nearby commercial establishments, offices, and residences of friends, various family supervision applications, position sending to friends or to emergency E911 service, and other location based services now known or yet to be devised. For such services, fast time of position fixing, low system power consumption, and reliability of accurate timekeeping to support position-based services even during power management operations and cellular network base station handover or handoff operations are all desirable for improved technology such as supported by various embodiments herein.

It is contemplated that the skilled worker uses each of the integrated circuits shown in FIG. 23, or such selection from the complement of blocks therein provided into appropriate other integrated circuit chips, or provided into one single integrated circuit chip, in a manner optimally combined or partitioned between the chips, to the extent needed by any of the applications supported.

In FIG. 23, a system 1700 has a MPU (microprocessor unit) subsystem 1705 with MPU core(s) 1422, an IVA (imaging/video application or other MAC-intensive apps) subsystem 1424, and DMA (Direct Memory Access) subsystems 1710.$i$. Personal and/or vehicular navigation is supported by accelerometer 1140 and/or gyro 1170 and/or electronic compass (e-compass) 1150 coupled to the sensor input port(s) 1734. The MPU subsystem 1705 suitably has one or more processor cores 1422 with RISC or CISC or other suitable central processing units CPUs such as with superscalar processor pipeline(s) with L1 and L2 caches. Either or both of the MPU subsystem 1705 and IVA subsystem 1424 has hardware for single cycle multiply-accumulates for matrix processing and fast loop execution, such as in pedestrian navigation, image processing, video processing, and audio processing. IVA 1424 provides one or more programmable digital signal processors (DSPs) for multi-standard (MPEG4, WMV9, RealVideo®, H.263, H.264) encode/decode at D1 (720×480 pixels), and 720p MPEG4 decode, for some examples. Also integrated are a 2D/3D graphics engine, a Mobile DDR Interface, and numerous integrated peripherals as selected for a particular system solution. The IVA subsystem 1424 has L1 and L2 caches, RAM and ROM, and hardware accelerators as desired such as for motion estimation, variable length codec, and other processing. DMA (direct memory access) subsystems 1710.$i$ perform target accesses via target firewalls 1722.$i$ and 1712.$i$ of FIG. 1 connected on interconnects 1721, 1734. A target is a circuit block targeted or accessed by another circuit block operating as an Initiator. Some Initiators are MPU 1422, DMA subsystems 1710.$i$ such as in pedestrian navigation, Universal Serial Bus USB HS, and a secure debug access port to an emulation block EMU. In order to perform such accesses the DMA channels in DMA subsystems 1710.$i$ are programmed. Each DMA channel specifies the source location of the Data to be transferred from an Initiator and the destination location of the Data for a target.

Data exchange between a peripheral subsystem and a memory subsystem and general system transactions from memory to memory are handled by the System SDMA 1710.1. The DMA channels support hardware firewalls 1712.1, 1712.2, etc. via lines 1738 as well as to firewalls 1722.1, 1722.2, etc. The hardware firewalls protect the targets according to different access rights of initiators. The DMA channels 1715.1, .2, etc. are configurable through the L4 Interconnect 1734 by the MPU subsystem 1705. Firewall configuration on a DMA interface 1715.$i$ restricts different DMA channels according to the configuration previously written to configuration Internal Register fields. This Firewall configuration implements hardware security architecture rules in place to allow and restrict usage of the DMA channel qualifiers used in attempted accesses to various targets. When an attempt to configure access for DMA channels in a disallowed way is detected, in-band errors are sent back to the initiator that made the accesses and out-band errors are generated to a Control Module 1765 and converted into an MPU Interrupt for security attack detection and neutralization.

Data exchanges within a DSP subsystem 1710.2 are handled by the DSP DMA 1718.2. Data exchange to store camera 1490 image capture is handled using a Camera DMA 1718.3 in camera subsystem CAM 1710.3. The CAM subsystem 1710.3 suitably handles one or two camera 1490 inputs of either serial or parallel data transfer types, and provides image capture hardware image pipeline and preview. Data exchange to refresh a display 1060 is handled in a display subsystem 1710.4 using a DISP DMA 1718.4. This subsystem 1710.4, for instance, includes a dual output three layer display processor for 1×Graphics and 2×Video, temporal dithering (turning pixels on and off to produce grays or intermediate colors) and SDTV to QCIF video format and translation between other video format pairs. The Display block/port 1710.4 feeds a user-viewable display, such as a DLP™ display from Texas Instruments Incorporated or an LCD panel or other display, using either a serial or parallel interface. Also television output TV and Amp provide CVBS or S-Video output and other television output types for display.

In FIG. 23, a hardware security architecture including SSM 1760 propagates qualifiers for virtual machines on the interconnect 1721 and 1734. The MPU 1422 issues bus transactions and sets some qualifiers on Interconnect 1721. SSM 1760 also provides one or more qualifiers. The bus transactions propagate through the L4 Interconnect 1734 and then reach a DMA Access Properties Firewall 1712.1. Transactions are coupled to a DMA engine 1718.$i$ in each subsystem 1710.$i$ which supplies a subsystem-specific interrupt to the Interrupt Handler 1780. Interrupt Handler 1780 is also fed one or more interrupts from Secure State Machine SSM 1760 that performs security protection functions. Interrupt Handler 1780 outputs interrupts for MPU 1422. In FIG. 23, firewall protection by firewalls 1722.$i$ is provided for various system blocks 1720.$i$, such as GPMC (General Purpose Memory Controller) to Flash memory 1720.1, ROM 1720.2, on-chip RAM 1720.3, Video Codec 1720.4, WCDMA/HSDPA 1720.6, device-to-device SAD2D 1720.7 coupled to manual input 1050 such as keypad, Modem(s) 1100, and to a mixed signal (digital and analog) circuit coupled to microphone (MIC) 1055. DSP 1720.8 such as applicable in pedestrian navigation, and DSP DMA 1728.8 also support the system via interconnect 1721. A System Memory Interface SMS with SMS Firewall 1755 is coupled to SDRC 1752.1 (External Memory Interface EMIF with SDRAM Refresh Controller) and to system SDRAM 1750 (1024).

In FIG. 23, interconnect 1734 is also coupled to Control Module 1765 and cryptographic accelerators block 1740 and a continually-powered Wakeup block WKUP 1770. Wakeup block 1770 has a Power, Reset and Clock Manager PCRM for power management and wakeup and a RTC (real time clock) for maintaining time and date. PRCM is coupled via L4 interconnect 1734 to Power IC circuitry in a power chip 1200 powered by a battery pack 1280. Chip 1200 supplies controllable supply voltages VDD1, VDD2, etc. for the rest of the system 1700. PRCM 1770 is coupled to L4 Interconnect 1734 and coupled to Control Module 1765. PRCM 1770 is coupled to a DMA Firewall 1712.$i$ to receive a Security Violation signal, if a security violation occurs, and to respond with a Cold or Warm Reset output. Also PRCM 1770 is coupled to the SSM 1760.

In FIG. 23, some embodiments have symmetric multi-processing (SMP) core(s) such as RISC processor cores in the MPU subsystem. A hardware (HW) supported secure hypervisor runs a SMP core. Linux SMP HLOS (high-level operating system) is symmetric across all cores and is chosen as the master HLOS in some embodiments.

In FIG. 23, digital circuitry in modem(s) 1100 supports and provides wireless interfaces for any one or more of GSM, GPRS, EDGE, UMTS, and OFDMA/MIMO embodiments. Digital circuitry provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1×EV-DV, 1×EV-DO or 3×EV-DV) data feature via an analog baseband core and RF GSM/CDMA core. An audio/voice block supports audio and speech/voice functions and interfacing. Speech/voice codec(s) and user voice-recognition/voice control are suitably provided in memory space in the audio/voice block for processing by processor(s) 1422, 1424. Modem(s) 1100 are coupled for use by personal and/or vehicular navigation applications and can act as sensor ports for wireless coupling with and reception from accelerometer 1140 and/or electronic compass (e-compass) 1150 and/or location-determining circuitry 1190 for GPS (Global Positioning System). Environmental sensor(s) 1160 are likewise coupled to the system. IC 1100 is also coupled to a USIM (UMTS Subscriber Identity Module).

Figure 24:
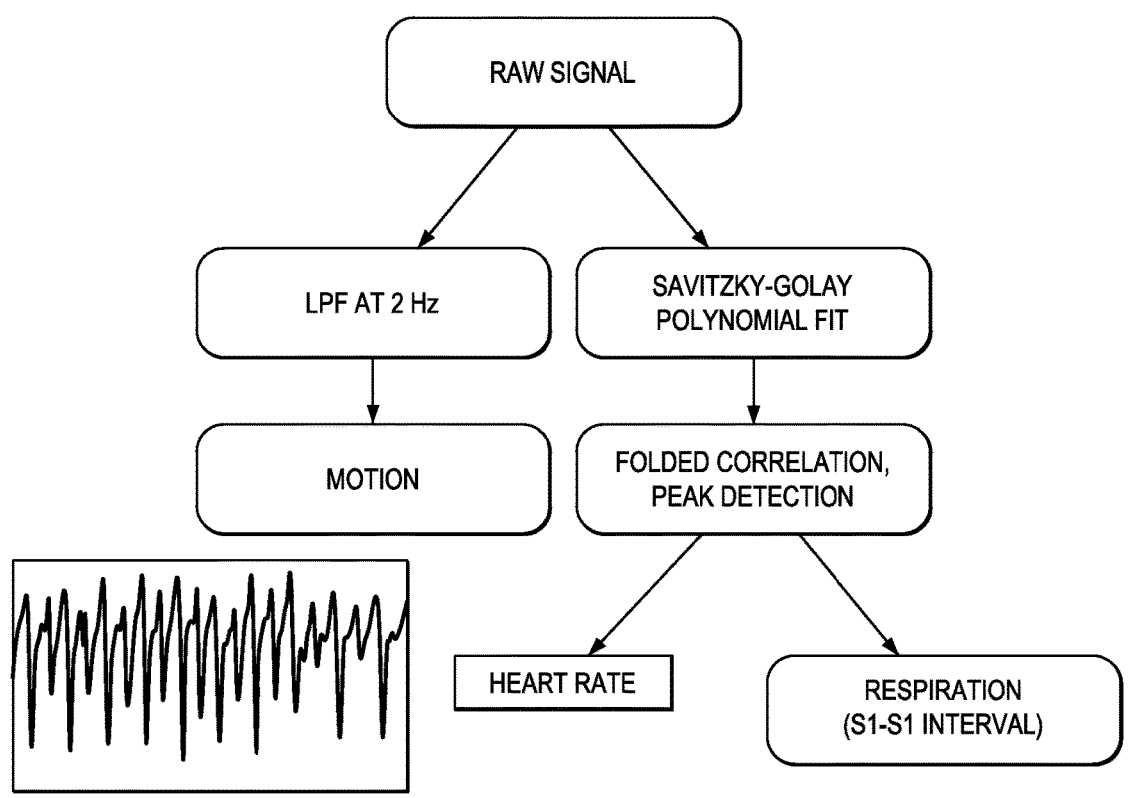
FIG. 24 is a flow diagram of processing accelerometer sensor data in different frequency ranges and different concurrent process modalities to provide pedestrian navigation information, gait monitoring, fall detection, heart-related information, and respiration-related information, etc. for combination with the other Figures.

In FIG. 24, a multi-purpose system embodiment improved as in the other Figures herein wirelessly provides monitoring of walking, gait, falls, and other motion-related detections in remarkable combination with monitoring of accelerometer-derived signals from other frequency ranges and otherwise-separable waveforms from an accelerometer. Note that various embodiments may be adapted according to the teachings herein for use in various kinds of pedestrian navigation, different forms of exercise monitoring, medical clinic use, assisted care or nursing home use, and uses in other venues.

For some background on accelerometer-based heart-rate and other cardiac sensing, and respiration sensing, see U.S. Patent Application Publication 2011006041 "Motion/Activity, Heart-Rate and Respiration from a Single Chest-Worn Sensor, Circuits, Devices, Processes and Systems" dated Mar. 17, 2011, which is incorporated herein by reference in its entirety.

In FIG. 24, a raw accelerometer signal is concurrently processed along a tree of paths. At left, a low pass filter LPF rolling off about 2 Hz is fed to a motion module that includes the attitude estimation and step detection embodiments of other Figures and is supported by other sensors such as e-compass, gyroscope, altitude (height) sensor, etc. The motion module embodiment includes a gait monitor and fall detector as well as pedestrian navigation herein. Concurrently, at right, a Savitzky-Golay polynomial fit is followed by folded correlation and peak detection in a higher frequency range followed by branches to further processes that deliver 1) cardiac pulses from which heart rate and other cardiac parameters are derived and 2) respiration peaks from which respiration rate and various other respiration parameters are derived.

Figure 25:
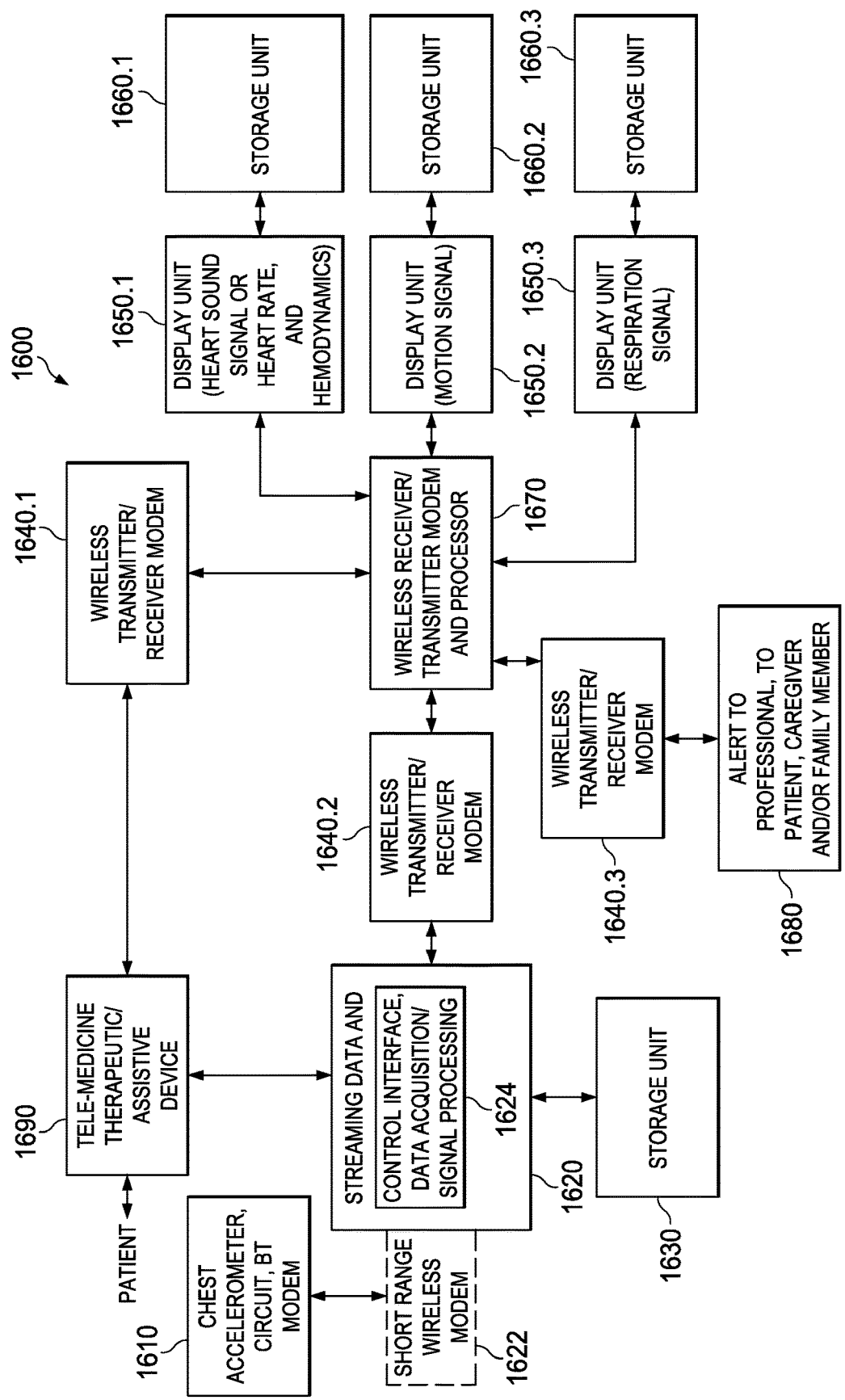
FIG. 25 is a system block diagram of an embodiment to wirelessly acquire and utilize various kinds of accelerometer data and other sensor data according to the other Figures.

FIG. 25 shows an implementation of a wired system embodiment 1600 for a motion monitoring, respiration monitoring, and cardiac monitoring system. An accelerometer 1610 is affixed to the chest of the person being monitored and/or used as taught herein in a manner adequate for acquisition of data currently of interest. An axis sensor signal is coupled to a data acquisition signal processing unit 1620 having a stream data interface and an associated data storage unit 1630 for the signal stream and for instructions and parameters. The signal processing unit 1620 wirelessly supplies process monitoring data to one or more display units 1650.$i$, each having a respective data storage unit 1660.$i$. A first form of display 1650.1 shows the heart sound signal and/or heart rate. A second form of display 1650.2 shows the body motion signal, gait waveforms and parameters, pedestrian navigation waveforms and parameters, course plots on maps or visuals, zone confinement or zone-crossing events, falls and near-fall events, etc. A third form of display 1650.3 shows the respiration signal and/or respiration rate and/or or respiration depth (how deeply the person is breathing) and/or other respiration parameters. Various parameters for respiration are obtained from the respiration waveforms by finding various values on the waveforms and differences and trends therein. For example, respiration rate is measured as the number of cycles of inhalation and exhalation in a given time window (e.g. one minute). Averaging and signal fusion methods/algorithms are also usable in some embodiments to derive more robust respiration rates from multiple parameters. For instance, how deeply the person is breathing is represented by an average of the difference between successive values of inhalation peak and exhalation trough in a given time window (e.g. one minute). Averages and trends in the inhalation peaks are readily calculated and displayed. Averages and trends in the exhalation troughs are also readily calculated and displayed.

The system 1600 of FIG. 25 is suitably arranged and physically protected for mobile and ambulatory monitoring environments. In other forms the system 1600 is set up for use in a clinic by one or more clinicians concurrently.

In FIG. 25, accelerometer sensor 1610 and its electronic circuit also have a Bluetooth or other short range wireless modem wirelessly coupled to another short range wireless modem 1622 that is coupled via a streaming data and control interface 1624 to a data acquisition signal processing unit 1620. Modems 1640.2 and 1670 for wireless transmission and reception remotely are provided at each of two locations so that the data acquisition signal processing unit 1620 communicates via its modem 1640.2 to the remote wireless transceiver unit or modem 1670. The latter modem 1670 is coupled to be one or more display units 1650.$i$ and their storage unit(s) 1660.$i$. In this way, tele-medicine applications are supported. The acquisition signal processing unit 1620 and its modem 1640.2 are suitably provided in a residence or ambulance or on the person or in a wheelchair or gurney. The wireless transceiver 1670 and display unit(s) 1650.$i$ are suitably provided in a clinic, hospital, medical monitoring center or otherwise. Either or both ends of the wireless system may be mobile, such as one example of a modem 1640.3 and alert/processor/display 1680 when a professional in a vehicle is urgently needed to review data coming in from a residence or another vehicle in case of emergency and to respond with instructions.

In FIG. 25, combinations with further processes, circuits and devices for automatic cautionary responses, training and mentoring feedback, warnings, and/or automated monitored therapeutic responses are contemplated. Upon occurrence of undue excursions of one or more measured parameters or relationships among parameters detected by signal processing unit 1620, the remote processor 1670 alerts any one or more of medical professional, patient, caregiver, and/or family member via a modem 1640.3 and alert/processor/display unit 1680 by sending a cellular telephone call and/or other voice call or message and/or written alert such as an automatic e-mail. The alert system suitably provides for acknowledgement by any of the recipients. Also, another modem unit 1640.1 is suitably provided and coupled to a tele-medicine therapeutic, sports-related or assistive device 1690 for assisting the patient in some pharmacological, informational, or physically assistive way by administering a medicine, or adjusting a dosage or otherwise. In case of excursions that indicate an extreme medical emergency, the data acquisition signal processing unit 1620 may be permitted to locally control the therapeutic or assistive device 1690 temporarily and in a maximally-safe way until remote commands are received or first responders can arrive. Mere removal or inadvertent detachment of the accelerometer 1610 from the chest or elsewhere is distinguished by the electronic processing 1620 from affirmatively detected excursions of measured signals and parameters. Regarding tele-care assistance, such assistance is suitably rendered in some physical way in response to the real-time accelerometer sensor 1620 data by activating motorized apparatus comprehended by device 1690 such as to adjust a motorized bed, or move a scooter into proximity for patient use, or servo-mechanically actuate and flush a toilet unit, or open a tub drain to empty a tub, provide electrical training signals, or some other assistance.

In FIG. 25, various parts of the system 1600 are each variously miniaturized and partitioned into various modules and provided with various types of wireline interfaces or wireless modems for different types of products. In this way, different system embodiments are provided. One type of embodiment forms a complete medical clinic, rehabilitation clinic, or sports clinic system. Another type of embodiment is a patient-worn medical-sensor and/or therapeutic device that is wired or has a wireless modem. Another type of embodiment is a patient-worn signal processing and modem module on a belt clip that connects or wirelessly couples to such a sensor and wirelessly couples to a premises gateway or directly transmits to a remote location. Another type of embodiment includes the sensor, signal processor, memory, and modem together in a micro-miniature device that is taped to the chest and communicates to a router or gateway locally, and the latter communicates remotely. Another type of embodiment is the local router or gateway that includes signal processor, memory, and multiple types of modem to communicate with the sensor and separately communicate remotely, such as in a patient or client home-based system to telecommunicate to clinic or hospital.

In some application process embodiments, a training function is included to the gait detection process. For example, suppose in a gait rehabilitation context that the user can walk but the gait is unusual in the sense that it departs from detection criteria specified in the Figures. In that case, the user or clinician enters a command to which context detection 980 is responsive. Step/stride detection or recognition procedures are suitably altered or trained into the device 10. For instance, in one method of training herein, either a clinician or image capture device senses the steps and provides button-presses or automatic step pulses respectively representing a succession of steps by the user. In the meantime, the device 10 acquires a stream of accelerometer measurement data and auto-correlates it. These step pulses then are used in any suitable manner to train the detection process, such as by altering parameters such as peak threshold values and stride period ranges for time interval ranges, etc., to take account of scenarios such as limping gait, cane(s), walker, crutch(es), one or two amputations, prostheses, etc. In some training embodiments, a software-based process alters the parameters by incrementation up-and-down until pedestrian navigation accuracy of device 10 is maximized (e.g., minimum error or minimum least-squares error) based on the acquired data and step pulses and any known course information. Other training embodiments may employ parameter estimation and/or optimization techniques like time-series autoregressive integrated moving average (ARIMA) and maximum likelihood estimation (MLE). Still other training embodiments are contemplated to use artificial intelligence procedures to revise and optimize the step detection and/or attitude estimation processing itself based on the acquired data and step pulses and any known course information, as well as the baseline knowledge base comprised of the process embodiments described herein.

Various system embodiments as described herein are manufactured in a process that provides a particular design and printed wiring board (PWB) of the system unit 100 as in FIG. 5 or unit 600 in FIG. 14 and having one or more integrated circuits, such as for a modem, a processor coupled to a modem, one or more sensors and peripherals coupled to the processor, and a user interface coupled to the processor. A storage, such as SDRAM and Flash memory for coupling to on-chip memory, is coupled to the system and has configuration software and initialization parameters as taught herein, as well as navigation applications and other system software. Test operations check the circuitry and are used to verify operations of the integrated circuit(s) and system in the actual pedestrian navigation application utilized, among other applications. Verification and test operations are applied pertaining to real-time operations in navigation applications such as location-based applications, position sensing, velocity sensing, directional heading and attitude estimations, etc.

Supporting parameters of the processes of the various Figures herein are adjusted for faster and more accurate navigation application performance, lower power/energy dissipation, and maintained or enhanced QoS (quality of service). Supporting parameters include enable/disable register bits, parameter registers bit lengths, measurement window ranges, decision step thresholds, etc. When satisfactory, operations load adjusted parameter(s) into the Flash memory or otherwise by system manufacturer or a supplier, and components are assembled on PWB in volume manufacturing to produce resulting system units.

One or more processors herein perform signal processing according to instructions and by actual electronic processes that represent or correspond to the various logical, arithmetic, algebraic and matrix operations disclosed herein. Memory circuits hold physical representations of instructions and parameters. Chips are fabricated in a wafer fab, and serial-scan testing for internal visibility of scannable registers and other testing are performed on the manufactured integrated circuits.

APPENDIX

With a Roll ($\theta$) applied to a 3-D acceleration measurement vector f, the measurement in the Rolled frame is given by $f^R = R*f$ where f is a column vector $(AccX, AccY, AccZ)^T$ in the device coordinates (X, Y, Z) and Roll-rotation matrix R is given by:

$$R = \begin{bmatrix} 1 & 0 & 0 \\ 0 & \cos\theta & -\sin\theta \\ 0 & \sin\theta & \cos\theta \end{bmatrix} \quad \text{(A-1)}$$

With a further Pitch ($\varphi$) the measurement in a frame herein called the Rolled-Pitched RP frame is given by $$f^{RP} = P*f^R = P*R*f; \quad \text{(A-2)}$$

wherein Pitch-rotation matrix P is given by:

$$P = \begin{bmatrix} \cos\varphi & 0 & \sin\varphi \\ 0 & 1 & 0 \\ -\sin\varphi & 0 & \cos\varphi \end{bmatrix} \quad \text{(A-3)}$$

An actual physical tilt $\Omega$ is expressed by the matrix product P*R:

$$\Omega = P*R = \begin{bmatrix} \cos\varphi & \sin\varphi\sin\theta & \sin\varphi\cos\theta \\ 0 & \cos\theta & -\sin\theta \\ -\sin\varphi & \cos\varphi\sin\theta & \cos\varphi\cos\theta \end{bmatrix} \quad \text{(A-4)}$$

Equivalently, the overall rotation process expressed with row vectors is given by:

$$(f^{RP})^T = f^T*(P*R)^T = f^T*R^T*P^T \quad \text{(A-5)}$$

Vector cross product is expressed next by Equations (A-6) and (A-7). Both operand vectors are expressed in the same right-handed coordinate system. Vector a is conceptually turned toward vector b through the angle A between them and the resulting vector c is oriented orthogonal to both of them in a right-hand rule direction and has magnitude (norm) $\|c\| = \|a\| \|b\| |\sin(A)|$.

$$a \times b = c \quad \text{(A-6)}$$

$$[a1 \; a2 \; a3]^T \times [b1 \; b2 \; b3]^T = [(a2b3-a3b2)(a3b1-a1b3) \\ (a1b2-a2b1)]^T \quad \text{(A-7)}$$

Note that the vector cross product is not commutative because $b \times a = -c$.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows in software and hardware embodiments as well as portions of structure in various embodiments of the invention.

Processing circuitry comprehends digital, analog and mixed signal (digital/analog) integrated circuits, ASIC circuits, PALs, PLAs, FPGAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms including, having, has, with, or variants thereof are used in the detailed description and/or the claims to denote non-exhaustive inclusion in a manner similar to the term comprising. The appended claims and their equivalents are intended to cover any such embodiments or modifications as lie within the scope of the invention.

What is claimed is:

1. A system for pedestrian use, the system comprising:
   an accelerometer having multiple electronic sensors;
   an electronic circuit operable to generate a signal stream representing magnitude of acceleration sensed by said accelerometer, and to electronically correlate a sliding window of the signal stream with itself to produce peaks at least some of which represent walking steps, and further operable to electronically execute a periodicity check to compare different step periods, and to update a walking-step count, wherein the electronic circuit includes a clock circuit and includes a step frequency module operable in response to the clock circuit and the periodicity check to electronically generate signals representing values proportional to an estimated step frequency; and
   an electronic display responsive to said electronic circuit to display information at least in part based on said step count;
   wherein the periodicity check includes operations of the electronic circuit to electronically record relative times of successive peaks, and execute a search of pairs of the times over those peaks to find a succession of peaks that are at an equal interval from each other based on the relative times, and to generate an estimate of step period to be at least same as that interval.

2. The system claimed in claim 1 wherein the periodicity check includes screening for a correlation peak within a time range in which a step can be expected relative to a previous correlation peak representing a step.

3. The system claimed in claim 2 wherein the update operates to update the step count when the screening determines that the correlation peak is present within the time range.

4. The system claimed in claim 2 wherein the electronic circuit is also operable, when the screening detects a correlation peak within the time range, to then update the time range in which a succeeding step can be expected, such range update as a function of the time between the detected correlation peak and at least one previous correlation peak representing a step.

5. The system claimed in claim 2 wherein said electronic circuit is operable to screen the correlation peaks in threes.

6. The system claimed in claim 1 wherein the periodicity check includes a set of electronic analytical tests on correlation peaks in data over a duration window including and going beyond each peak that is analytically tested, a first such analytical test including a test whether a peak exceeds a height threshold, and a second such analytical test including a test whether a given peak is later followed by another peak that is within the duration window, whereupon if a given peak passes the first and second tests, then the given peak is validated and said another peak is analyzed by at least the second analytical test.

7. The system claimed in claim 6 wherein the periodicity check includes a test whether a given peak is later followed by another peak that is within the duration window, whereupon if the given peak fails the test, then the electronic circuit is further operable to skip to a next peak that is next after the given peak regardless of whether the next peak is prior or subsequent to the duration window.

8. The system claimed in claim 1 wherein the periodicity check includes a set of electronic analytical tests on correlation peaks, and the electronic circuit is operable to determine what tests are applicable to a given peak and execute the applicable tests, and is further operable to skip to a next peak in the data if a given peak fails to pass the applicable tests.

9. The system claimed in claim 1 for faster-walking and slower-walking pedestrian use wherein the correlation peaks are lower-amplitude and more widely spaced in response to slower-walking, and said electronic circuit is operable to apply electronic analytical tests on the correlation peaks, the tests having test parameters, and said electronic circuit is further operable to vary the test parameters adaptively at least sometimes when the correlation peaks vary in amplitude and spacing.

10. The system claimed in claim 1 wherein the periodicity check includes selecting correlation peaks having a peak intensity exceeding a variable threshold, such threshold being higher if at least one recent peak is high, and lower if at least one recent peak is low.

11. The system claimed in claim 1 wherein said electronic circuit is operable to detect a zero crossing of the correlation and to identify the time of a user walking step from a next-previous correlation peak.

12. The system claimed in claim 1 wherein said electronic circuit is operable to update a stride window for the correlation to encompass at least a current stride period.

13. The system claimed in claim 1 wherein the periodicity check includes both selecting correlation peaks having a peak intensity exceeding a variable threshold, such threshold being higher if at least one recent peak is high, and lower if at least one recent peak is low, and screening for such correlation peak within a time range in which a step can be expected relative to a previous such correlation peak.

14. The system claimed in claim 1 wherein the electronic circuit is operable to skip a peak that has no subsequent peak satisfying the periodicity check.

15. The system claimed in claim 1 wherein the periodicity check includes detecting zero crossings, and identifying the first maximum before a zero crossing as a true peak representing a walking step.

16. The system claimed in claim 1 wherein the electronic circuit is further operable to generate a range based on mean step frequency and to compare the values proportional to estimated step frequency to determine whether they lie within the range, and if not then to perform an adjustment that doubles or halves the values depending on whether they lie below or above the range.

17. The system claimed in claim 1 wherein the electronic circuit is operable when periodicity check is passed to electronically generate a signal for display representing a first stride period between right leg steps and a second stride period between left leg steps.

18. The system claimed in claim 1 wherein the electronic circuit is operable to estimate step length for display as a function of generated step frequency and to accumulate such estimated step length as the walking-step count increases, to generate an estimate of walking distance traveled.

19. An electronic circuit for use with an accelerometer, the electronic circuit comprising:
   a nonvolatile memory having stored representations of instructions to generate a signal stream representing magnitude of acceleration, to electronically correlate a sliding window of the signal stream with itself to produce peaks at least some of which represent walking steps, and to electronically execute a periodicity check to compare different step periods, and to update a walking-step count;
   a sensor input port;
   a display port; and
   a processor circuit programmably operable in response to the instructions in said nonvolatile memory for at least addition and multiplication and conditional operations responsive to said sensor input port, thereby to effectuate the instructions and drive said display port;
   wherein the periodicity check includes such instructions to electronically record relative times of successive peaks, and execute a search of pairs of the times over those peaks to find a succession of peaks that are at an equal interval from each other based on the relative times, and to generate an estimate of walking-step length as a function of that interval; and
   wherein the processor circuit includes a clock circuit and the memory includes a step frequency module for execution by the processor with the periodicity check and with the clock circuit.

20. The electronic circuit claimed in claim 19 wherein the periodicity check includes screening for a correlation peak within a time range in which a walking step can be expected relative to a previous correlation peak representing a walking step.

21. The electronic circuit claimed in claim 20 wherein the update operates to update the step count when the screening determines that a correlation peak is present within the time range.

22. The electronic circuit claimed in claim 20 wherein the processor circuit is also operable, when the screening detects a correlation peak within the time range, to then update the time range in which a succeeding step can be expected, such range update as a function of the time between the detected correlation peak and at least one previous correlation peak representing a step.

23. The electronic circuit claimed in claim 19 wherein the periodicity check includes a set of processor analytical tests on correlation peaks in data over a duration window including and going beyond each peak that is analytically tested, a first such analytical test including a test whether a peak exceeds a height threshold, and a second such analytical test including a test whether a given peak is later followed by another peak that is within the duration window, whereupon if a given peak passes the first and second tests, then said another peak is analyzed by at least the second analytical test.

24. The electronic circuit claimed in claim 23 wherein the periodicity check includes a test whether a given peak is later followed by another peak that is within the duration window, whereupon if the given peak fails the test, then the processor circuit is further operable to skip to a next peak that is next after the given peak regardless of whether the next peak is prior or subsequent to the duration window.

25. The electronic circuit claimed in claim 19 wherein the periodicity check includes a set of processor analytical tests on correlation peaks, and the processor circuit is operable to determine what tests are applicable to a given peak and execute the applicable tests, and is further operable to skip to a next peak in the data if a given peak fails to pass the applicable tests.

26. The electronic circuit claimed in claim 19 for faster-walking and slower-walking pedestrian use wherein the correlation peaks are lower-amplitude and more widely spaced in response to slower-walking, and said processor circuit is operable to apply processor analytical tests on the correlation peaks, the tests having test parameters, and said processor circuit is further operable to vary the test parameters adaptively at least sometimes when the correlation peaks vary in amplitude and spacing.

27. The electronic circuit claimed in claim 19 wherein said processor circuit is operable to screen multiple correlation peaks concurrently.

28. The electronic circuit claimed in claim 19 wherein the periodicity check includes selecting correlation peaks having a peak intensity exceeding a variable threshold, such threshold being higher if at least one recent peak is high, and lower if at least one recent peak is low.

29. The electronic circuit claimed in claim 19 wherein said processor circuit is operable to detect a zero crossing of the correlation to identify the time of a user walking step.

30. The electronic circuit claimed in claim 19 wherein said processor circuit is operable to update a stride window for the correlation to encompass at least a current stride period.

31. The electronic circuit claimed in claim 19 wherein the processor circuit is further operable to generate a range based on mean step frequency and to compare the values proportional to estimated step frequency to determine whether they lie within the range, and if not then to perform an adjustment that doubles or halves the values depending on whether they lie below or above the range.

32. The electronic circuit claimed in claim 19 wherein the processor circuit is operable when periodicity check is passed to electronically generate a signal for display representing a first stride period between right leg steps and a second stride period between left leg steps.

33. The electronic circuit claimed in claim 19 wherein the processor circuit is operable to estimate step length for display as a function of generated step frequency and to supply said display port with signals based at least in part on the step length.

34. A process implemented using an electronic circuit responsive to an accelerometer, the process comprising:
generating a signal stream representing magnitude of acceleration;
electronically correlating a sliding window of the signal stream with itself to produce peaks at least some of which represent walking steps;
electronically executing a periodicity check comparing different step periods updating a walking-step count;
generating display information at least in part based on the step count; wherein the periodicity check includes electronically recording relative times of successive peaks, and searching pairs of the times over those peaks to find a succession of peaks that are at an equal interval from each other based on the relative times, and generating an estimate of walking-step length as a function of that interval; and
monitoring step frequency with the periodicity check and a clock circuit.

35. The process claimed in claim 34 wherein the periodicity check includes screening for a correlation peak within a time range in which a walking step can be expected relative to a previous correlation peak representing a walking step.

36. The process claimed in claim 35 wherein the update operates to update the step count when the screening determines that a correlation peak is present within the time range.

37. The process claimed in claim 35 wherein, when the screening detects a correlation peak within the time range, then updating the time range in which a succeeding step can be expected as a function of the time between the detected correlation peak and at least one previous correlation peak representing a step.

38. The process claimed in claim 34 wherein the periodicity check includes a set of analytical tests on correlation peaks in data over a duration window including and going beyond each peak that is analytically tested, a first such analytical test including a test whether a peak exceeds a height threshold, and a second such analytical test including a test whether a given peak is later followed by another peak that is within the duration window, whereupon if a given peak passes the first and second tests, then said another peak is analyzed by at least the second analytical test.

39. The process claimed in claim 34 wherein the periodicity check includes a set of analytical tests on correlation peaks and determining what tests are applicable to a given peak and executing the applicable tests, and skipping to a next peak in the data if a given peak fails to pass the applicable tests.

40. The process claimed in claim 34 for faster-walking and slower-walking pedestrian use wherein the correlation peaks are lower-amplitude and more widely spaced in response to slower-walking, and the process includes electronically adjusting test parameters of analytical tests adaptively at least sometimes when the correlation peaks vary in amplitude and spacing.

41. The process claimed in claim 34 wherein the periodicity check includes selecting correlation peaks having a peak intensity exceeding a variable threshold, such threshold being higher if at least one recent peak is high, and lower if at least one recent peak is low.

42. The process claimed in claim 34 wherein monitoring includes generating a range based on mean step frequency and to compare the values proportional to estimated step frequency to determine whether they lie within the range, and if not then to perform an adjustment that doubles or halves the values depending on whether they lie below or above the range.

43. The process claimed in claim 34 further comprising supplying display signals based at least in part on a step length as a function of the step frequency.

* * * * *